United States Patent [19]
Mills et al.

[11] Patent Number: 6,024,935
[45] Date of Patent: Feb. 15, 2000

[54] LOWER-ENERGY HYDROGEN METHODS AND STRUCTURES

[75] Inventors: Randell L. Mills, Malvern; William R. Good, Wayne; Jonathan Phillips, State College; Arthur I. Popov, Philadelphia, all of Pa.

[73] Assignee: Blacklight Power, Inc., Cranbury, N.J.

[21] Appl. No.: 08/822,170

[22] Filed: Mar. 21, 1997

Related U.S. Application Data

[63] Continuation of application No. 08/592,712, Jan. 26, 1996, abandoned.

[51] Int. Cl.[7] .................................................. C01B 3/02
[52] U.S. Cl. ........................................ 423/648.1; 422/129
[58] Field of Search ......................... 423/648.1; 422/129

[56] References Cited

U.S. PATENT DOCUMENTS

| | | | |
|---|---|---|---|
| 1,001,589 | 8/1911 | Hatfield . | |
| 2,708,656 | 5/1955 | Fermi . | |
| 3,297,484 | 1/1967 | Niedrach | 136/86 |
| 3,300,345 | 1/1967 | Lyons, Jr. | 136/86 |

(List continued on next page.)

FOREIGN PATENT DOCUMENTS

| | | | |
|---|---|---|---|
| 0 392 325 | 10/1990 | European Pat. Off. . | |
| 0 395 066 | 10/1990 | European Pat. Off. | 376/100 |

(List continued on next page.)

OTHER PUBLICATIONS

The Associated Press, "Pennsylvania Company . . . Cold Fusion Mystery"; 1991, Lexis Nexis Reprint.
Boston Globe, Wednesday, Apr. 19, 1989, "Successful nuclear fusion experiment by the Italians".
Broad, "2 Teams Put New Life in Cold Fusion Theory", New York Times, Apr. 26, 1991, p. A18.

(List continued on next page.)

*Primary Examiner*—Wayne Langel
*Attorney, Agent, or Firm*—Jeffrey S. Melcher; Farkas & Manelli PLLC

[57] ABSTRACT

Methods and apparatus for releasing energy from hydrogen atoms (molecules) by stimulating their electrons to relax to quantized lower energy levels and smaller radii (smaller semimajor and semiminor axes) than the "ground state" by providing energy sinks or means to remove energy resonant with the hydrogen energy released to stimulate these transitions. An energy sink, energy hole, can be provided by the transfer of at least one electron between participating species including atoms, ions, molecules, and ionic and molecular compounds. In one embodiment, the energy hole comprises the transfer of t electrons from one or more donating species to one or more accepting species whereby the sum of the ionization energies and/or electron affinities of the electron donating species minus the sum of the ionization energies and/or electron affinities of the electron accepting species equals approximately mX27.21 eV (mX48.6 eV) for atomic (molecular) hydrogen below "ground state" transitions where m and t are integers. The present invention further comprises a hydrogen spillover catalyst, a multifunctionality material having a functionality which dissociates molecular hydrogen to provide free hydrogen atoms which spill over to a functionality which supports mobile free hydrogen atoms and a functionality which can be a source of the energy holes. The energy reactor includes one of an electrolytic cell, a pressurized hydrogen gas cell, and a hydrogen gas discharge cell. A preferred pressurized hydrogen gas energy reactor comprises a vessel; a source of hydrogen; a means to control the pressure and flow of hydrogen into the vessel; a material to dissociate the molecular hydrogen into atomic hydrogen, and a material which can be a source of energy holes in the gas phase. The gaseous source of energy holes includes those that sublime, boil, and/or are volatile at the elevated operating temperature of the gas energy reactor wherein the exothermic reaction of electronic transitions of hydrogen to lower energy states occurs in the gas phase.

499 Claims, 9 Drawing Sheets

U.S. PATENT DOCUMENTS

| | | | |
|---|---|---|---|
| 3,359,422 | 12/1967 | Pollock | 250/84.5 |
| 3,377,265 | 4/1968 | Caesar | 204/290 |
| 3,448,035 | 6/1969 | Serfass | 204/278 |
| 3,669,745 | 6/1972 | Beccu | 136/20 |
| 3,701,632 | 10/1972 | Lovelock | 23/232 |
| 3,755,128 | 8/1973 | Herwig | 204/320 |
| 3,816,192 | 6/1974 | Brower . | |
| 3,835,019 | 9/1974 | Lovelock | 204/130 |
| 3,917,520 | 11/1975 | Katz et al. | 204/129 |
| 4,265,720 | 5/1981 | Winstel | 204/129 |
| 4,274,938 | 6/1981 | Schulten et al. | 204/239 |
| 4,487,670 | 12/1984 | Bellanger et al. | 204/129 |
| 4,512,966 | 4/1985 | Nelson . | |
| 4,568,568 | 2/1986 | Asano et al. | 427/125 |
| 4,664,904 | 5/1987 | Wolfrum et al. | 423/648.1 |
| 4,737,249 | 4/1988 | Shepard, Jr. et al. | 204/129 |
| 4,774,065 | 9/1988 | Penzorn . | |
| 4,923,770 | 5/1990 | Grasselli et al. | 429/101 |
| 4,968,395 | 11/1990 | Pavelle et al. | 204/130 |
| 4,986,887 | 1/1991 | Gupta et al. . | |
| 5,215,729 | 6/1993 | Buxbaum | 423/648.1 |
| 5,318,675 | 6/1994 | Patterson . | |
| 5,372,688 | 12/1994 | Patterson . | |

FOREIGN PATENT DOCUMENTS

| | | | |
|---|---|---|---|
| 53-134792 | 7/1975 | Japan . | |
| 136644 | 10/1981 | Japan | 423/648.1 |
| WO 90/10935 A1 | 9/1990 | WIPO . | |
| WO 90/13126 | 11/1990 | WIPO | 376/100 |
| WO 90/14668 A2 | 11/1990 | WIPO . | |
| WO 91/01036 A1 | 1/1991 | WIPO . | |
| WO 91/08573 A1 | 6/1991 | WIPO . | |
| WO 92/10838 | 6/1992 | WIPO | 376/100 |
| WO 93/17437 A1 | 9/1993 | WIPO . | |
| WO 94/10688 A1 | 5/1994 | WIPO . | |
| WO 94/14163 A1 | 6/1994 | WIPO . | |
| WO 94/15342 A1 | 7/1994 | WIPO . | |
| WO 94/29873 | 12/1994 | WIPO . | |
| WO 95/20816 A1 | 8/1995 | WIPO . | |
| WO 96/42085 A2 | 12/1996 | WIPO . | |

OTHER PUBLICATIONS

Bush, et. al., "Helium Production During the Electrolysis . . . Experiments", Preliminary Note, Univ. of Texas, pp. 1–12.

Notoya, "Cold Fusion . . . Nickel Electrode", Fusion Technology, vol. 24, pp. 202–204.

Notoya, "Tritium Generation . . . Nickel Electrodes", Fusion Technology, vol. 26, pp.

Oka, et. al., "$D_2O$–fueled fusion power reactor using electromagnetically induced $D-D_n$, $D-D_p$, and Deuterium–tritium reactions—preliminary design of a reactor system", Fusion Technology, vol. 16, No. 2, Sep. 1989, pp. 263–267.

Ohmori, et. al., "Excess Heat Evolution . . . Tin Cathodes" Fusion Technology, vol. 24, pp. 293–295 (1993).

Rogers, "Isotopic hydrogen fusion in metals", Fusion Technology, vol. 16, No. 2, Sep. 1989, pp. 2254–2259.

Rout, et. al., "Phenomenon of Low Energy Emissions from Hydrogen/Deuterium Loaded Palladium", $3^{rd}$ Annual Conference on Cold Fusion (Oct. 21–25, 1992).

Srinivasan, et. al., "Tritium and Excess Heat Generation during Electrolysis of Aqueous Solutions of Alkali Salts with Nickel Cathode", $3^{rd}$ Annual Conference on.

Stein, "Theory May Explain Cold Fusion Puzzle", Lexis Reprint, Washington News, Apr. 25, 1991.

Suplee, "Two New Theories on Cold Fusion . . . Scientists"; The Washington Post $1^{st}$ Section, p. A11, (1991).

Bishop, "More Labs Report Cold Fusion Results", Wall Street Journal, Oct. 19, 1992.

Bishop, "It ain't over til it's over . . . Cold Fusion", Popular Science, Aug. 1993, pp. 47–51.

Browne, "Pysicists Put Atom in 2 Places at Once", The New York Times.

Bush, et. al., "Power in a Jar: the Debate Heats Up", 88 Bus. Week, Science & Technology, Oct. 26, 1992.

Bush, et. al., "Helium Production During the Electrolysis . . . Experiments", Preliminary Note, Univ. of Texas, pp. 1–12.

Catlett, et. al., "Hydrogen transport in lithium hydride as a function of pressure" The Journal of Chemical Physics, 58(8), 3432–3438 (Apr. 1978).

Chien, et. al., "On an Electrode . . . Tritium and Helium", J. Electroanal Chem., 1992, pp. 189–212.

Close, "Too Hot to Handle—The Race for Cold Fusion", Princeton University Press, 1989.

Criddle, "The Roles of Solution . . . Excess Heating", Electrochemical Science & Technology Centre, Univ. of Ottawa.

Datz, et. al., "Molecular Association in Alkali Halide Vapors", Journal of Chemical Physics, vol. 34, No. 5, (Feb. 1961), pp. 558–564.

Dagani, "Cold Fusion—Utah Pressures Pons, Fleischmann", Jan. 14, 1991, C&EN, pp. 4–5.

Dagani, "Latest Cold Fusion Results Fail to Win Over Skeptics", Jun. 14, 1993, C&EN, pp. 38–40.

Dagani, "New Evidence Claimed for Nuclear Process in 'Cold Fusion'", C&EN Washington, (Apr. 1991), pp. 31–33. Experimental Verification by Idaho National Engineering Laboratory, pp. 13–25.

Hardy, et. al., "The Volatility of Nitrates and Nitrites of the Alkali Metals", Journal of the Chemical Society, pp. 5130–5134 (1963).

Huizenga, "Cold Fusion—The Scientific Fiasco of the Century", Oxford University Press, 1993.

Huizenga, "Cold Fusion Labled Fiasco of the Century", Forum for Applied Research and Public Policy, vol. 7, No. 4, pp. 78–83.

Jones, (article by Dagani), "Cold Fusion Believer . . . Research", Jun. 5, 1995, C&EN, pp. 34–41.

Jones, "Current Issues in Cold Fusion . . . Particles", Surface and Coatings Technology, 51 (1992), pp. 283–289.

Jones, et. al., "Faradic Efficiences . . . Cells", J. Phys. Chem. 1995, pp. 6973–6979.

Jones, et. al., "Examination of Claims of Miles . . . Experiments", J. Phys. Chem. 1995, pp. 6966–6972.

Ivanco, et. al., "Calorimetry For a $Ni/K_2CO_3$ Cell", AECL Research, Jun. 1994.

Kahn, "Confusion in a Jarr", Nova 1991.

Karabut, et. al., "Nuclear Product . . . Deuterium", Physics Letters A170, (1992), p. 265.

Klein, "Attachments to Report of Cold Fusion Testing", Cold Fusion, No. 9, pp. 16–19.

Labov, "Special Observations . . . Background", The Astrophysical Journal, 371, Apr. 20, 1991, pp. 810–819.
Lehigh X–Ray Photoelectron Spectroscopy Report, Dec. 8, 1993.
Miles, et. al., "Search for Anomalous Effects . . . Palladium Cathodes", Naval Air Warfare Center Weapons Divsion, Proceedings of $3^{rd}$ Int. Conf. on Cold Fusion.
Miles et al, "Correlation of Excess . . . Palladium Cathodes", J. Electronl. Chem., 1993, pp. 99–117.
Miles et al, "Heat and Helium . . . Experiments", Conference Proceedings, vol. 33, 1991, pp. 363–372.
Miles et al, "Electrochemical . . . Palladium Deuterium System", J. Electroanal Chem., 1990, pp. 241–254.
Mills, et. al., "Fractional Quantum . . . Hydrogen", Fusion Technology, vol. 28, Nov. 1995, pp. 1697–1719.
Mills, Unification of Spacetime, the Forces, Matter, Energy, HydroCatalysis Power Corporation, 1992, pp. 53–84.
Mills, "The Grand Unified Theory of Classical Quantum Mechanics", pp. 1–9.
Mills, "Hydrocatalysis Power Technology", Statement of Dr. Randall L. Mills, May, 1993.
Mills Technologies, "1KW Heat Exchanger System", Thermacore, Inc., Oct. 11 1991, pp. 1–6.
Mills Technologies, "1KW Heat Exchanger System", Thermacore, Inc., Apr. 17, 1992, pp. 1–6.
Monroe, et. al., "A Schrodinger Cat Superposition State of an Atom", Science, vol. 272, (May 24, 1996), pp. 1131–1101.
Morrison, "Review of Progress in Cold Fusion", Transactions of Fusion Technology, vol. 26, Dec. 1994, pp. 48–55.
Morrison, "Cold Fusion Update No. 12, ICCPG", Jan. 17, 1997, available online at "www.skypoint.com".
Niedra, "Replication of the Apparent Excess Heat Effect in Light Water . . . Cell", NASA Technical Memorandum 107167, (Feb. 1996).
Nieminen, "Hydrogen atoms band together", Nature, vol. 356, Mar. 26, 1992, pp. 289–291.
Notoya, et. al., "Excess Heat Production in Electrolysis . . . Electrodes", Proceedings of the Int. Conf. on Cold Fusion, Oct. 21–25, 1992, Tokyo, Japan.
Rees, "Cold Fusion . . . What Do We Think?", Journal of Fusion Energy, (1991), vol. 10, No. 1, pp. 110–116.
Rousseau, "Case Studies in Patholigical Science", vol. 80, American Scientist, (1992), pp. 54–63.
Service, "Cold Fusion:Still Going", Newsweek Focus, Jul. 19, 1993.
Shaubach, et. al., "Anomalous Heat . . . Carbonate", Thermacore, Inc., pp. 1–10.
Storms, et. al., "Electroyltic Tritium Production", Fusion Technology, vol. 17, Jul. 1990, pp. 680–695.
Taubes, "Bad Science", Random House, 1993, pp. 303, 425–481.
Vaselli et al., "Screening Effect of Impurities in Metals: A possible Explanation of the Process of Cold Nuclear Fusion", 11 Nuovo Cimento Della Societa Italiana di Fisica.
Williams, "Upper Bounds on Cold Fusion in Electrolytic Cells", Nature, vol. 342, 23 Nov. 1989, pp. 375–384.
Yamaguchi et al, "Direct Evidence . . . Palladium", NTT Basic Research Laboratories, (1992) pp. 1–10.
Zweig, "Quark Catalysis of Exothermal Nuclear Reactions", Science, vol. 201, (1978), pp. 973–979.
Bush, et. al., Journal Electrochanal. Chem., vol. 304, pp. 271–278 (1991).
Shrivenvassan, et. al., $3^{rd}$ Annual Conference on Cold Fusion (1992).
Notoya, Fusion Technology, vol. 24, p. 202 (1993).
Ohmori, et. al., Fusion Technology, vol. 24, p. 293 (1993).
Boston Globe, Wednesday, Apr. 19, 1989, "Successful nuclear fusion experiment by the Italians".
Oka, et. al., "$D_2O$–fueled fusion power reactor using electromagnetically induced D–$D_n$, D–$D_p$, and Deuterium–tritium reactions—preliminary design of a reactor system", Fusion.
Fusion Digest, "Cold Nuclear Fusion Bibliography", 1993.
Rogers, "Isotopic hydrogen fusion in metals", Fusion Technology, vol. 16, No. 2.
Fusion Digest, "Heat? Neutrons? Charged Particles?", 1993.
Brodowsky, "Solubility and diffusion of hydrogen and deuterium in palladium and palladium alloys", Technical Bulletin, Engelhard Indust., vol. 7, No. 1–2 (1966), pp. 41–50.
Prop. to the United Press, "Theory May Explain 'Cold Fusion' Puzzle"; 1991; Lexis Nexis Reprint.
The Associated Press, "Pennsylvania Company . . . Cold Fusion Mystery"; 1991, Lexis Nexis Reprint.
The New York Times, "2 Teams Put New Life in 'Cold' Fusion Theory"; 1991; Section A, p. 18, col. 1; Lexis Nexis Reprint.
The Washington Post, "Two New Theories on Cold Fusion . . . Scientists"; 1991; $1^{st}$.
Albagli et al., Journal of Fusion Energy, 9(2):133–148 (1990).
Alber et al., Z. Phys. A.—Atomic Nuclei, vol. 333, (1989), pp. 319–320.
Alessandrello et al., Il Nuovo Cimento, 103A (11) :1617–1638 (1990).
Balke et al., Physical Review C, 42 91) :30–37 (1990).
Benetskii et al., Kratkie Soobshcheniya po fizike, No. 6, pp. 58–60, 1989 (translation of).
Besenbacher et al., Journal of Fusion Energy, 9 (3) :315–317 (1990).
Bush et al., J. Electroanal. Chem., 304:271–278 (1991).
Chapline, UCRL—101583, Jul. 1989, pp. 1–9.
Cooke, ORNL/FTR—3341, Jul. 31, 1989, pp. 2–15.
Cribier et al., Physics Letters B, vol. 228, No. 1, Sep. 7, 1989, pp. 163–166.
Faller et al., J. Radioanal. Nucl. Chem. Letters, vol. 137, No. 1, (Aug. 21, 1989), pp. 9–16.
Hajdas et al., Solid State Communications, vol. 72, No. 4, (1989) pp. 309–313.
Horanyi, J. Radioanal. Nucl. Chem., Letters, vol. 137, No. 1, (Aug. 21, 1989), pp. 23–28.
Kreysa et al., J. Electronanal. Chem. vol. 266, (1989) pp. 437–450.
Legett et al., Physical Review Letters, 63(2):191–194 (1989).
Lewis et al., Nature, vol. 340, Aug. 17, 1989, pp. 525–530.
Maly et al., Fusion Technology, vol. 24, Nov. 1993, pp. 307–318.
McNally, Jr., Fusion Technology, 16(2):237–239 (1989).
Mills et al., Fusion Technology, 25:103 (1994).
Mills et al., Fusion Technology, vol. 20, (Aug. 1991), pp. 65–81.
Miskelly et al., Science, vol. 246, No. 4931, Nov. 10, 1989, pp. 793–796.
Noninski, Fusion Technology, vol. 21, (Mar. 1992), pp. 163–167.
Noninski et al., Fusion Technology, vol. 19, Mar. 1991, pp. 364–368.
Ohashi et al., J. of Nucl. Sci. and Tech., vol. 26, No. 7, (Jul. 1989), pp. 729–732.

Price et al., Physical Review Letters, vol. 63, No. 18, Oct. 30, 1989, pp. 1926–1929.

Salamon et al., Nature, vol. 344, Mar. 29, 1990, pp. 401–405.

Schrieder et al., Z. Phys. B–Condensed Matter, vol. 76, No. 2, pp. 141–142, (1989).

Shani et al., Solid State Communications, vol. 72, No. 1, (1989) pp. 53–57.

The New York Times, May 3, 1989, pp. A1, A22, article by M. Browne.

The Wall Street Journal, Apr. 26, 1989, p. B4, article by D. Stipp.

The Washington Post, May 2, 1989, pp. A1, A7, article by P. Hilts.

The Washington Post, Jul. 13, 1989, pp. A14.

The Washington Post, Mar. 29, 1990, p. A3.

The Washington Times, Mar. 24, 1989, p. A5, article by D. Braaten.

Ziegler et al., Physical Review Letters, vol. 62, No. 25, Jun. 19, 1989, pp. 2929–2932.

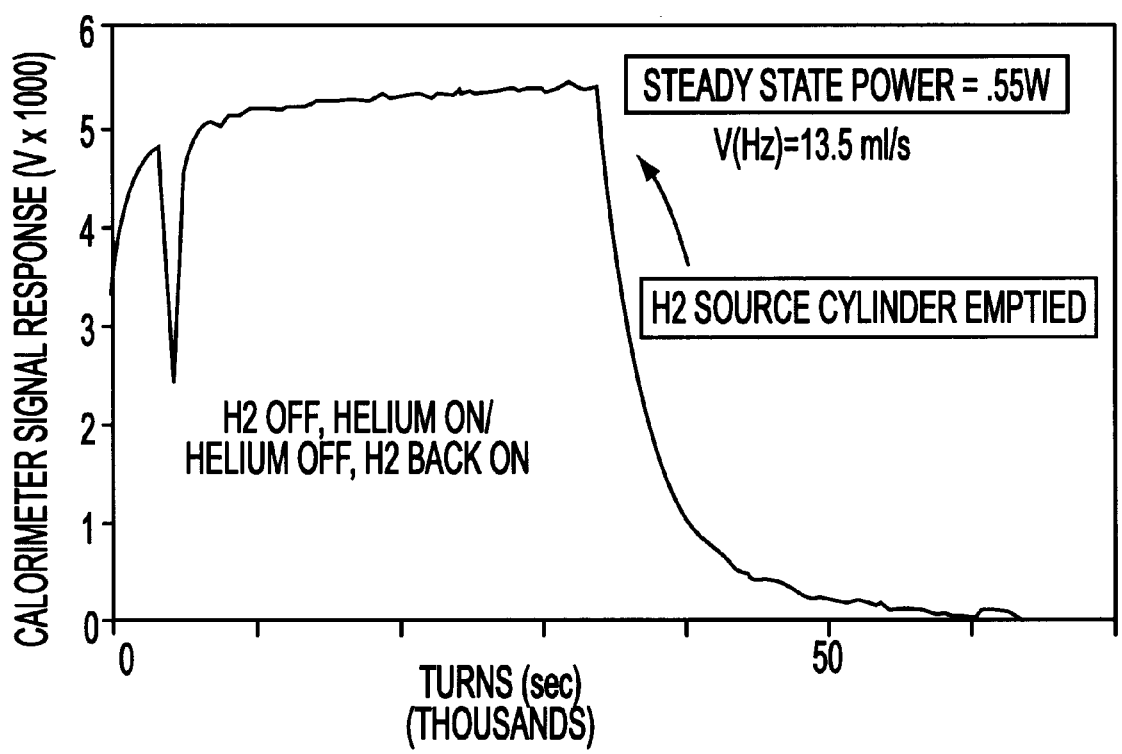

LOWER-ENERGY HYDROGEN METHODS AND STRUCTURES

This application is a continuation of U.S. patent application Ser. No. 08/592,712, filed Jan. 26, 1996, abandoned.

BACKGROUND OF THE INVENTION

1. Field of the Invention

This invention relates to methods and apparatus for releasing energy from hydrogen atoms (molecules) as their electrons are stimulated to relax to lower energy levels and smaller radii (smaller semimajor and semiminor axes) than the "ground state" by providing a transition catalyst which acts as an energy sink or means to remove energy resonant with the electronic energy released to stimulate these transitions according to a novel atomic model. The transition catalyst should not be consumed in the reaction. It accepts energy from hydrogen and releases the energy to the surroundings. Thus, the transition catalyst returns to the origin state. Processes that require collisions are common. For example, the exothermic chemical reaction of H+H to form $H_2$ requires a collision with a third body, M, to remove the bond energy–H+H+M→$H_2$+M. The third body distributes the energy from the exothermic reaction, and the end result is the $H_2$ molecule and an increase in the temperature of the system. Similarly, the transition from the n=1 state of hydrogen to the $$n = \frac{1}{\text{integer}}$$

states of hydrogen is possible via a resonant collision, say n=1 to n=½. In these cases, during the collision the electron(s) couples to another electron transition or electron transfer reaction, for example, which can absorb the exact amount of energy that must be removed from the hydrogen atom (molecule), a resonant energy sink. The end result is a lower-energy state for the hydrogen and increase in temperature of the system. Each of such reactions is hereafter referred to as a shrinkage reaction: each transition is hereafter referred to as a shrinkage transition; each energy sink or means to remove energy resonant with the hydrogen electronic energy released to effect each transition is hereafter referred to as an energy hole, and the electronic energy removed by the energy hole to effect or stimulate the shrinkage transition is hereafter referred to as the resonance shrinkage energy. An energy hole comprising a reactant ion that is spontaneously regenerated following an endothermic electron ionization reaction of energy equal to the resonance shrinkage energy is hereafter referred to as an electrocatalytic ion. An energy hole comprising two reactants that are spontaneously regenerated following the an endothermic electron transfer reaction between the two species wherein the differences in their ionization energies is equal to the resonance shrinkage energy is hereafter referred to as an electrocatalytic couple.

The present invention of an electrolytic cell energy reactor, pressurized gas energy reactor, and a gas discharge energy reactor, comprises: a source of hydrogen; one of a solid, molten, liquid, and gaseous source of energy holes; a vessel containing hydrogen and the source of energy holes wherein the shrinkage reaction occurs by contact of the hydrogen with the source of energy holes; and a means for removing, the (molecular) lower-energy hydrogen so as to prevent an exothermic shrinkage reaction from coming to equilibrium. The present invention further comprises methods and structures for repeating this shrinkage reaction to produce shrunken atoms (molecules) to provide new materials with novel properties such as high thermal stability.

2. Description of the Related Art

Existing atomic models and theories are unable to explain certain observed physical phenomena. The Schrödinger wavefunctions of the hydrogen atom, for example, do not explain the extreme ultraviolet emission spectrum of the interstellar medium or that of the Sun, as well as the phenomenon of anomalous heat release from hydrogen in certain electrolytic cells having a potassium carbonate electrolyte or certain gas energy cells having a hydrogen spillover catalyst comprising potassium nitrate with the production of lower-energy hydrogen atoms and molecules, which is part of the present invention. Thus, advances in energy production and materials have been largely limited to laboratory discoveries having limited or sub-optimal commercial application.

SUMMARY OF THE INVENTION

The present invention comprises methods and apparatuses for releasing heat energy from hydrogen atoms (molecules) by stimulating their electrons to relax to quantized potential energy levels below that of the "ground state" via electron transfer reactions of reactants including electrochemical reactant(s) (electrocatalytic ion(s) or couple(s)) which remove energy from the hydrogen atoms (molecules) to stimulate these transitions. In addition, this application includes methods and apparatuses to enhance the power output by enhancing the reaction rate- the rate of the formation of the lower-energy hydrogen. The present invention further comprises a hydrogen spillover catalyst, a multifunctionality material having a functionality which dissociates molecular hydrogen to provide free hydrogen atoms which spill over to a functionality which supports mobile free hydrogen atoms and a functionality which can be a source of the energy holes. The energy reactor includes one of an electrolytic cell, a pressurized hydrogen gas cell, and a hydrogen gas discharge cell.

A preferred pressurized hydrogen gas energy reactor comprises a vessel; a source of hydrogen; a means to control the pressure and flow of hydrogen into the vessel; a material to dissociate the molecular hydrogen into atomic hydrogen, and a material which can be a source of energy holes in the gas phase. The gaseous source of energy holes includes those that sublime, boil, and/or are volatile at the elevated operating temperature of the gas energy reactor wherein the shrinkage reaction occurs in the gas phase.

The present invention further comprises methods and apparatuses for repeating a shrinkage reaction according to the present invention to cause energy release and to provide shrunken atoms and molecules with novel properties such as high thermal stability, and low reactivity. The lower-energy state atoms and molecules are useful for heat transfer, cryogenic applications, as a buoyant gas. as a medium in an engine such as a Sterling engine or a turbine, as a general replacement for helium, and as a refrigerant by absorbing energy including heat energy as the electrons are excited back to a higher energy level.

Below "Ground State" Transitions of Hydrogen Atoms

A novel atomic theory is disclosed in Mills, R., *The Grand Unified Theory of Classical Quantum Mechanics*, (1995), Technomic Publishing Company, Lancaster, Pa. provided by HydroCatalysis Power Corporation, Great Valley Corporate Center, 41 Great Valley Parkway, Malvern, Pa. 19355; *The Unification of Spacetime, the Forces, Matter, and Energy*, Mills, R., Technomic Publishing Company, Lancaster, Pa., (1992); *The Grand Unified Theory*, Mills, R. and Farrell, J., Science Press, Ephrata, Pa., (1990); Mills, R., Kneizys, S., Fusion Technology, 210, (1991), pp. 65–81; Mills, R., Good, W., Shaubach, R., "Dihydrino Molecule Identification", Fusion Technology, 25, 103 (1994); Mills, R., Good, W., "Fractional Quantum Energy Levels of Hydrogen", Fusion Technology, Vol. 28. No. 4, November, (1995), pp. 1697–1719, and in my previous U.S. patent applications entitled "Energy/Matter Conversion Methods and Structures", Ser. No. 08/467,051 filed on Jun. 6, 1995 which is a continuation-in-part application of Ser. No. 08/416,040 filed on Apr. 3, 1995 which is a continuation-in-part application of Ser. No. 08/107,357 filed on Aug. 16, 1993, which is a continuation-in-part application of Ser. No. 08/075,102 (Dkt. 99437) filed on Jun. 11, 1993, which is a continuation-in-part application of Ser. No. 07/626,496 filed on Dec. 12, 1990 which is a continuation-in-part application of Ser. No. 07/345,628 filed Apr. 28, 1989 which is a continuation-in-part application of Ser. No. 07/341,733 filed Apr. 21, 1989 which are all incorporated herein by this reference.

Fractional Quantum Energy Levels of Hydrogen

A number of experimental observations given in the Experimental Section below lead to the conclusion that atomic hydrogen can exist in fractional quantum states that are at lower energies than the traditional "ground" (n=1) state. For example, existence of fractional-quantum-energy-level hydrogen atoms, hereafter called hydrinos, provides an explanation for the soft X-ray emissions of the dark interstellar medium observed by Labov and Bowyer [S. Labov and S. Bowyer, Astrophysical Journal, 371 (1991) 810] and an explanation for the soft X-ray emissions of the Sun [Thomas, R. J., Neupert, W., M., Astrophysical Journal Supplement Series, Vol. 91, (1994), pp. 461–482; Malinovsky, M., Heroux, L., Astrophysical Journal, Vol. 181, (1973), pp. 1009–1030; Noyes, R., *The Sun, Our Star*, Harvard University Press, Cambridge, Ma., (1982), p. 172; Phillips, J. H., *Guide to the Sun*, Cambridge University Press, Cambridge, Great Britain, (1992), pp. 118–119; 120–121; 144–145].

J. J. Balmer showed in 1885 that the frequencies for some of the lines observed in the emission spectrum of atomic hydrogen could be expressed with a completely empirical relationship. This approach was later extended by J. R. Rydberg, who showed that all of the spectral lines of atomic hydrogen were given by the equation:

$$\bar{v} = R\left(\frac{1}{n_f^2} - \frac{1}{n_i^2}\right) \quad (1)$$

where R=109,677 cm$^{-1}$, $n_f$=1,2,3, ... , $n_i$=2,3,4, ... , and $n_i > n_f$. Niels Bohr, in 1913, developed a theory for atomic hydrogen that gave energy levels in agreement with Rydberg's equation. An identical equation, based on a totally different theory for the hydrogen atom, was developed by E. Schrödinger, and independently by W. Heisenberg, in 1926.

$$E_n = -\frac{e^2}{n^2 8\pi\varepsilon_o a_H} = -\frac{13.598 \text{ eV}}{n^2} \quad (2a)$$

$$n = 1, 2, 3, ... \quad (2b)$$

where $a_H$ is the Bohr radius for the hydrogen atom (52.947 pm), e is the magnitude of the charge of the electron, and $\varepsilon_o$ is the vacuum permittivity. Mills' theory predicts that Eq. (2b), should be replaced by Eq. (2c).

$$n = 1, 2, 3, ..., \text{ and, } n = \frac{1}{2}, \frac{1}{3}, \frac{1}{4}, ... \quad (2c)$$

The quantum number n=1 is routinely used to describe the "ground" electronic state of the hydrogen atom. Mills [Mills, R., *The Grand Unified Theory of Classical Quantum Mechanics*, (1995), Technomic Publishing Company, Lancaster, Pa.] in a recent advancement of quantum mechanics has shown that the n=1 state is the "ground" state for "pure" photon transitions (the n=1 state can absorb a photon and go to an excited electronic state, but it cannot release a photon and go to a lower-energy electronic state). However, an electron transition from the ground state to a lower-energy state is possible by a "resonant collision" mechanism. These lower-energy states have fractional quantum numbers, $$n = \frac{1}{\text{integer}}.$$

Processes that occur without photons and that require collisions are common. For example, the exothermic chemical reaction of H+H to form $H_2$ does not occur with the emission of a photon. Rather, the reaction requires a collision with a third body, M, to remove the bond energy–H+H+M→$H_2$+M. The third body distributes the energy from the exothermic reaction, and the end result is the $H_2$ molecule and an increase in the temperature of the system. Similarly, the n=1 state of hydrogen and the $$n = \frac{1}{\text{integer}}$$

states of hydrogen are nonradiative, but a transition between two nonradiative states is possible via a resonant collision, say n=1 to n=½. In these cases, during the collision the electron couples to another electron transition or electron transfer reaction which can absorb the exact amount of energy that must be removed from the hydrogen atom, a resonant energy sink called an energy hole. The end result is a lower-energy state for the hydrogen and increase in temperature of the system.

Wave Equation Solutions of the Hydrogen Atom

Recently, Mills [Mills, R., *The Grand Unified Theory of Classical Quantum Mechanics*, (1995), Technomic Publishing Company, Lancaster, Pa.] has built on the work generally known as quantum mechanics by deriving a new atomic theory based on first principles. The novel theory hereafter referred to as Mills' theory unifies Maxwell's Equations, Newton's Laws, and Einstein's General and Special Relativity. The central feature of this theory is that all particles (atomic-size and macroscopic particles) obey the same physical laws. Whereas Schrödinger postulated a boundary condition: Ψ→0 as r→∞, the boundary condition in Mills' theory was derived from Maxwell's equations [Haus, H. A., "On the radiation from point charges", American Journal of Physics, 54, (1986), pp. 1126–1129.]:

For non-radiative states, the current-density function must not possess space-time Fourier components that are synchronous with waves traveling at the speed of light. Application of this boundary condition leads to a physical model of particles, atoms, molecules, and, in the final analysis, cosmology. The closed-form mathematical solutions contain fundamental constants only, and the calculated values for physical quantities agree with experimental observations. In addition, the theory predicts that Eq. (2b), should be replaced by Eq. (2c).

Bound electrons are described by a charge-density (mass-density) function which is the product of a radial delta function ($f(r)=\delta(r-r_n)$), two angular functions (spherical harmonic functions), and a time harmonic function. Thus, an electron is a spinning, two-dimensional spherical surface, hereafter called an electron orbitsphere, that can exist in a bound state at only specified distances from the nucleus. More explicitly, the orbitsphere comprises a two dimensional spherical shell of moving charge. The corresponding current pattern of the orbitsphere comprises an infinite series of correlated orthogonal great circle current loops. The current pattern (shown in FIG. 1.4 of Mills [Mills, R., *The Grand Unified Theory of Classical Quantum Mechanics*, (1995), Technomic Publishing Company, Lancaster, Pa.]) is generated over the surface by two orthogonal sets of an infinite series of nested rotations of two orthogonal great circle current loops where the coordinate axes rotate with the two orthogonal great circles. Each infinitesimal rotation of the infinite series is about the new x-axis and new y-axis which results from the preceding such rotation. For each of the two sets of nested rotations, the angular sum of the rotations about each rotating x-axis and y-axis totals $\sqrt{2}\,\pi$ radians. The current pattern gives rise to the phenomenon corresponding to the spin quantum number.

The total function that describes the spinning motion of each electron orbitsphere is composed of two functions. One function, the spin function, is spatially uniform over the orbitsphere, spins with a quantized angular velocity, and gives rise to spin angular momentum. The other function, the modulation function, can be spatially uniform—in which case there is no orbital angular momentum and the magnetic moment of the electron orbitsphere is one Bohr magneton—or not spatially uniform—in which case there is orbital angular momentum. The modulation function also rotates with a quantized angular velocity. Numerical values for the angular velocity, radii of allowed orbitspheres. energies, and associated quantities are calculated by Mills.

Orbitsphere radii are calculated by setting the centripetal force equal to the electric and magnetic forces.

The orbitsphere is a resonator cavity which traps photons of discrete frequencies. The radius of an orbitsphere increases with the absorption of electromagnetic energy. The solutions to Maxwell's equations for modes that can be excited in the orbitsphere resonator cavity give rise to four quantum numbers, and the energies of the modes are the experimentally known hydrogen spectrum.

Excited states are unstable because the charge-density function of the electron plus photon have a radial doublet function component which corresponds to an electric dipole. The doublet possesses spacetime Fourier components synchronous with waves traveling at the speed of light; thus it is radiative. The charge-density function of the electron plus photon for the n=1 principle quantum state of the hydrogen atom as well as for each of the $$n = \frac{1}{\text{integer}}$$

states mathematically is purely a radial delta function. The delta function does not possess spacetime Fourier components synchronous with waves traveling at the speed of light; thus, each is nonradiative.

Catalytic Lower-energy Hydrogen Electronic Transitions

Comparing transitions between below "ground" (fractional quantum) energy states as opposed to transitions between excited (integer quantum) energy states, it can be appreciated that the former are not effected by photons; whereas, the latter are. Transitions are symmetric with respect to time. Current density functions which give rise to photons according to the nonradiative boundary condition of Mills [Mills, R., *The Grand Unified Theory of Classical Quantum Mechanics*, (1995), Technomic Publishing Company, Lancaster, Pa.] are created by photons in the reverse process. Excited (integer quantum) energy states correspond to this case. And, current density functions which do not give rise to photons according to the nonradiative boundary condition are not created by photons in the reverse process. Below "ground" (fractional quantum) energy states correspond to this case. But, atomic collisions can cause a stable state to undergo a transition to the next stable state. The transition between two stable nonradiative states effected by a collision with an resonant energy sink is analogous to the reaction of two atoms to form a diatomic molecule which requires a third-body collision to remove the bond energy [N. V. Sidgwick, *The Chemical Elements and Their Compounds*, Volume I, Oxford, Clarendon Press, (1950), p. 17].

Energy Hole Concept

The nonradiative boundary condition of Mills and the relationship between the electron and the photon give the "allowed" hydrogen energy states which are quantized as a function of the parameter n. Each value of n corresponds to an allowed transition effected by a resonant photon which excites the electronic transition. In addition to the traditional integer values (1, 2, 3, . . . ,) of n, values of fractions are allowed which correspond to transitions with an increase in the central field (charge) and decrease in the size of the hydrogen atom. This occurs, for example, when the electron couples to another electronic transition or electron transfer reaction which can absorb energy, an energy sink. This is the absorption of an energy hole. The absorption of an energy hole destroys the balance between the centrifugal force and the increased central electric force. As a result, the electron undergoes a transition to a lower energy nonradiative state.

From energy conservation, the resonance energy hole of a hydrogen atom which excites resonator modes of radial dimensions $$\frac{a_H}{m+1}$$

is $$m \times 27.2 \text{ eV where } m=1,2,3,4,\ldots \tag{3}$$

After resonant absorption of the energy hole, the radius of the orbitsphere, $a_H$, shrinks to $$\frac{a_H}{m+1}$$

and after p cycles of resonant shrinkage, the radius is $$\frac{a_H}{mp+1}.$$

In other words, the radial ground state field can be considered as the superposition of Fourier components. The removal of negative Fourier components of energy mX27.2 eV, where m is an integer increases the positive central electric field inside the spherical shell by m times the charge of a proton. The resultant electric field is a time-harmonic solution of Laplace's Equations in spherical coordinates. In this case, the radius at which force balance and nonradiation are achieved is $$\frac{a_H}{m+1}$$

where m is an integer. In decaying to this radius from the "ground" state, a total energy of $[(m+1)^2-1^2] \times 13.6$ eV is released. The transition between two stable nonradiative states effected by a collision with an energy hole is analogous to the reaction of two atoms to form a diatomic molecule which requires a third body collision to remove the bond energy [N. V. Sidgwick, *The Chemical Elements and Their Compounds*, Volume I, Oxford, Clarendon Press, (1950), p. 17]. The total energy well of the hydrogen atom is shown in FIG. 1. The exothermic reaction involving transitions from one potential energy level to a lower level is hereafter referred to as HydroCatalysis.

A hydrogen atom with its electron in a lower than "ground state" energy level corresponding to a fractional quantum number is hereafter referred to as a hydrino atom. The designation for a hydrino atom of radius $$\frac{a_o}{p}$$

where p is an integer is $$H\left[\frac{a_o}{p}\right].$$

The size of the electron orbitsphere as a function of potential energy is given in FIG. 2.

An efficient catalytic system that hinges on the coupling of three resonator cavities involves potassium. For example, the second ionization energy of potassium is 31.63 eV. This energy hole is obviously too high for resonant absorption. However, $K^+$ releases 4.34 eV when it is reduced to K. The combination of $K^+$ to $K^{2+}$ and $K^+$ to K, then, has a net energy change of 27.28 eV.

$$27.28 \text{ eV} + K^+ + K^+ + H\left[\frac{a_H}{p}\right] \rightarrow \qquad (4)$$
$$K + K^{2+} + H\left[\frac{a_H}{(p+1)}\right] + [(p+1)^2 - p^2] \times 13.6 \text{ eV}$$

$$K + K^{2+} \rightarrow K^+ + K^+ + 27.28 \text{ eV} \qquad (5)$$

And, the overall reaction is $$H\left[\frac{a_H}{p}\right] \rightarrow H\left[\frac{a_H}{(p+1)}\right] + [(p+1)^2 - p^2] \times 13.6 \text{ eV} \qquad (6)$$

Note that the energy given off as the atom shrinks is much greater than the energy lost to the energy hole. Also, the energy released is large compared to conventional chemical reactions.

Disproportionation of Energy States

Lower-energy hydrogen atoms, hydrinos, can act as a source of energy holes that can cause resonant shrinkage because the excitation and/or ionization energies are $m \times 27.2$ eV (Eq. (3)). For example, the equation for the absorption of an energy hole of 27.21 eV, m=1 in Eq. (3), during the shrinkage cascade for the third cycle of the hydrogen-type atom, $$H\left[\frac{a_H}{3}\right],$$

with the hydrogen-type atom, $$H\left[\frac{a_H}{2}\right],$$

that is ionized as the source of energy holes that cause resonant shrinkage is represented by $$27.21 \text{ eV} + H\left[\frac{a_H}{2}\right] + H\left[\frac{a_H}{3}\right] \rightarrow \qquad (7)$$
$$H^+ + e^- + H\left[\frac{a_H}{4}\right] + [4^2 - 3^2] \times 13.6 \text{ eV} - 27.21 \text{ eV}$$

$$H^+ + e^- \rightarrow H\left[\frac{a_H}{1}\right] + 13.6 \text{ eV} \qquad (8)$$

And, the overall reaction is $$H\left[\frac{a_H}{2}\right] + H\left[\frac{a_H}{3}\right] \rightarrow \qquad (9)$$
$$H\left[\frac{a_H}{1}\right] + H\left[\frac{a_H}{4}\right] + [4^2 - 3^2 - 4] \times 13.6 \text{ eV} + 13.6 \text{ eV}$$

The general equation for the absorption of an energy hole of 27.21 eV, m=1 in Eq. (3), during the shrinkage cascade for the pth cycle of the hydrogen-type atom, $$H\left[\frac{a_H}{p}\right],$$

with the hydrogen-type atom, $$H\left[\frac{a_H}{m'}\right],$$

that is ionized as the source of energy holes that cause resonant shrinkage is represented by $$27.21 \text{ eV} + H\left[\frac{a_H}{m'}\right] + H\left[\frac{a_H}{p}\right] \rightarrow H^+ + e^- + \qquad (10)$$
$$H\left[\frac{a_H}{(p+1)}\right] + [(p+1)^2 - p^2] \times 13.6 \text{ eV} - (m'^2 - 2) \times 13.6 \text{ eV}$$

$$H^+ + e^- \rightarrow H\left[\frac{a_H}{1}\right] + 13.6 \text{ eV} \qquad (11)$$

And, the overall reaction is $$H\left[\frac{a_H}{m'}\right] + H\left[\frac{a_H}{p}\right] \rightarrow \qquad (12)$$
$$H\left[\frac{a_H}{1}\right] + H\left[\frac{a_H}{(p+1)}\right] + [2p + 1 - m'^2] \times 13.6 \text{ eV} + 13.6 \text{ eV}$$

Transitions to nonconsecutive energy levels involving the absorption of an energy hole of an integer multiple of 27.21 eV are possible. Lower-energy hydrogen atoms, hydrinos, can act as a source of energy holes that can cause resonant shrinkage with the absorption of an energy hole of $m \times 27.2$ eV (Eq. (3)). Thus, the shrinkage cascade for the pth cycle of the hydrogen-type atom, $$H\left[\frac{a_H}{p}\right],$$

with the hydrogen-type atom, $$H\left[\frac{a_H}{m'}\right],$$

that is ionized as the source of energy holes that cause resonant shrinkage is represented by $$m \times 27.21 \text{ eV} + H\left[\frac{a_H}{m'}\right] + H\left[\frac{a_H}{p}\right] \rightarrow \qquad (13)$$

$$H^+ + e^- + H\left[\frac{a_H}{(p+m)}\right] + [(p+m)^2 - p^2 - (m'^2 - 2m)] \times 13.6 \text{ eV}$$

$$H^+ + e^- \rightarrow H\left[\frac{a_H}{1}\right] + 13.6 \text{ eV} \qquad (14)$$

And, the overall reaction is $$H\left[\frac{a_H}{m'}\right] + H\left[\frac{a_H}{p}\right] \rightarrow \qquad (15)$$

$$H\left[\frac{a_H}{1}\right] + H\left[\frac{a_H}{(p+m)}\right] + [2pm + m^2 - m'^2] \times 13.6 \text{ eV} + 13.6 \text{ eV}$$

Hydrogen is a source of energy holes. The ionization energy of hydrogen is 13.6 eV. Disproportionation can occur between three hydrogen atoms whereby two atoms provide an energy hole of 27.21 eV for the third hydrogen atom. Thus, the shrinkage cascade for the pth cycle of the hydrogen-type atom, $$H\left[\frac{a_H}{p}\right],$$

with two hydrogen atoms, $$H\left[\frac{a_H}{1}\right],$$

as the source of energy holes that cause resonant shrinkage is represented by $$27.21 \text{ eV} + 2H\left[\frac{a_H}{1}\right] + H\left[\frac{a_H}{p}\right] \rightarrow \qquad (16)$$

$$2H^+ + 2e^- + H\left[\frac{a_H}{(p+1)}\right] + [(p+1)^2 - p^2] \times 13.6 \text{ eV}$$

$$2H^+ + 2e^- \rightarrow 2H\left[\frac{a_H}{1}\right] + 27.21 \text{ eV} \qquad (17)$$

And, the overall reaction is $$H\left[\frac{a_H}{p}\right] \rightarrow H\left[\frac{a_H}{(p+1)}\right] + [(p+1)^2 - p] \times 13.6 \text{ eV} \qquad (18)$$

The spectral lines from dark interstellar medium and the majority of the solar power can be attributed to disproportionation reactions as given in the Spectral Data of Hydrinos from the Dark Interstellar Medium and from the Sun Section of Mills [Mills, R., *The Grand Unified Theory of Classical Quantum Mechanics*, (1995), Technomic Publishing Company, Lancaster, Pa.]. This assignment resolves the mystery of dark matter, the solar neutrino problem, and the mystery of the cause of sunspots and other solar activity and why the Sun emits X-rays. It also provides the reason for the abrupt change in the speed of sound and transition from "radiation zone" to "convection zone" at a radius of 0.7 the solar radius, 0.7 $R_s$ as summarized in Example 4 below.

Energy Hole (Atomic Hydrogen)

In a preferred embodiment, energy holes, each of approximately 27.21 eV, are provided by electron transfer reactions of reactants including electrochemical reactant(s) (electrocatalytic ion(s) or couple(s)) which cause heat to be released from hydrogen atoms as their electrons are stimulated to relax to quantized potential energy levels below that of the "ground state". The energy removed by an electron transfer reaction, energy hole, is resonant with the hydrogen energy released to stimulate this transition. The source of hydrogen atoms can be the production on the surface of a cathode during electrolysis of water in the case of an electrolytic energy reactor and hydrogen gas or a hydride in the case of a pressurized gas energy reactor or gas discharge energy reactor.

Below "Ground State" Transitions of Hydrogen-type Molecules and Molecular Ions

Two hydrogen atoms react to form a diatomic molecule, the hydrogen molecule.

$$2H[a_H] \rightarrow H_2[2c' = \sqrt{2}\,a_o] \qquad (19)$$

where 2c' is the internuclear distance. Also, two hydrino atoms react to form a diatomic molecule, hereafter called a dihydrino molecule.

$$2H\left[\frac{a_H}{p}\right] \rightarrow H_2^*\left[2c' = \frac{\sqrt{2}\,a_o}{p}\right] \qquad (20)$$

where p is an integer.

The central force equation for hydrogen-type molecules has orbital solutions which are circular, elliptic, parabolic, or hyperbolic. The former two types of solutions are associated with atomic and molecular orbitals. These solutions are nonradiative if the boundary condition for nonradiation given in the One Electron Atom Section of *The Unification of Spacetime, the Forces, Matter, and Energy*, Mills, R., Technomic Publishing Company, Lancaster, Pa., (1992), is met. The mathematical formulation for zero radiation is that the function that describes the motion of the electron must not possess space-time Fourier components that are synchronous with waves traveling at the speed of light. The boundary condition for the orbitsphere is met when the angular frequencies are $$\omega_n = \frac{\hbar}{m_e r_n^2} \qquad (21)$$

As demonstrated in the One Electron Atom Section of *The Unification of Spacetime, the Forces, Matter, and Energy*, Mills, R., Technomic Publishing Company, Lancaster, Pa., (1992), this condition is met for the product function of a radial Dirac delta function and a time harmonic function where the angular frequency, ω, is constant and given by Eq. (21).

$$\omega_n = \frac{\hbar}{m_e r_n^2} = \frac{\pi L}{\frac{m_e}{A}} \quad (22)$$

where L is the angular momentum and A is the area of the closed geodesic orbit. Consider the solution of the central force equation comprising the product of a two dimensional ellipsoid and a time harmonic function. The spatial part of the product function is the convolution of a radial Dirac delta function with the equation of an ellipsoid. The Fourier transform of the convolution of two functions is the product of the individual Fourier transforms of the functions: thus, the boundary condition is met for an ellipsoidal-time harmonic function when $$\omega_n = \frac{\pi\hbar}{m_e A} = \frac{\hbar}{m_e ab} \quad (23)$$

where the area of an ellipse is $$A = \pi ab \quad (24)$$

where 2b is the length of the semiminor axis and 2a is the length of the semimajor axis. The geometry of molecular hydrogen is elliptic with the internuclear axis as the principle axis; thus, the electron orbital is a two dimensional ellipsoidal-time harmonic function. The mass follows geodesics time harmonically as determined by the central field of the protons at the foci. Rotational symmetry about the internuclear axis further determines that the orbital is a prolate spheroid. In general, ellipsoidal orbits of molecular bonding, hereafter referred to as ellipsoidal molecular orbitals (M. O.'s), have the general equation $$\frac{x^2}{a^2} + \frac{y^2}{b^2} + \frac{z^2}{c^2} = 1 \quad (25)$$

The semiprinciple axes of the ellipsoid are a, b, c.

In ellipsoidal coordinates the Laplacian is $$(\eta - \zeta)R_\xi \frac{\delta}{\delta\xi}\left(R_\xi \delta \frac{\phi}{\delta\xi}\right) + \\ (\zeta - \xi)R_\eta \frac{\delta}{\delta\eta}\left(R_\eta \delta \frac{o}{\delta\eta}\right) + (\xi - \eta)R_\zeta \frac{\delta}{\delta\zeta}\left(R_\zeta \delta \frac{\phi}{\delta\zeta}\right) = 0 \quad (26)$$

An ellipsoidal M. O. is equivalent to a charged conductor whose surface is given by Eq. (25). It carries a total charge q, and it's potential is a solution of the Laplacian in ellipsoidal coordinates, Eq. (26).

Excited states of orbitspheres are discussed in the Excited States of the One Electron Atom (Quantization) Section of *The Unification of Spacetime, the Forces, Matter, and Energy*, Mills, R., Technomic Publishing Company, Lancaster, Pa., (1992). In the case of ellipsoidal M. O.'s, excited electronic states are created when photons of discrete frequencies are trapped in the ellipsoidal resonator cavity of the M. O. The photon changes the effective charge at the M. O. surface where the central field is ellipsoidal. Force balance is achieved at a series of ellipsoidal equipotential two dimensional surfaces confocal with the ground state ellipsoid. The trapped photons are solutions of the Laplacian in ellipsoidal coordinates, Eq. (26).

As is the case with the orbitsphere, higher and lower energy states are equally valid. The photon standing wave in both cases is a solution of the Laplacian in ellipsoidal coordinates. For an ellipsoidal resonator cavity, the relationship between an allowed circumference, 4aE, and the photon standing wavelength, λ, is $$4aE = n\lambda \quad (27)$$

where n is an integer and where $$k = \frac{\sqrt{a^2 - b^2}}{a} \quad (28)$$

is used in the elliptic integral E of Eq. (27). Applying Eqs. (27) and (28), the relationship between an allowed angular frequency given by Eq. (23) and the photon standing wave angular frequency, ω, is:

$$\frac{\pi\hbar}{m_e A} = \frac{\hbar}{m_e n a_1 n b_1} = \frac{\hbar}{m_e a_n b_n} = \frac{1}{n^2}\omega_1 = \omega_n \quad (29)$$

where n=1,2,3,4, . . .

$$n = \frac{1}{2}, \frac{1}{3}, \frac{1}{4}, \dots$$

$\omega_1$ is the allowed angular frequency for n=1 $a_1$ and $b_1$ are the allowed semimajor and semiminor axes for n=1

From Eq. (29), the magnitude of the elliptic field corresponding to a below "ground state" transition of the hydrogen molecule is an integer. The potential energy equations of hydrogen-type molecules are $$V_e = \frac{-2pe^2}{8\pi\varepsilon_o\sqrt{a^2 - b^2}} \ln\frac{a + \sqrt{a^2 - b^2}}{a - \sqrt{a^2 - b^2}} \quad (30)$$

$$V_p = \frac{p}{8\pi\varepsilon_o} \frac{e^2}{\sqrt{a^2 - b^2}} \quad (31)$$

where $$a = \frac{a_o}{p} \quad (32)$$

$$b = \frac{1}{p\sqrt{2}} a_o \quad (33)$$

$$c' = \sqrt{a^2 - b^2} = \frac{\sqrt{2} a_o}{2p} \quad (34)$$

and where p is an integer. From energy conservation, the resonance energy hole of a hydrogen-type molecule which causes the transition $$H_2^*\left[2c' = \frac{\sqrt{2} a_o}{p}\right] \rightarrow H_2^*\left[2c' = \frac{\sqrt{2} a_o}{p+m}\right] \quad (35)$$

where m and p are integers. During the transition, the elliptic field is increased from magnitude p to magnitude p+m. The corresponding potential energy change equals the energy absorbed by the energy hole.

Energy hole=$-V_e-V_p$=mp$^2$X48.6 eV (37)

Further energy is released by the hydrogen-type molecule as the internuclear distance "shrinks". The total energy, $E_T$, released during the transition is $$E_T = -13.6 \text{ eV} \left[ \left( 2(m+p)^2 \sqrt{2} - (m+p)^2 \sqrt{2} + \frac{(m+p)^2 \sqrt{2}}{2} \right) \ln \frac{\sqrt{2}+1}{\sqrt{2}-1} - (m+p)^2 \sqrt{2} \right] + \tag{38}$$

$$13.6 \text{ eV} \left[ \left( 2p^2 \sqrt{2} - p^2 \sqrt{2} + \frac{p^2 \sqrt{2}}{2} \right) \ln \frac{\sqrt{2}+1}{\sqrt{2}-1} - p^2 \sqrt{2} \right]$$

A schematic drawing of the total energy well of hydrogen-type molecules and molecular ions is given in FIG. 3. The exothermic reaction involving transitions from one potential energy level to a lower level below the "ground state" is also hereafter referred to as HydroCatalysis.

A hydrogen-type molecule with its electrons in a lower than "ground state" energy level corresponding to a fractional quantum number is hereafter referred to as a dihydrino molecule. The designation for a dihydrino molecule of internuclear distance, $$2c' = \frac{\sqrt{2} a_o}{p}$$

where p is an integer, is $$H_2^* \left[ 2c' = \frac{\sqrt{2} a_o}{p} \right].$$

A schematic drawing of the size of hydrogen-type molecules as a function of total energy is given in FIG. 4.

The magnitude of the elliptic field corresponding to the first below "ground state" hydrogen-type molecule is 2. From energy conservation, the resonance energy hole of a hydrogen molecule which excites the transition of the hydrogen molecule with internuclear distance $$2c' = \sqrt{2} a_o$$

to the first below "ground state" with internuclear distance $$2c' = \frac{1}{\sqrt{2}} a_o$$

is given by Eqs. (30) and (31) where the elliptic field is increased from magnitude one to magnitude two:

$$V_e = \frac{-2e^2}{8\pi\varepsilon_o \sqrt{a^2-b^2}} \ln \frac{a+\sqrt{a^2-b^2}}{a-\sqrt{a^2-b^2}} = -67.813 \text{ eV} \tag{39}$$

$$V_p = \frac{e^2}{8\pi\varepsilon_o \sqrt{a^2-b^2}} = 19.23 \text{ eV} \tag{40}$$

Energy hole $= -V_e - V_p = m \times 48.6 \text{ eV}$ \tag{41}

In other words, the ellipsoidal "ground state" field of the hydrogen molecule can be considered as the superposition of Fourier components. The removal of negative Fourier components of energy $$m \times 48.6 \text{ eV} \tag{42}$$

where m is an integer, increases the positive electric field inside the ellipsoidal shell by m times the charge of a proton at each focus. The resultant electric field is a time harmonic solution of the Laplacian in ellipsoidal coordinates. The hydrogen molecule with internuclear distance $$2c' = \sqrt{2} a_o$$

is caused to undergo a transition to a below "ground state" level, and the internuclear distance for which force balance and nonradiation are achieved is $$2c' = \frac{\sqrt{2} a_o}{1+m}.$$

In decaying to this internuclear distance from the "ground state", a total energy of $$E_T = -13.6 \text{ eV} \left[ \left( 2(1+m)^2 \sqrt{2} - (1+m)^2 \sqrt{2} + \frac{(1+m)^2 \sqrt{2}}{2} \right) \ln \frac{\sqrt{2}+1}{\sqrt{2}-1} - (1+m)^2 \sqrt{2} \right] + \tag{43}$$

$$13.6 \text{ eV} \left[ \left( 2\sqrt{2} - \sqrt{2} + \frac{\sqrt{2}}{2} \right) \ln \frac{\sqrt{2}+1}{\sqrt{2}-1} - \sqrt{2} \right]$$

is released.

Energy Hole (Molecular Hydrogen)

In a preferred embodiment, energy holes, each of approximately mX48.6 eV, are provided by electron transfer reactions of reactants including electrochemical reactant(s) (electrocatalytic ion(s) or couple(s)) which cause heat to be released from hydrogen molecules as their electrons are stimulated to relax to quantized potential energy levels below that of the "ground state". The energy removed by an electron transfer reaction, energy hole, is resonant with the hydrogen energy released to stimulate this transition. The source of hydrogen molecules can be the production on the surface of a cathode during electrolysis of water in the case of an electrolytic energy reactor and hydrogen gas or a hydride in the case of a pressurized gas energy reactor or gas discharge energy reactor.

Energy Reactor

The present invention of an electrolytic cell energy reactor, pressurized gas energy reactor, and a gas discharge energy reactor, comprises: a source of hydrogen; one of a solid, molten, liquid, and gaseous source of energy holes; a vessel containing hydrogen and the source of energy holes wherein the shrinkage reaction occurs by contact of the hydrogen with the source of energy holes; and a means for removing the (molecular) lower-energy hydrogen so as to prevent the exothermic shrinkage reaction from coming to equilibrium. The shrinkage reaction rate and net power output are increased by conforming the energy hole to match the resonance shrinkage energy. In general, power output can be optimized by controlling the temperature, pressure of the hydrogen gas, the source of the energy hole including the electrocatalytic ion or couple which provides the energy hole, the counterion of the electrocatalytic ion or couple, and the area of the surface on which the shrinkage reaction occurs. The present invention further comprises a hydrogen spillover catalyst, a multifunctionality material having a functionality which dissociates molecular hydrogen to provide free hydrogen atoms which spill over to a functionality which supports mobile free hydrogen atoms and a functionality which can be a source of the energy holes.

A preferred pressurized hydrogen gas energy reactor comprises a vessel; a source of hydrogen; a means to control the pressure and flow of hydrogen into the vessel; a material to dissociate the molecular hydrogen into atomic hydrogen, and a material which can be a source of energy holes in the gas phase. The gaseous source of energy holes includes those that sublime, boil, and/or are volatile at the elevated operating temperature of the gas energy reactor wherein the shrinkage reaction occurs in the gas phase.

Other objects, features, and characteristics of the present invention, as well as the methods of operation and the functions of the related elements, will become apparent upon consideration of the following description and the appended claims with reference to the accompanying drawings, all of which form a part of this specification, wherein like reference numerals designate corresponding parts in the various figures.

Figure 1:
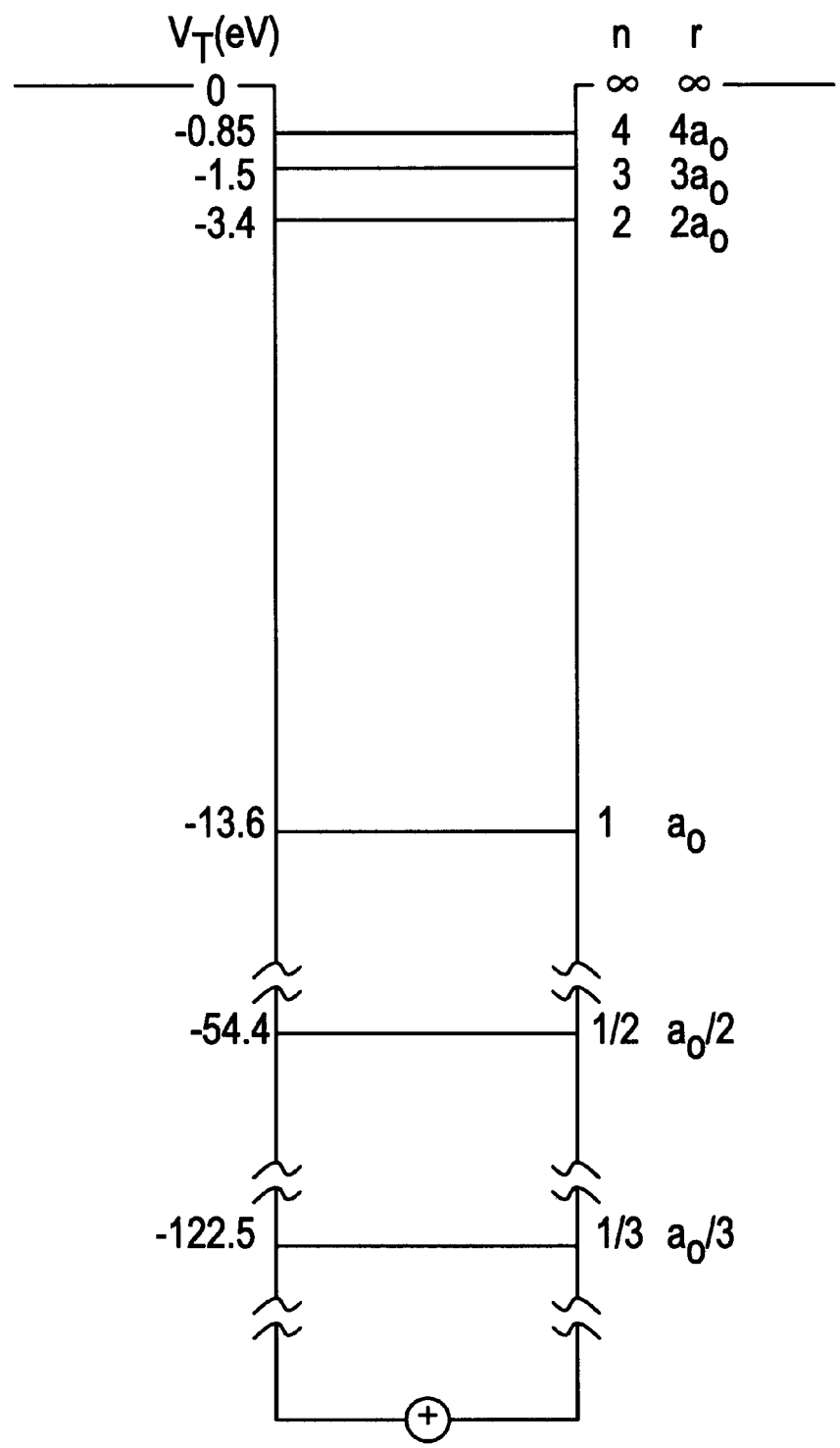
FIG. 1 is a schematic drawing of the total energy well of the hydrogen atom.
Figure 2:
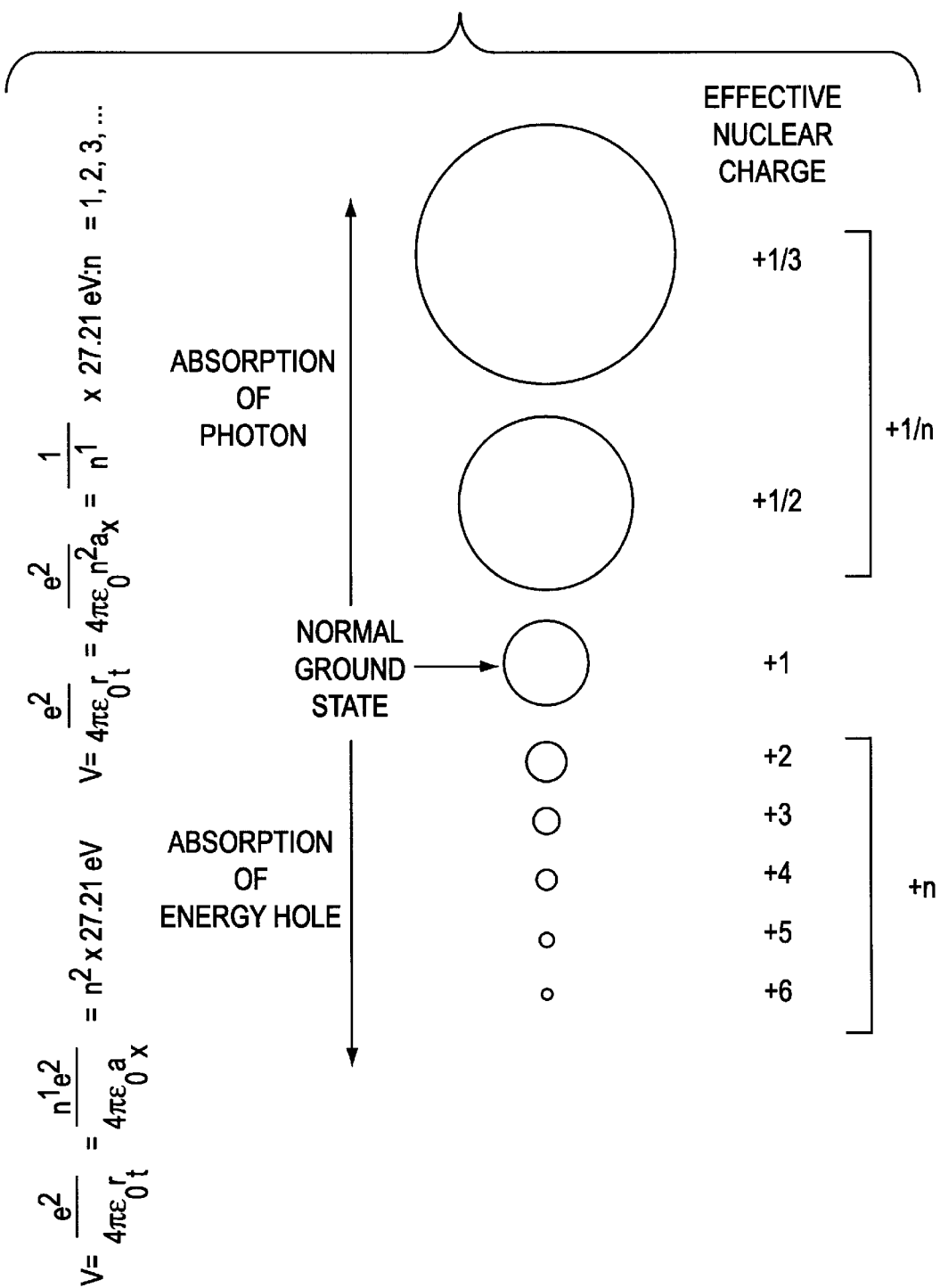
FIG. 2 is a schematic drawing of the size of electron orbitspheres as a function of potential energy.
Figure 3:
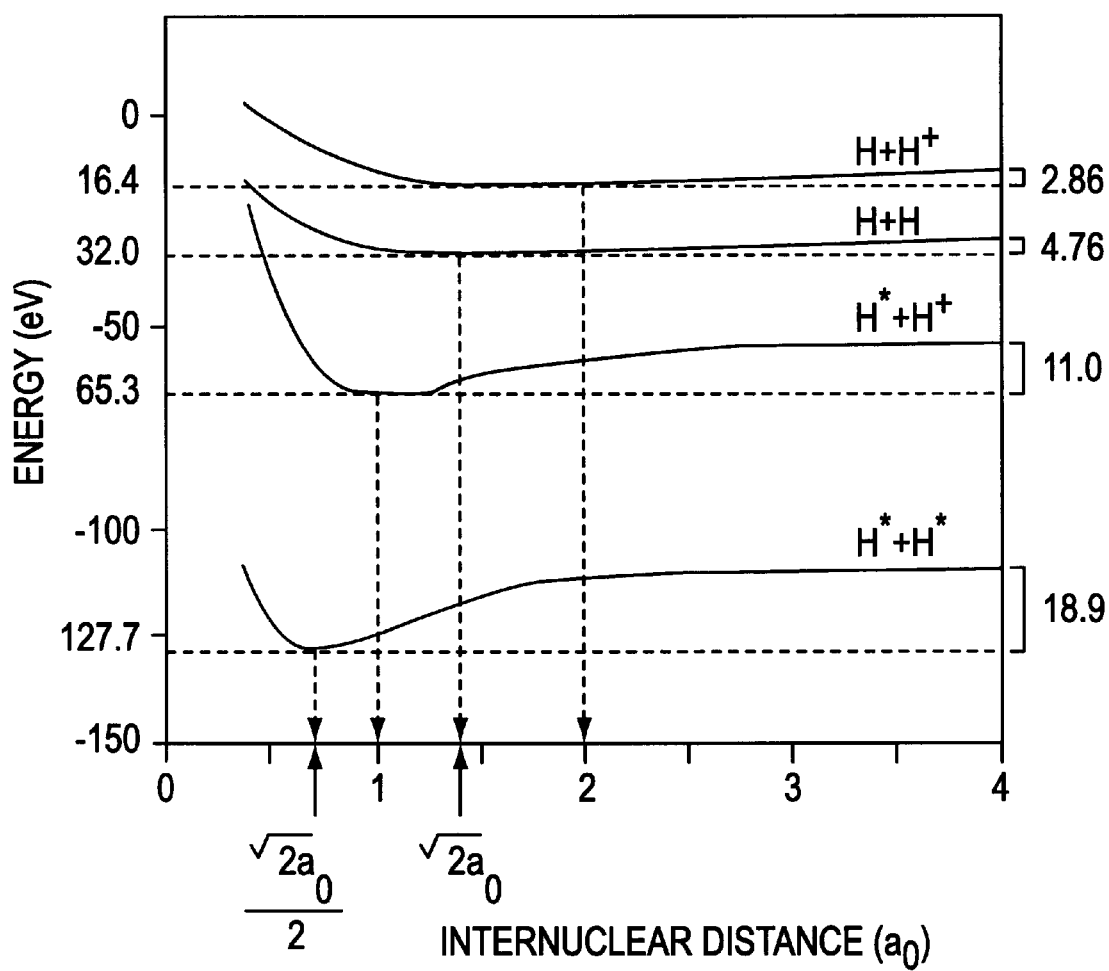
FIG. 3 is a schematic drawing of the total energy wells of the hydrogen molecule, $H_2[2c'=\sqrt{2}a_o]$, the hydrogen molecular ion, $H_2[2c'=2a_o]^+$, the dihydrino molecule, $$H_2^*\left[2c' = \frac{a_o}{\sqrt{2}}\right],$$
Figure 4:
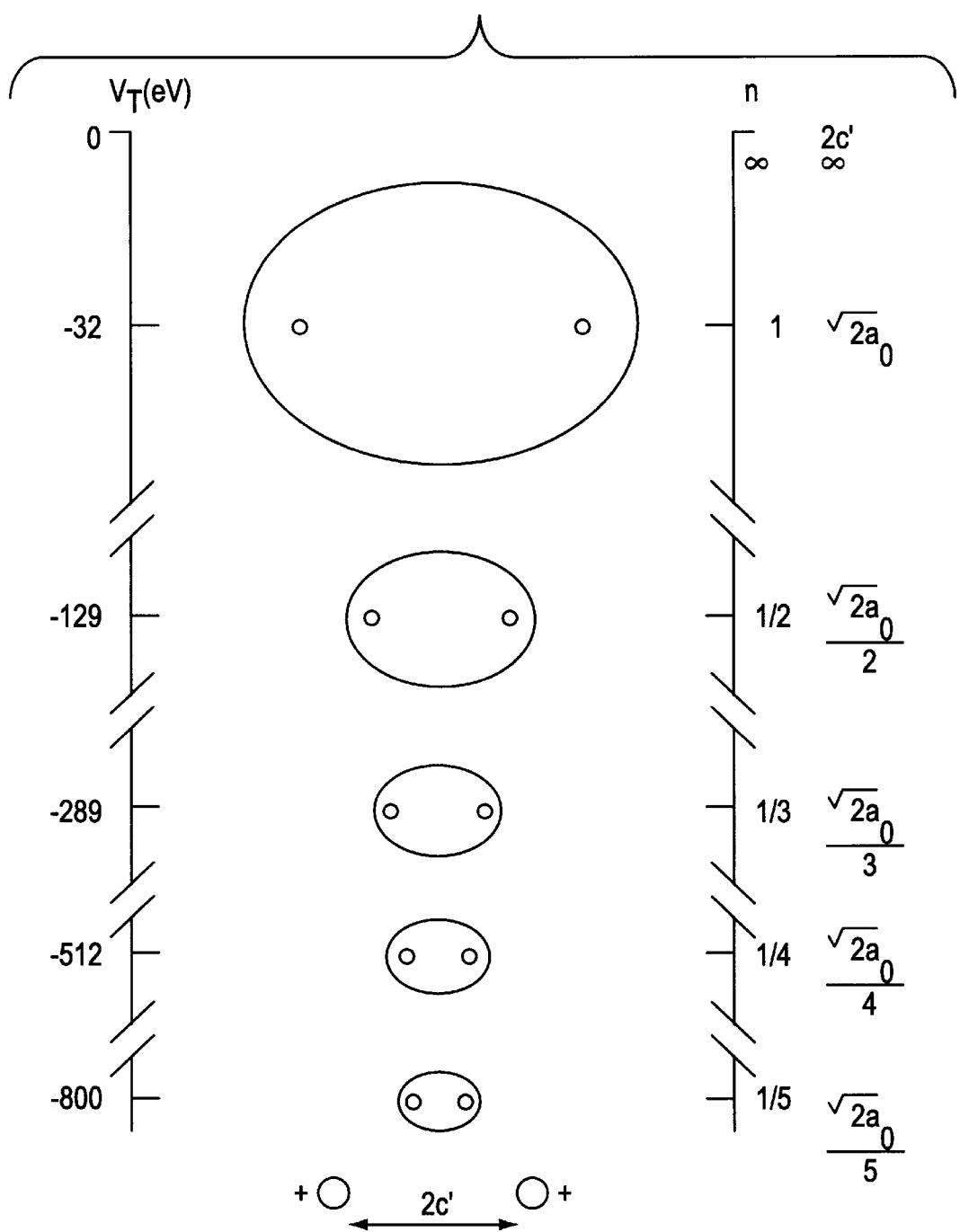
Figure 5:
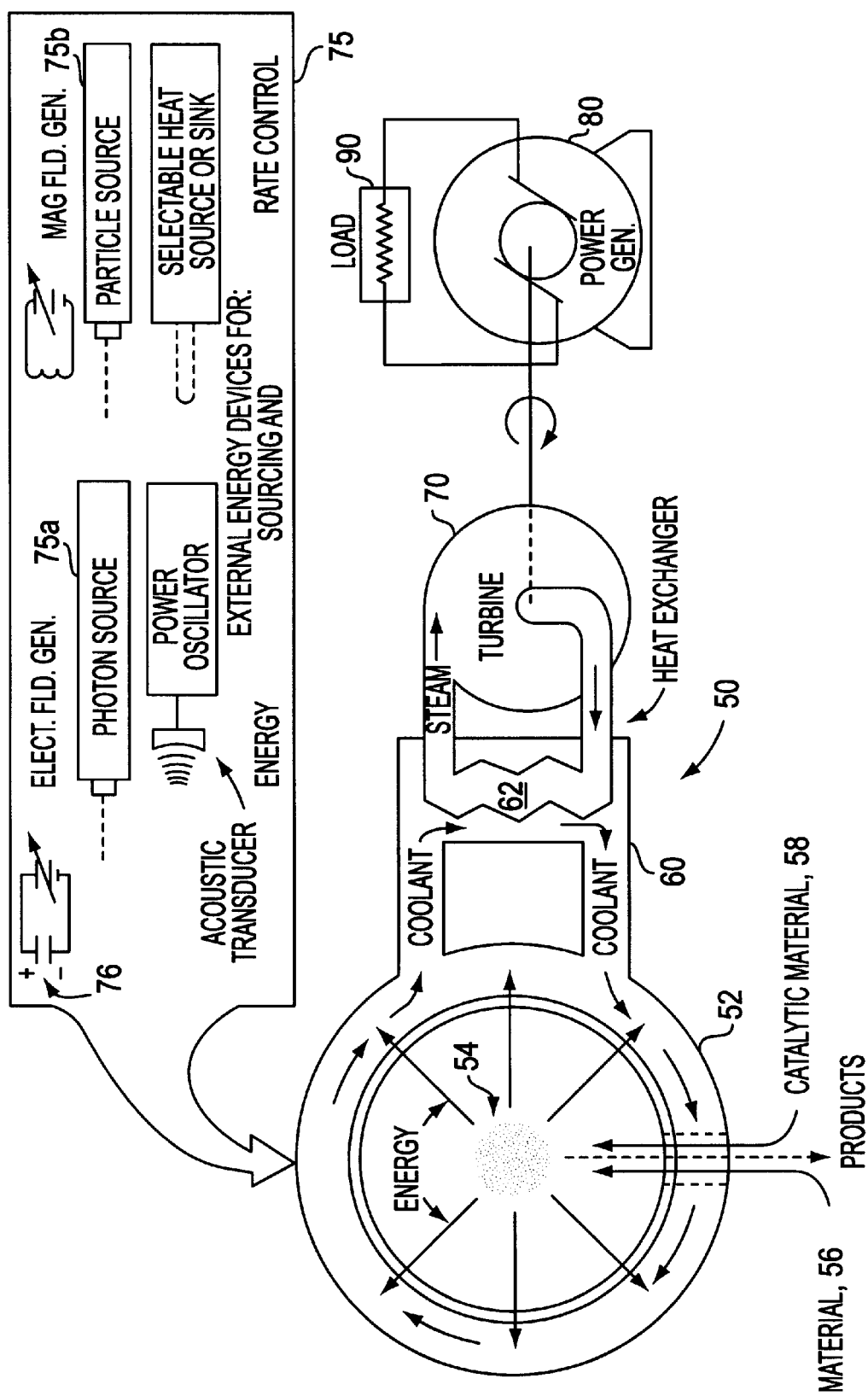
Figure 6:
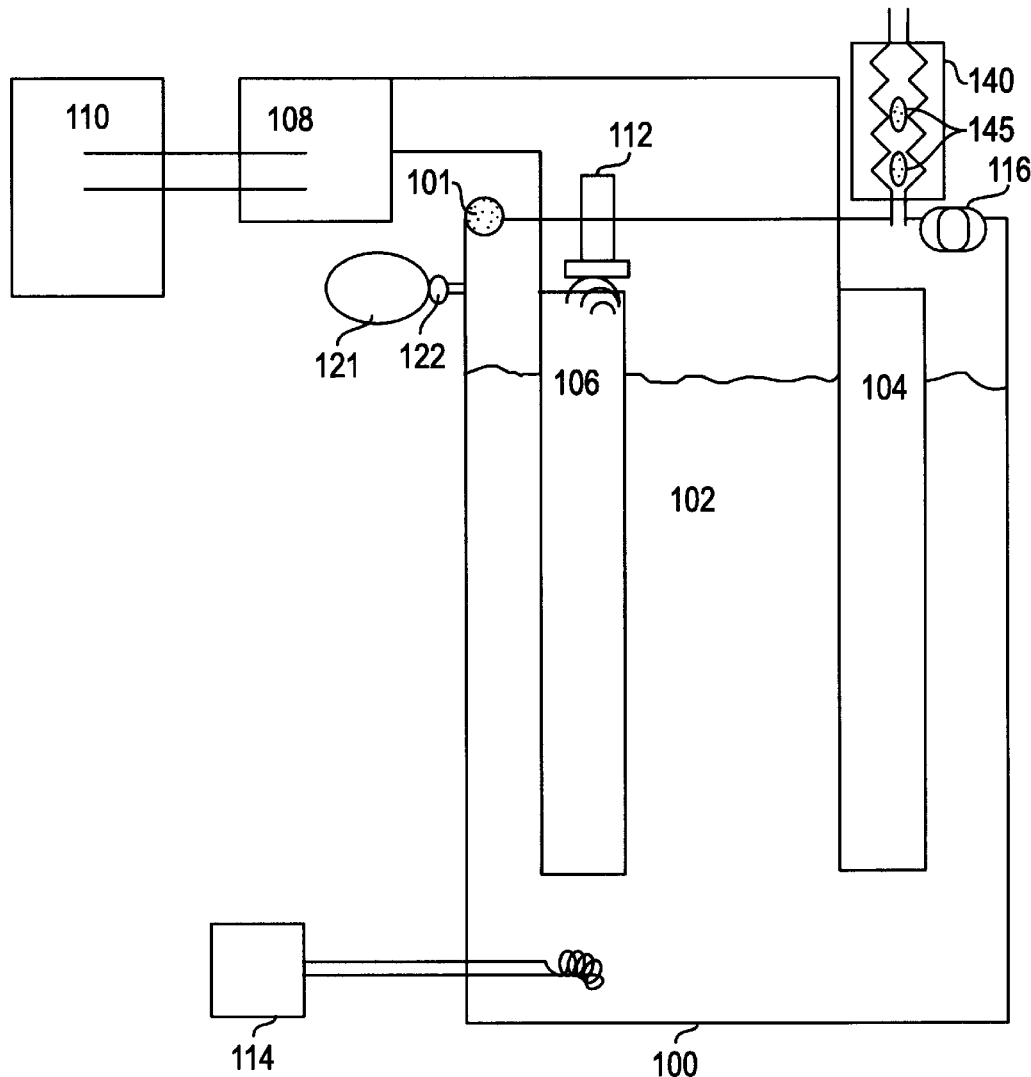
Figure 7:
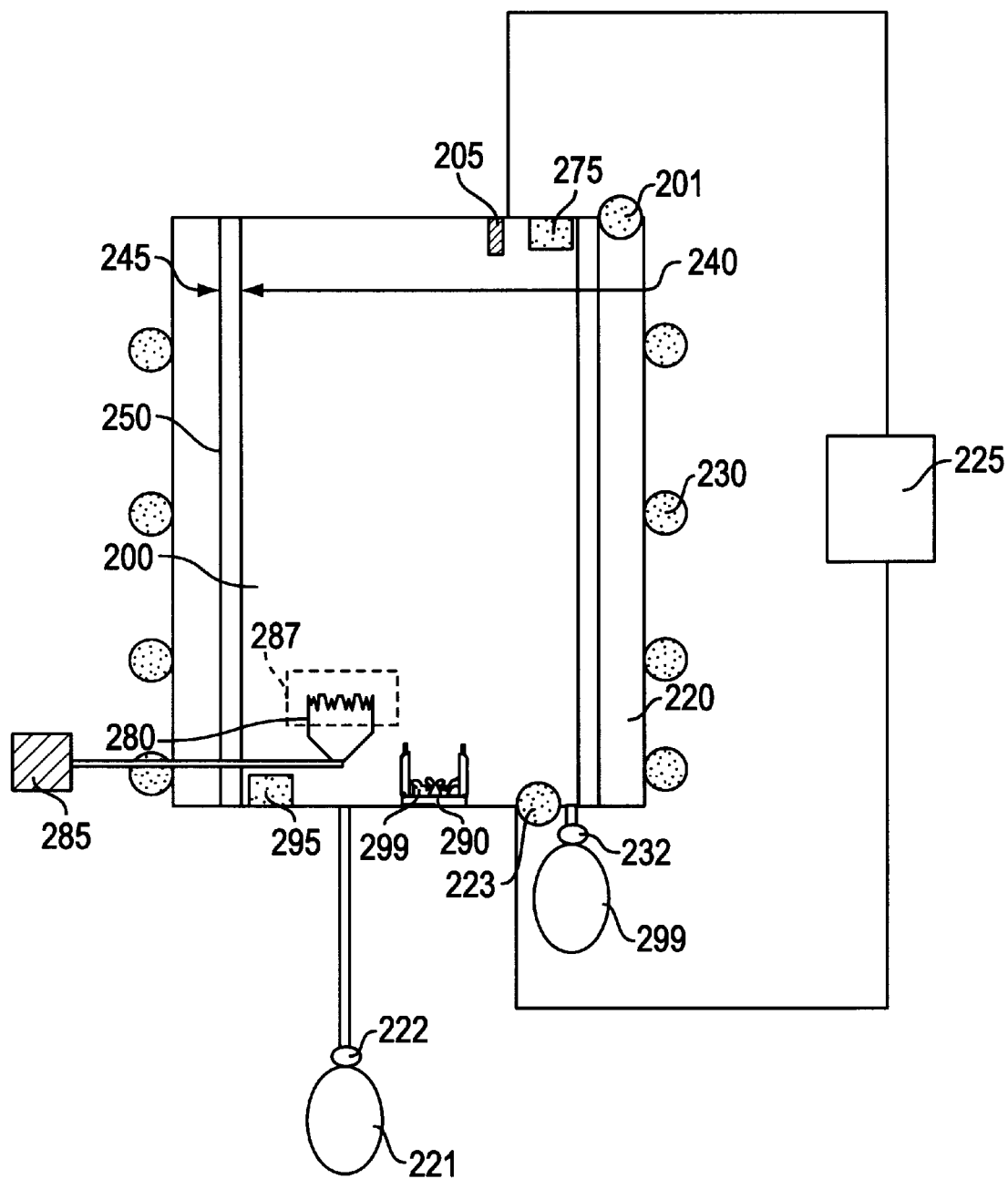
Figure 8:
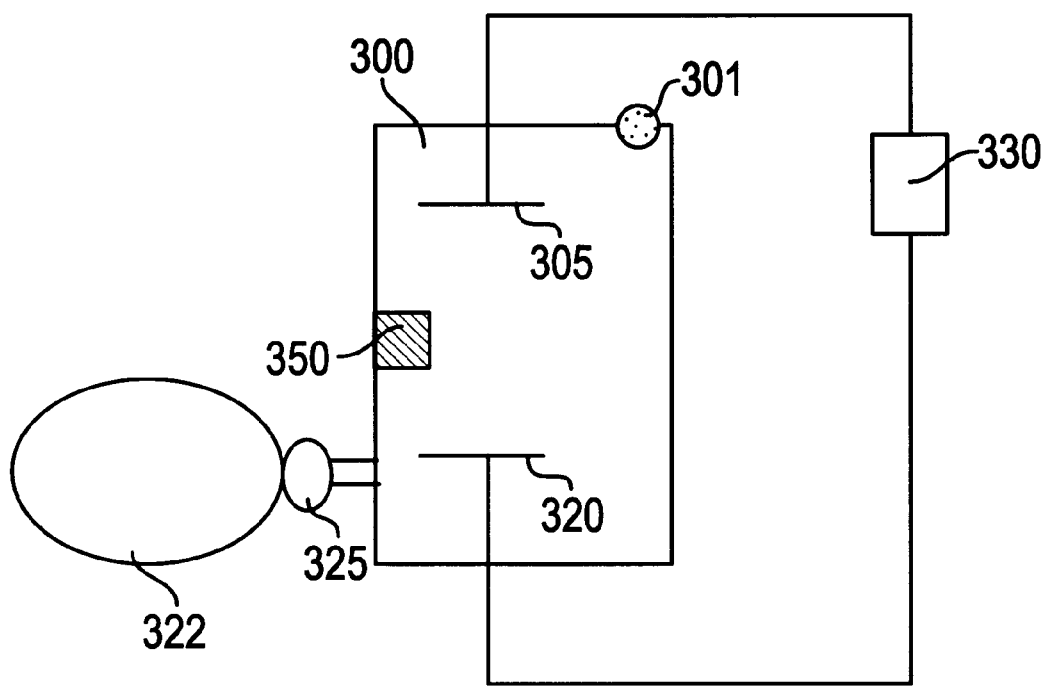

and the dihydrino molecular ion, $H_2^*[2c'=a_o]^+$;

FIG. 4 is a schematic drawing of the size of hydrogen-type molecules, $$H_2^*\left[2c' = \frac{\sqrt{2}\, a_o}{p}\right],$$

as a function of total energy;

FIG. 5 is a schematic drawing of an energy reactor in accordance with the invention;

FIG. 6 is a schematic drawing of an electrolytic cell energy reactor in accordance with the present invention;

FIG. 7 is a schematic drawing of a pressurized gas energy reactor in accordance with the present invention;

FIG. 8 is a schematic drawing of a gas discharge energy reactor in accordance with the invention; and FIG. 9 is a plot of the excess heat release from flowing hydrogen in the presence of nickel oxide powder containing strontium niobium oxide ($Nb^{3+}/Sr^{2+}$ electrocatalytic couple) by the very accurate and reliable method of heat measurement, thermopile conversion of heat into an electrical output signal.

DETAILED DESCRIPTION OF THE PRESENTLY PREFERRED EMBODIMENTS

CATALYTIC ENERGY HOLE STRUCTURE FOR ATOMS

Single Electron Excited State

An energy hole is provided by the transition of an electron of a species to an excited state species including a continuum excited state(s) of atoms, ions, molecules, and ionic and molecular compounds. In one embodiment, the energy hole comprises the excited state transition of an electron of one species whereby the transition energy of the accepting species equals approximately $m \times 27.21$ eV where m is an integer.

Single Electron Transfer

An energy hole is provided by the transfer of an electron between participating species including atoms, ions, molecules, and ionic and molecular compounds. In one embodiment, the energy hole comprises the transfer of an electron from one species to another species whereby the sum of the ionization energy of the electron donating species minus the ionization energy or electron affinity of the electron accepting species equals approximately $m \times 27.21$ eV where m is an integer.

Single Electron Transfer (Two Species)

An efficient catalytic system that hinges on the coupling of three resonator cavities involves potassium. For example, the second ionization energy of potassium is 31.63 eV. This energy hole is obviously too high for resonant absorption. However, $K^+$ releases 4.34 eV when it is reduced to K. The combination of $K^+$ to $K^{2+}$ and $K^+$ to K, then, has a net energy change of 27.28 eV; m=1 in Eq. (3).

  (44)

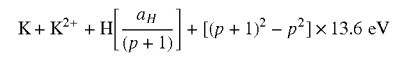

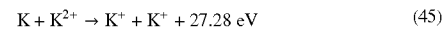  (45)

And, the overall reaction is

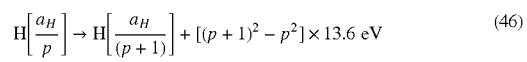  (46)

Note that the energy given off as the atom shrinks is much greater than the energy lost to the energy hole. And, the energy released is large compared to conventional chemical reactions.

For sodium or sodium ions no electrocatalytic reaction of approximately 27.21 eV is possible. For example, 42.15 eV of energy is absorbed by the reverse of the reaction given in Eq. (45) where $Na^+$ replaces $K^+$:

$$Na^+ + Na^+ + 42.15 \text{ eV} \rightarrow Na + Na^{2+} \qquad (47)$$

Other less efficient catalytic systems hinge on the coupling of three resonator cavities. For example, the third ionization energy of palladium is 32.93 eV. This energy hole is obviously too high for resonant absorption. However, $Li^+$ releases 5.392 eV when it is reduced to Li. The combination of $Pd^{2+}$ to $Pd^{3+}$ and $Li^+$ to Li, then, has a net energy change of 27.54 eV.

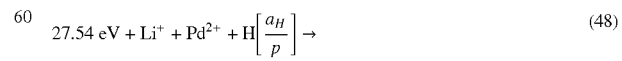  (48)

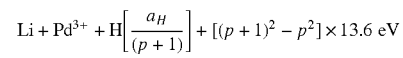

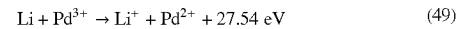  (49)

And, the overall reaction is $$H\left[\frac{a_H}{p}\right] \to H\left[\frac{a_H}{(p+1)}\right] + [(p+1)^2 - p^2] \times 13.6 \text{ eV} \quad (50)$$

Single Electron Transfer (One Species)

An energy hole is provided by the ionization of an electron from a participating species including an atom, an ion, a molecule, and an ionic or molecular compound to a vacuum energy level. In one embodiment, the energy hole comprises the ionization of an electron from one species to a vacuum energy level whereby the ionization energy of the electron donating species equals approximately mX27.21 eV where m is an integer.

Titanium is one of the catalysts (electrocatalytic ion) that can cause resonant shrinkage because the third ionization energy is 27.49 eV, m=1 in Eq. (3). Thus, the shrinkage cascade for the pth cycle is represented by $$27.491 \text{ eV} + Ti^{2+} + H\left[\frac{a_H}{p}\right] \to \quad (51)$$

$$Ti^{3+} + e^- + H\left[\frac{a_H}{(p+1)}\right] + [(p+1)^2 - p^2] \times 13.6 \text{ eV}$$

$$Ti^{3+} + e^- \to Ti^{2+} + 27.491 \text{ eV} \quad (52)$$

And, the overall reaction is $$H\left[\frac{a_H}{p}\right] \to H\left[\frac{a_H}{(p+1)}\right] + [(p+1)^2 - p^2] \times 13.6 \text{ eV} \quad (53)$$

Rubidium is also a catalyst (electrocatalytic ion). The second ionization energy is 27.28 eV.

$$27.28 \text{ eV} + Rb^+ + H\left[\frac{a_H}{p}\right] \to \quad (54)$$

$$Rb^{2+} + e^- + H\left[\frac{a_H}{(p+1)}\right] + [(p+1)^2 - p^2] \times 13.6 \text{ eV}$$

$$Rb^{2+} + e^- \to Rb^+ + 27.28 \text{ eV} \quad (55)$$

And, the overall reaction is $$H\left[\frac{a_H}{p}\right] \to H\left[\frac{a_H}{(p+1)}\right] + [(p+1)^2 - p^2] \times 13.6 \text{ eV} \quad (56)$$

Other single electron transfer reactions to provide energy holes of approximately mX27.21 eV where m is an integer appear in my previous U.S. Patent Applications entitled "Energy/Matter Conversion Methods and Structures", Ser. No. 08/467,051 filed on Jun. 6, 1995 which is a continuation-in-part application of Ser. No. 08/416,040 filed on Apr. 3, 1995 which is a continuation-in-part application of Ser. No. 08/107,357 filed on Aug. 16, 1993, which is a continuation-in-part application of Ser. No. 08/075,102 (Dkt. 99437) filed on Jun. 11, 1993, which is a continuation-in-part application of Ser. No. 07/626,496 filed on Dec. 12, 1990 which is a continuation-in-part application of Ser. No. 07/345,628 filed Apr. 28, 1989 which is a continuation-in-part application of Ser. No. 07/341,733 filed Apr. 21, 1989, which are incorporated herein by reference.

Multiple Electron Transfer

An energy hole is provided by the transfer of multiple electrons between participating species including atoms, ions, molecules, and ionic and molecular compounds. In one embodiment, the energy hole comprises the transfer of t electrons from one or more species to one or more species whereby the sum of the ionization energies and/or electron affinities of the electron donating species minus the sum of the ionization energies and/or electron affinities of the electron acceptor species equals approximately mX27.21 eV where m and t are integers.

An energy hole is provided by the transfer of multiple electrons between participating species including atoms, ions, molecules, and ionic and molecular compounds. In one embodiment, the energy hole comprises the transfer of t electrons from one species to another whereby the t consecutive electron affinities and/or ionization energies of the electron donating species minus the t consecutive ionization energies and/or electron affinities of the electron acceptor equals approximately mX27.21 eV where m and t are integers.

In a preferred embodiment the electron acceptor species is an oxide such as $MnO_x$, $AlO_x$, $SiO_x$. A preferred molecular electron acceptor is oxygen, $O_2$.

Two Electron Transfer (One Species)

In an embodiment, a catalytic system that provides an energy hole hinges on the ionization of two electrons from an atom, ion, or molecule to a vacuum energy level such that the sum of two ionization energies is approximately 27.21 eV. Zinc is one of the catalysts (electrocatalytic atom) that can cause resonant shrinkage because the sum of the first and second ionization energies is 27.358 eV, m=1 in Eq. (3). Thus, the shrinkage cascade for the p th cycle is represented by $$27.358 \text{ eV} + Zn + H\left[\frac{a_o}{p}\right] \to \quad (57)$$

$$Zn^{2+} + 2e^- + H\left[\frac{a_o}{(p+1)}\right] + [(p+1)^2 - p^2] \times 13.6 \text{ eV}$$

$$Zn^{2+} + 2e^- \to Zn + 27.358 \text{ eV} \quad (58)$$

And, the overall reaction is $$H\left[\frac{a_H}{p}\right] \to H\left[\frac{a_H}{(p+1)}\right] + [(p+1)^2 - p^2] \times 13.6 \text{ eV} \quad (59)$$

Two Electron Transfer (Two Species)

In another embodiment, a catalytic system that provides an energy hole hinges on the transfer of two electrons from an atom, ion, or molecule to another atom or molecule such that the sum of two ionization energies minus the sum of two electron affinities of the participating atoms, ions, and/or molecules is approximately 27.21 eV. A catalytic system that hinges on the transfer of two electrons from an atom to a molecule involves palladium and oxygen. For example, the first and second ionization energies of palladium are 8.34 eV and 19.43 eV, respectively. And, the first and second electron affinities of the oxygen molecule are 0.45 eV and 0.11 eV, respectively. The energy hole resulting from a two electron transfer is appropriate for resonant absorption. The combination of Pd to $Pd^{2+}$ and $O_2$ to $O_2^{2-}$, then, has a net energy change of 27.21 eV.

$$27.21 \text{ eV} + Pd + O_2 + H\left[\frac{a_o}{p}\right] \to \quad (60)$$

$$Pd^{2+} + O_2^{2-} + H\left[\frac{a_o}{(p+1)}\right] + [(p+1)^2 - p^2] \times 13.6 \text{ eV}$$

$$Pd^{2+} + O_2^{2-} \rightarrow Pd + O_2 + 27.21 \text{ eV} \tag{61}$$

And, the overall reaction is $$H\left[\frac{a_H}{p}\right] \rightarrow H\left[\frac{a_H}{(p+1)}\right] + [(p+1)^2 - p^2] \times 13.6 \text{ eV} \tag{62}$$

Additional atoms, molecules, or compounds which could be substituted for $O_2$ are those with first and second electron affinities of approximately 0.45 eV and 0.11 eV, respectively, such as a mixed oxide ($MnO_x$, $AlO_x$, $SiO_x$) containing O to form $O^{2-}$ or $O_2$ to form $O_2^{2-}$.

Two Electron Transfer (Two Species)

In another embodiment, a catalytic system that provides an energy hole hinges on the transfer of two electrons from an atom, ion, or molecule to another atom, ion, or molecule such that the sum of two ionization energies minus the sum of one ionization energy and one electron affinity of the participating atoms, ions, and/or molecules is approximately 27.21 eV. A catalytic system that hinges on the transfer of two electrons from an atom to an ion involves xenon and lithium. For example, the first and second ionization energies of xenon are 12.13 eV and 21.21 eV, respectively. And, the first ionization energy and the first electron affinity of lithium are 5.39 eV and 0.62 eV, respectively. The energy hole resulting from a two electron transfer is appropriate for resonant absorption. The combination of Xe to $Xe^{2+}$ and $Li^+$ to $Li^-$, then, has a net energy change of 27.33 eV.

$$27.33 \text{ eV} + Xe + Li^+ + H\left[\frac{a_o}{p}\right] \rightarrow \tag{63}$$

$$Xe^{2+} + Li^- + H\left[\frac{a_o}{(p+1)}\right] + [(p+1)^2 - p^2] \times 13.6 \text{ eV}$$

$$Xe^{2+} + Li^- \rightarrow Xe + Li^+ + 27.33 \text{ eV} \tag{64}$$

And, the overall reaction is $$H\left[\frac{a_H}{p}\right] \rightarrow H\left[\frac{a_H}{(p+1)}\right] + [(p+1)^2 - p^2] \times 13.6 \text{ eV} \tag{65}$$

Two Electron Transfer (Two Species)

In another embodiment, a catalytic system that provides an energy hole hinges on the transfer of two electrons from an atom, ion, or molecule to another atom, ion, or molecule such that the sum of two ionization energies minus the sum of two ionization energies of the participating atoms and/or molecules is approximately 27.21 eV. A catalytic system that hinges on the transfer of two electrons from a first ion to a second ion involves silver($Ag^+$) and silver ($Ag^{2+}$). For example, the second and third ionization energies of silver are 21.49 eV and 34.83 eV, respectively. And, the second and first ionization energies of silver are 21.49 eV and 7.58 eV, respectively. The energy hole resulting from a two electron transfer is appropriate for resonant absorption. The combination of $Ag^+$ to $Ag^{3+}$ and $Ag^{2+}$ to Ag, then, has a net energy change of 27.25 eV.

$$27.25 \text{ eV} + Ag^+ + Ag^{2+} + H\left[\frac{a_o}{p}\right] \rightarrow \tag{66}$$

$$Ag^{3+} + Ag + H\left[\frac{a_o}{(p+1)}\right] + [(p+1)^2 - p^2] \times 13.6 \text{ eV}$$

$$Ag^{3+} + Ag \rightarrow Ag^+ + Ag^{2-} + 27.25 \text{ eV} \tag{67}$$

And, the overall reaction is $$H\left[\frac{a_H}{p}\right] \rightarrow H\left[\frac{a_H}{(p+1)}\right] + [(p+1)^2 - p^2] \times 13.6 \text{ eV} \tag{68}$$

Three Electron Transfer (Two Species)

In another embodiment, a catalytic system that provides an energy hole hinges on the transfer of three electrons from an ion to another ion such that the sum of the electron affinity and two ionization energies of the first ion minus the sum of three ionization energies of the second ion is approximately 27.21 eV. A catalytic system that hinges on the transfer of three electrons from an ion to a second ion involves $Li^-$ and $Cr^{3+}$. For example, the electron affinity, first ionization energy, and second ionization energy of lithium are 0.62 eV, 5.392 eV, and 75.638 eV, respectively. And, the third, second, and first ionization energies of $Cr^{3+}$ are 30.96 eV, 16.50 eV, and 6.766 eV, respectively. The energy hole resulting from a three electron transfer is appropriate for resonant absorption. The combination of $Li^-$ to $Li^{2+}$ and $Cr^{3+}$ to Cr, then, has a net energy change of 27.42 eV.

$$27.42 \text{ eV} + Li^- + Cr^{3+} + H\left[\frac{a_o}{p}\right] \rightarrow \tag{69}$$

$$Li^{2+} + Cr + H\left[\frac{a_o}{(p+1)}\right] + [(p+1)^2 - p^2] \times 13.6 \text{ eV}$$

$$Li^{2+} + Cr \rightarrow Li^- + Cr^{3+} + 27.42 \text{ eV} \tag{70}$$

And, the overall reaction is $$H\left[\frac{a_H}{p}\right] \rightarrow H\left[\frac{a_H}{(p+1)}\right] + [(p+1)^2 - p^2] \times 13.6 \text{ eV} \tag{71}$$

Three Electron Transfer (Two Species)

In another embodiment, a catalytic system that provides an energy hole hinges on the transfer of three electrons from an atom, ion, or molecule to another atom, ion, or molecule such that the sum of three consecutive ionization energies of the electron donating species minus the sum of three consecutive ionization energies of the electron accepting species is approximately 27.21 eV. A catalytic system that hinges on the transfer of three electrons from an atom to an ion involves Ag and $Ce^{3+}$. For example, the first, second, and third ionization energies of silver are 7.58 eV, 21.49 eV, and 34.83 eV, respectively. And, the third, second, and first ionization energies of $Ce^{3+}$ are 20.20 eV, 10.85 eV, and 5.47 eV, respectively. The energy hole resulting from a three electron transfer is appropriate for resonant absorption. The combination of Ag to $Ag^{3+}$ and $Ce^{3+}$ to Ce, then, has a net energy change of 27.38 eV.

$$27.38 \text{ eV} + Ag + Ce^{3+} + H\left[\frac{a_o}{p}\right] \rightarrow \quad (72)$$

$$Ag^{3+} + Ce + H\left[\frac{a_o}{(p+1)}\right] + [(p+1)^2 - p^2] \times 13.6 \text{ eV}$$

$$Ag^{3+} + Ce \rightarrow Ag + Ce^{3+} + 27.38 \text{ eV} \quad (73)$$

And, the overall reaction is $$H\left[\frac{a_H}{p}\right] \rightarrow H\left[\frac{a_H}{(p+1)}\right] + [(p+1)^2 - p^2] \times 13.6 \text{ eV} \quad (74)$$

ADDITIONAL CATALYTIC ENERGY HOLE STRUCTURES

Single Electron Transfer

In a further embodiment, an energy hole of energy equal to the total energy released for a below "ground state" electronic transition of the hydrogen atom is provided by the transfer of an electron between participating species including atoms, ions, molecules, and ionic and molecular compounds. In one embodiment, the energy hole comprises the transfer of an electron from one species to another species whereby the sum of the ionization energy of the electron donating species minus the ionization energy or electron affinity of the electron accepting species equals approximately $$\frac{m}{2} 27.21 \text{ eV};$$

where m is an integer.

For m=3 corresponding to the n=1 to n=½ transition, an efficient catalytic system that hinges on the coupling of three resonator cavities involves arsenic and calcium. For example, the third ionization energy of calcium is 50.908 eV. This energy hole is obviously too high for resonant absorption. However, As$^+$ releases 9.81 eV when it is reduced to As. The combination of Ca$^{2+}$ to Ca$^{3+}$ and As$^+$ to As, then, has a net energy change of 41.1 eV.

$$41.1 \text{ eV} + As^+ + Ca^{2+} + H\left[\frac{a_o}{p}\right] \rightarrow \quad (75)$$

$$As + Ca^{3+} + H\left[\frac{a_o}{(p+1)}\right] + [(p+1)^2 - p^2] \times 13.6 \text{ eV}$$

$$As + Ca^{3+} \rightarrow As^+ + Ca^{2+} + 41.1 \text{ eV} \quad (76)$$

And, the overall reaction is $$H\left[\frac{a_H}{p}\right] \rightarrow H\left[\frac{a_H}{(p+1)}\right] + [(p+1)^2 - p^2] \times 13.6 \text{ eV} \quad (77)$$

Multiple Electron Transfer

An energy hole is provided by the transfer of multiple electrons between participating species including atoms, ions, molecules, and ionic and molecular compounds. In one embodiment, the energy hole comprises the transfer of t electrons from one or more species to one or more species whereby the sum of the ionization energies and/or electron affinities of the electron donating species minus the sum of the ionization energies and/or electron affinities of the electron acceptor species equals approximately $$\frac{m}{2} 27.21 \text{ eV}$$

where m and t are integers.

CATALYTIC ENERGY HOLE STRUCTURES FOR MOLECULES

Single Electron Excited State

An energy hole is provided by the transition of an electron of a species to an excited state species including atoms, ions, molecules, and ionic and molecular compounds. In one embodiment, the energy hole comprises the excited state transition of an electron of one species whereby the transition energy of the accepting species is $mp^2 \times 48.6$ eV where m and p are integers.

Single Electron Transfer

An energy hole is provided by the transfer of an electron between participating species including atoms, ions, molecules, and ionic and molecular compounds. In one embodiment, the energy hole comprises the transfer of an electron from one species to another species whereby the sum of the ionization energy of the electron donating species minus the ionization energy or electron affinity of the electron accepting species equals approximately $mp^2 \times 48.6$ eV where m and p are integers.

Single Electron Transfer (Two Species)

An efficient catalytic system that hinges on the coupling of three resonator cavities involves iron and lithium. For example, the fourth ionization energy of iron is 54.8 eV. This energy hole is obviously too high for resonant absorption. However, Li$^+$ releases 5.392 eV when it is reduced to Li. The combination of Fe$^{3+}$ to Fe$^{4+}$ and Li$^+$ to Li, then, has a net energy change of 49.4 eV.

$$49.4 \text{ eV} + Fe^{3+} + Li^+ + H_2[2c' = \sqrt{2} a_o] \rightarrow \quad (78)$$

$$Fe^{4+} + Li + H_2^*\left[2c' = \frac{\sqrt{2} a_o}{2}\right] + 95.7 \text{ eV}$$

$$Li + Fe^{4+} \rightarrow Li^+ + Fe^{3+} + 49.4 \text{ eV} \quad (79)$$

And, the overall reaction is $$H_2[2c' = \sqrt{2} a_o] \rightarrow H_2^*\left[2c' = \frac{\sqrt{2} a_o}{2}\right] + 95.7 \text{ eV} \quad (80)$$

Note that the energy given off as the molecule shrinks is much greater than the energy lost to the energy hole. And, the energy released is large compared to conventional chemical reactions.

An efficient catalytic system that hinges on the coupling of three resonator cavities involves scandium. For example, the fourth ionization energy of scandium is 73.47 eV. This energy hole is obviously too high for resonant absorption. However, Sc$^{3+}$ releases 24.76 eV when it is reduced to Sc$^{2+}$. The combination of Sc$^{3+}$ to Sc$^{4+}$ and Sc$^{3+}$ to Sc$^{2+}$, then, has a net energy change of 48.7 eV.

$$48.7 \text{ eV} + Sc^{3+} + Sc^{3+} + H_2[2c' = \sqrt{2} a_o] \rightarrow \quad (81)$$

$$Sc^{4+} + Sc^{2+} + H_2^*\left[2c' = \frac{\sqrt{2} a_o}{2}\right] + 95.7 \text{ eV}$$

-continued $$Sc^{2+} + Sc^{4+} \rightarrow Sc^{3+} + Sc^{3+} + 48.7 \text{ eV} \tag{82}$$

And, the overall reaction is $$H_2\left[2c' = \sqrt{2}\,a_o\right] \rightarrow H_2^*\left[2c' = \frac{\sqrt{2}\,a_o}{2}\right] + 95.7 \text{ eV} \tag{83}$$

An efficient catalytic system that hinges on the coupling of three resonator cavities involves yttrium. For example, the fourth ionization energy of gallium is 64.00 eV. This energy hole is obviously too high for resonant absorption. However, $Pb^{2+}$ releases 15.03 eV when it is reduced to $Pb^+$. The combination of $Ga^{3+}$ to $Ga^{4+}$ and $Pb^{2+}$ to $Pb^+$, then, has a net energy change of 48.97 eV.

$$48.97 \text{ eV} + Ga^{3+} + Pb^{2+} + H_2\left[2c' = \sqrt{2}\,a_o\right] \rightarrow \tag{84}$$

$$Ga^{4+} + Pb^+ + H_2^*\left[2c' = \frac{\sqrt{2}\,a_o}{2}\right] + 95.7 \text{ eV}$$

$$Ga^{4+} + Pb^+ \rightarrow Ga^{3+} + Pb^{2+} + 48.97 \text{ eV} \tag{85}$$

And, the overall reaction is $$H_2\left[2c' = \sqrt{2}\,a_o\right] \rightarrow H_2^*\left[2c' = \frac{\sqrt{2}\,a_o}{2}\right] + 95.7 \text{ eV} \tag{86}$$

Single Electron Transfer (One Species)

An energy hole is provided by the ionization of an electron from a participating species including an atom, an ion, a molecule, and an ionic or molecular compound to a vacuum energy level. In one embodiment, the energy hole comprises the ionization of an electron from one species to a vacuum energy level whereby the ionization energy of the electron donating species equals approximately $mp^2 X 48.6$ eV where m and p are integers.

Multiple Electron Transfer

An energy hole is provided by the transfer of multiple electrons between participating species including atoms, ions, molecules, and ionic and molecular compounds. In one embodiment, the energy hole comprises the transfer of t electrons from one or more species to one or more species whereby the sum of the ionization energies and/or electron affinities of the electron donating species minus the sum of the ionization energies and/or electron affinities of the electron acceptor species equals approximately $mp^2 X 48.6$ eV where m, p, and t are integers.

An energy hole is provided by the transfer of multiple electrons between participating species including atoms, ions, molecules, and ionic and molecular compounds. In one embodiment, the energy hole comprises the transfer of t electrons from one species to another whereby the t consecutive electron affinities and/or ionization energies of the electron donating species minus the t consecutive ionization energies and/or electron affinities of the electron acceptor equals approximately $mp^2 X 48.6$ eV where m, p, and t are integers.

In a preferred embodiment the electron acceptor species is an oxide such as $MnO_x$, $AlO_x$, $SiO_x$. A preferred molecular electron acceptor is oxygen, $O_2$.

Two Electron Transfer (One Species)

In an embodiment, a catalytic system that provides an energy hole hinges on the ionization of two electrons from an atom, ion, or molecule to a vacuum energy level such that the sum of two ionization energies is approximately $mp^2 X 48.6$ eV where m, and p are integers.

Two Electron Transfer (Two Species)

In another embodiment, a catalytic system that provides an energy hole hinges on the transfer of two electrons from an atom, ion, or molecule to another atom or molecule such that the sum of two ionization energies minus the sum of two electron affinities of the participating atoms, ions, and/or molecules is approximately $mp^2 X 48.6$ eV where m and p are integers.

Two Electron Transfer (Two Species)

In another embodiment, a catalytic system that provides an energy hole hinges on the transfer of two electrons from an atom, ion, or molecule to another atom, ion, or molecule such that the sum of two ionization energies minus the sum of one ionization energy and one electron affinity of the participating atoms, ions, and/or molecules is approximately $mp^2 X 48.6$ eV where m and p are integers.

Other Energy Holes

In another embodiment, energy holes, each of approximately $m X 67.8$ eV given by Eq. (30)

$$-m \times V_e = -m \times \frac{-2e^2}{8\pi\varepsilon_o \sqrt{a^2 - b^2}} \ln \frac{a + \sqrt{a^2 - b^2}}{a - \sqrt{a^2 - b^2}} \tag{87}$$

$$= m \times 67.813 \text{ eV}$$

are provided by electron transfer reactions of reactants including electrochemical reactant(s) (electrocatalytic ion(s) or couple(s)) which cause heat to be released from hydrogen molecules as their electrons are stimulated to relax to quantized potential energy levels below that of the "ground state". The energy removed by an electron transfer reaction, energy hole, is resonant with the hydrogen energy released to stimulate this transition. The source of hydrogen molecules is the production on the surface of a cathode during electrolysis of water in the case of an electrolytic energy reactor and hydrogen gas or a hydride in the case of a pressurized gas energy reactor or gas discharge energy reactor.

An energy hole is provided by the transfer of one or more electrons between participating species including atoms, ions, molecules, and ionic and molecular compounds. In one embodiment, the energy hole comprises the transfer of t electrons from one or more species to one or more species whereby the sum of the ionization energies and/or electron affinities of the electron donating species minus the sum of the ionization energies and/or electron affinities of the electron acceptor species equals approximately $m X 67.8$ eV where m and t are integers.

An efficient catalytic system that hinges on the coupling of three resonator cavities involves magnesium and strontium. For example, the third ionization energy of magnesium is 80.143 eV. This energy hole is obviously too high for resonant absorption. However, $Sr^{2+}$ releases 11.03 eV when it is reduced to $Sr^+$. The combination of $Mg^{2+}$ to $Mg^{3+}$ and $Sr^{2+}$ to $Sr^+$, then, has a net energy change of 69.1 eV.

$$69.1 \text{ eV} + Mg^{2+} + Sr^{2+} + H_2\left[2c' = \sqrt{2}\,a_o\right] \rightarrow \tag{88}$$

$$Mg^{3+} + Sr^+ + H_2^*\left[2c' = \frac{\sqrt{2}\,a_o}{2}\right] + 95.7 \text{ eV}$$

-continued $$Mg^{3+} + Sr^+ \rightarrow Mg^{2+} + Sr^{2+} + 69.1 \text{ eV} \quad (89)$$

And, the overall reaction is $$H_2[2c' = \sqrt{2} a_o] \rightarrow H_2^*\left[2c' = \frac{\sqrt{2} a_o}{2}\right] + 95.7 \text{ eV} \quad (90)$$

Another efficient catalytic system that hinges on the coupling of three resonator cavities involves magnesium and calcium. In this case, $Ca^{2+}$ releases 11.871 eV when it is reduced to $Ca^+$. The combination of $Mg^{2+}$ to $Mg^{3+}$ and $Ca^{2+}$ to $Ca^+$, then, has a net energy change of 68.2 eV.

$$68.2 \text{ eV} + Mg^{2+} + Ca^{2+} + H_2[2c' = \sqrt{2} a_o] \rightarrow \quad (91)$$

$$Mg^{3+} + Ca^+ + H_2^*\left[2c' = \frac{\sqrt{2} a_o}{2}\right] + 95.7 \text{ eV}$$

$$Mg^{3+} + Ca^+ \rightarrow Mg^{2+} + Ca^{2+} + 68.2 \text{ eV} \quad (92)$$

And, the overall reaction is $$H_2[2c' = \sqrt{2} a_o] \rightarrow H_2^*\left[2c' = \frac{\sqrt{2} a_o}{2}\right] + 95.7 \text{ eV} \quad (93)$$

In four other embodiments wherein the theory is given in my previous U.S. patent application Ser. No. 08/107,357 filed on Aug. 16, 1993 which is incorporated herein by this reference, energy holes, each of approximately:

nXE$_T$ eV with zero order vibration where E$_T$ is given by Eq. (38);

mX31.94 eV where 31.94 eV is given by Eq. (222) of the U.S. patent application Ser. No. 08/107,357 where n and m are integers, $$E_D = E(2H[a_o]) - E_{T_{zero \, order}} - \frac{E_{vib}}{2} \quad (222)$$

$$= -27.21 + 31.94 = 4.73 \text{ eV}$$

and 95.7 eV (corresponding to m=1 in Eq. (43) with zero order vibration which is given by the difference in $$-E_{T_{zero \, order}} - \frac{E_{vib}}{2}$$

of Eqs. (254) and (222) of the U.S. patent application Ser. No. 08/107,357))

$$E_D = E\left(2H\left[\frac{a_o}{2}\right]\right) - E_{T_{zero \, order}} - \frac{E_{vib}}{2} \quad (254)$$

$$= -108.8 + 127.66 = 18.86 \text{ eV}$$

are provided by electron transfer reactions of reactants including electrochemical reactant(s) (electrocatalytic ion(s) or couple(s)) which cause heat to be released from hydrogen molecules as their electrons are stimulated to relax to quantized potential energy levels below that of the "ground state". The energy removed by an electron transfer reaction, energy hole, is resonant with the hydrogen energy released to stimulate this transition. The source of hydrogen molecules is the production on the surface of a cathode during electrolysis of water in the case of an electrolytic energy reactor and hydrogen gas or a hydride in the case of a pressurized gas energy reactor or gas discharge energy reactor.

An energy hole is provided by the transfer of one or more electrons between participating species including atoms, ions, molecules, and ionic and molecular compounds. In one embodiment, the energy hole comprises the transfer of t electrons from one or more species to one or more species whereby the sum of the ionization energies and/or electron affinities of the electron donating species minus the sum of the ionization energies and/or electron affinities of the electron acceptor species equals approximately mX31.94 eV (Eq. (222)) where m and t are integers.

An energy hole is provided by the transfer of one or more electrons between participating species including atoms, ions, molecules, and ionic and molecular compounds. In one embodiment, the energy hole comprises the transfer of t electrons from one or more species to one or more species whereby the sum of the ionization energies and/or electron affinities of the electron donating species minus the sum of the ionization energies and/or electron affinities of the electron acceptor species equals approximately mX95.7 eV where m and t are integers.

ENERGY REACTOR

An energy reactor 50, in accordance with the invention, is shown in FIG. 5 and comprises a vessel 52 which contains an energy reaction mixture 54, a heat exchanger 60, and a steam generator 62. The heat exchanger 60 absorbs heat released by the shrinkage reaction, when the reaction mixture, comprised of shrinkable material, shrinks. The heat exchanger exchanges heat with the steam generator 62 which absorbs heat from the exchanger 60 and produces steam. The energy reactor 50 further comprises a turbine 70 which receives steam from the steam generator 62 and supplies mechanical power to a power generator 80 which converts the steam energy into electrical energy, which can be received by a load 90 to produce work or for dissipation.

The energy reaction mixture 54 comprises an energy releasing material 56 including a source of hydrogen isotope atoms or a source of molecular hydrogen isotope, and a source of energy holes 58 which resonantly remove approximately mX27.21 eV to cause atomic hydrogen "shrinkage" and approximately mX48.6 eV to cause molecular hydrogen "shrinkage" where m is an integer wherein the shrinkage reaction occurs by contact of the hydrogen with the source of energy holes. The shrinkage reaction releases heat and shrunken atoms and/or molecules.

The source of hydrogen can be hydrogen gas, dissociation of water including thermal dissociation, electrolysis of water, hydrogen from hydrides, or hydrogen from metal-hydrogen solutions. In all embodiments, the source of energy holes can be one or more of an electrochemical, chemical, photochemical, thermal, free radical, sonic, or nuclear reaction(s) or inelastic photon or particle scattering reaction(s). In the latter two cases, the present invention of an energy reactor comprises a particle source 75b and/or photon source 75a to supply the said energy holes. In these cases, the energy hole corresponds to stimulated emission by the photon or particle. In preferred embodiments of the pressurized gas energy and gas discharge reactors shown in FIGS. 7 and 8, respectively, a photon source 75a dissociates hydrogen molecules to hydrogen atoms. The photon source producing photons of at least one energy of approximately mX27.21 eV, $$\frac{m}{2} \times 27.21 \text{ eV},$$

or 40.8 eV causes stimulated emission of energy as the hydrogen atoms undergo the shrinkage reaction. In another preferred embodiment, a photon source 75a producing photons of at least one energy of approximately mX48.6 eV, 95.7 eV, or mX31.94 eV causes stimulated emission of energy as the hydrogen molecules undergo the shrinkage reaction. In all reaction mixtures, a selected external energy device 75, such as an electrode may be used to supply an electrostatic potential or a current (magnetic field) to decrease the activation energy of the resonant absorption of an energy hole. In another embodiment, the mixture 54, further comprises a surface or material to dissociate and/or absorb atoms and/or molecules of the energy releasing material 56. Such surfaces or materials to dissociate and/or absorb hydrogen, deuterium, or tritium comprise an element, compound, alloy, or mixture of transition elements and inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal (carbon), and intercalated Cs carbon (graphite). In a preferred embodiment, a source of energy holes to shrink hydrogen atoms comprises a catalytic energy hole material 58, typically comprising electrocatalytic ions and couples that provide an energy hole of approximately mX27.21 eV plus or minus 1 eV. In a preferred embodiment, a source of energy holes to shrink hydrogen molecules comprises a catalytic energy hole material 58, typically comprising electrocatalytic ions and couple(s) including those that provide an energy hole of approximately nX48.6 eV plus or minus 5 eV. The electrocatalytic ions and couple(s) include the electrocatalytic ions and couples described in my previous U.S. Patent Applications entitled "Energy/Matter Conversion Methods and Structures", Ser. No. 08/467,051 filed on Jun. 6, 1995 which is a continuation-in-part application of Ser. No. 08/416,040 filed on Apr. 3, 1995 which is a continuation-in-part application of Ser. No. 08/107,357 filed on Aug. 16, 1993, which is a continuation-in-part application of Ser. No. 08/075,102 (Dkt. 99437) filed on Jun. 11, 1993, which is a continuation-in-part application of Ser. No. 07/1626,496 filed on Dec. 12, 1990 which is a continuation-in-part application of Ser. No. 07/345,628 filed Apr. 28, 1989 which is a continuation-in-part application of Ser. No. 07/341,733 filed Apr. 21, 1989, which are incorporated herein by reference.

A further embodiment is the vessel 52 containing a source of energy holes including an electrocatalytic ion or couple(s) (source of energy holes) in the molten, liquid, gaseous, or solid state and a source of hydrogen including hydrides and gaseous hydrogen. In the case of a reactor which shrinks hydrogen atoms, the embodiment further comprises a means to dissociate the molecular hydrogen into atomic hydrogen including an element, compound, alloy, or mixture of transition elements, inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal (carbon), and intercalated Cs carbon (graphite) or electromagnetic radiation including UV light provided by photon source 75.

The present invention of an electrolytic cell energy reactor, pressurized gas energy reactor, and a gas discharge energy reactor, comprises: a source of hydrogen; one of a solid, molten, liquid, and gaseous source of energy holes; a vessel containing hydrogen and the source of energy holes wherein the shrinkage reaction occurs by contact of the hydrogen with the source of energy holes; and a means for removing the (molecular) lower-energy hydrogen so as to prevent an exothermic shrinkage reaction from coming to equilibrium. The present energy invention is further described in my previous U.S. Patent Applications entitled "Energy/Matter Conversion Methods and Structures", Ser. No. 08/467,051 filed on Jun. 6, 1995 which is a continuation-in-part application of Ser. No. 08/416,040 filed on Apr. 3, 1995 which is a continuation-in-part application of Ser. No. 08/107,357 filed on Aug. 16, 1993, which is a continuation-in-part application of Ser. No. 08/075,102 (Dkt. 99437) filed on Jun. 11, 1993, which is a continuation-in-part application of Ser. No. 07/626,496 filed on Dec. 12, 1990 which is a continuation-in-part application of Ser. No. 07/345,628 filed Apr. 28, 1989 which is a continuation-in-part application of Ser. No. 07/341,733 filed Apr. 21, 1989, and my publications, Mills, R., Kneizys, S., Fusion Technology, 210, (1991), pp. 65–81; Mills, R., Good, W., Shaubach, R., "Dihydrino Molecule Identification", Fusion Technology, 25, 103 (1994); Mills, R., Good, W., "Fractional Quantum Energy Levels of Hydrogen", Fusion Technology, Vol. 28, No. 4, November, (1995), pp. 1697–1719 which are incorporated herein by reference.

Electrolytic Energy Reactor

An electrolytic energy reactor is described in my previous U.S. patent applications entitled "Energy/Matter Conversion Methods and Structures", Ser. No. 08/467,051 filed on Jun. 6, 1995 which is a continuation-in-part application of Ser. No. 08/416,040 filed on Apr. 3, 1995 which is a continuation-in-part application of Ser. No. 08/107,357 filed on Aug. 16, 1993, which is a continuation-in-part application of Ser. No. 08/075,102 (Dkt. 99437) filed on Jun. 11, 1993, which is a continuation-in-part application of Ser. No. 07/626,496 filed on Dec. 12, 1990 which is a continuation-in-part application of Ser. No. 07/345,628 filed Apr. 28, 1989 which is a continuation-in-part application of Ser. No. 07/341,733 filed Apr. 21, 1989 which are incorporated herein by reference. A preferred embodiment of the energy reactor of the present invention comprises an electrolytic cell forming the reaction vessel 52 of FIG. 5 including a molten electrolytic cell. The electrolytic cell 100 is shown generally in FIG. 6. An electric current is passed through the electrolytic solution 102 having a electrocatalytic ions or couples providing energy holes equal to the resonance shrinkage energy (including the electrocatalytic ions and couples described in my previous U.S. Patent Applications incorporated herein by reference) by the application of a voltage to an anode 104 and cathode 106 by the power controller 108 powered by the power supply 110. Ultrasonic or mechanical energy may also be imparted to the cathode 106 and electrolytic solution 102 by vibrating means 112. Heat can be supplied to the electrolytic solution 102 by heater 114. The pressure of the electrolytic cell 100 can be controlled by pressure regulator means 116 where the cell can be closed. The reactor further comprises a means 101 that removes the (molecular) lower-energy hydrogen such as a selective venting valve to prevent the exothermic shrinkage reaction from coming to equilibrium.

In a preferred embodiment, the electrolytic cell is operated at zero voltage gap by applying an overpressure of hydrogen with hydrogen source 121 where the overpressure can be controlled by pressure control means 122 and 116. Water can be reduced to hydrogen and hydroxide at the cathode 106, and the hydrogen can be oxidized to protons at the anode 104. An embodiment of the electrolytic cell energy reactor, comprises a reverse fuel cell geometry which removes the lower-energy hydrogen under vacuum. A preferred cathode 106 of this embodiment has a modified gas diffusion layer and comprises a gas route means including a first Teflon membrane filter and a second carbon paper/Teflon membrane filter composite layer. A further embodiment comprises a reaction vessel that can be closed except for a connection to a condensor 140 on the top of the vessel 100. The cell can be operated at a boil such that the steam evolving from the boiling electrolyte 102 can be condensed in the condenser 140, and the condensed water can be returned to the vessel 100. The lower-energy state hydrogen can be vented through the top of the condenser 140. In one embodiment, the condensor contains a hydrogen/oxygen recombiner 145 that contacts the evolving electrolytic gases. The hydrogen and oxygen are recombined, and the resulting water can be returned to the vessel 100. The heat released from the exothermic reaction whereby the electrons of the electrolytically produced hydrogen atoms (molecules) are induced to undergo transitions to energy levels below the "ground state" and the heat released due to the recombination of the electrolytically generated normal hydrogen and oxygen can be removed by a heat exchanger 60 of FIG. 5 which can be connected to the condensor 140.

In vacuum, in the absence of external fields, the energy hole to stimulate a hydrogen atom (molecule) to undergo a shrinkage transition is $m \times 27.21$ eV ($m \times 48.6$ eV) where m is an integer. This resonance shrinkage energy can be altered when the atom (molecule) is in a media different from vacuum. An example is a hydrogen atom (molecule) absorbed to the cathode 106 present in the aqueous electrolytic solution 102 having an applied electric field and an intrinsic or applied magnetic field provided by external magnetic field generator 75. Under these conditions the energy hole required can be slightly different from $m \times 27.21$ eV ($m \times 48.6$ eV). Thus, a source of energy holes including electrocatalytic ion and couple reactants can be selected which has a redox (electron transfer) energy resonant with the resonance shrinkage energy when operating under these conditions. In the case where a nickel cathode 106 is used to electrolyze an aqueous solution 102 where the cell is operating within a voltage range of 1.4 to 5 volts, the $K^+/K^+$ and $Rb^+$ ($Fe^{3+}/Li^+$ and $Sc^{3+}/Sc^{3+}$) electrocatalytic ions and couples are preferred embodiments to shrink hydrogen atoms (molecules).

The cathode provides hydrogen atoms (molecules), and the shrinkage reaction occurs at the surface of the cathode where hydrogen atoms (molecules) and the source of energy holes (electrocatalytic ion or couple) are in contact. Thus, the shrinkage reaction can be dependent on the surface area of the cathode. For a constant current density, giving a constant concentration of hydrogen atoms (molecules) per unit area, an increase in surface area increases the reactants available to undergo the shrinkage reaction. Also, an increase in cathode surface area decreases the resistance of the electrolytic cell which improves the electrolysis efficiency. A preferred cathode of the electrolytic cell including a nickel cathode has the properties of a high surface area, a highly stressed and hardened surface such as a cold drawn or cold worked surface, and a large number of grain boundaries.

In a preferred embodiment of the electrolytic cell energy reactor, the source of energy holes can be incorporated into the cathode, mechanically by methods including cold working the source of energy holes into the surface of the cathode; thermally by methods including melting the source of energy holes into the surface of the cathode and evaporation of a solvent of a solution of the source of energy holes in contact with the surface of the cathode, and electrostatically by methods including electrolytic deposition, ion bombardment, and vacuum deposition.

The shrinkage reaction rate can be dependent upon the composition of the cathode 106. Hydrogen atoms (molecules) are reactants to produce energy via the shrinkage reaction. Thus, the cathode must efficiently provide a high concentration of hydrogen atoms (molecules). The cathode 106 can be comprised of any element. compound, alloy, or mixture of a conductor or semiconductor including transition elements and compounds, actinide and lanthanide elements and compounds, and group IIIB and IVB elements and compounds. Transition metals dissociate hydrogen gas into atoms to a more or lesser extent depending on the metal. Nickel and titanium readily dissociate hydrogen molecules and are preferred embodiments for shrinking hydrogen atoms. The cathode can alter the energy of the absorbed hydrogen atoms (molecules) and affect the energy of the shrinkage reaction. A cathode material can be selected which provides resonance between the energy hole and the resonance shrinkage energy. In the case of the $K^+/K^+$ electrocatalytic couple with carbonate as the counterion for catalyzing the shrinkage of hydrogen atoms, the relationship of the cathode material to the reaction rate can be:

$$Pt < Pd << Ti, Fe < Ni$$

This can be the opposite order of the energy released when these materials absorb hydrogen atoms. Thus, for this electrocatalytic couple, the reaction rate can be increased by using a cathode which weakly absorbs the hydrogen atoms with little perturbation of their electronic energies.

Also, coupling of resonator cavities and enhancement of the transfer of energy between them can be increased when the media is a nonlinear media such as a magnetized ferromagnetic media. Thus, a paramagnetic or ferromagnetic cathode, a nonlinear magnetized media, increases the reaction rate by increasing the coupling of the resonance shrinkage energy of the hydrogen atom and energy hole comprising an electrocatalytic ion or couple. Alternatively, a magnetic field can be applied with the magnetic field generator 75. Magnetic fields at the cathode alter the energy of absorbed hydrogen and concomitantly alter the resonance shrinkage energy. Magnetic fields also perturb the energy of the electrocatalytic reactions (energy hole) by altering the energy levels of the electrons involved in the reactions. The magnetic properties of the cathode are selected as well as the strength of the magnetic field which is applied by magnetic field generator 75 to optimize shrinkage reaction rate-the power output. A preferred ferromagnetic cathode is nickel.

A preferred method to clean the cathode of the electrolytic cell including a nickel cathode is to anodize the cathode in a basic electrolytic solution including approximately 0.57 M $X_2CO_3$ (X is the alkali cation of the electrolyte including $K^+$) and to immerse the cathode in a dilute solution of $H_2O_2$ such as approximately 3% $H_2O_2$. In a further embodiment of the cleaning method, cyclic voltametry with a second electrode of the same material as the first cathode is performed. The cathode can be then thoroughly rinsed with distilled water. Organic material on the surface of the cathode inhibits the catalytic reaction whereby the electrons of the electrolytically produced hydrogen atoms (molecules) are induced to undergo transitions to energy levels below the "ground state". Cleaning by this method removes the organic material from the cathode surface and adds oxygen atoms onto the cathode surface. Doping the metal surface, including a nickel surface, with oxygen atoms by anodizing the cathode and cleaning the cathode in $H_2O_2$ increases the power output by decreasing hydrogen recombination to molecular hydrogen and by decreasing the bond energy between the metal and the hydrogen atoms (molecules) which conforms the resonance shrinkage energy of the absorbed hydrogen to the energy hole provided by the source of energy holes including the $K^+/K^+$ ($Sc^{3+}/Sc^{3+}$) electrocatalytic couples.

Different anode materials have different overpotentials for the oxidation of water, which can affect ohmic losses. An anode of low overpotential will increase the efficiency. Nickel, platinum, and dimensionally stable anodes including platinized titanium are preferred anodes. In the case of the $K^+/K^+$ electrocatalytic couple where carbonate is used as the counterion, nickel is a preferred anode. Nickel is also a preferred anode for use in basic solutions with a nickel cathode. Nickel is inexpensive relative to platinum, and fresh nickel can be electroplated onto the cathode during electrolysis.

A preferred method to clean a dimensionally stable anode including a platinized titanium anode is to place the anode in approximately 3 M HCl for approximately 5 minutes and then to rinse it with distilled water.

In the case of hydrogen atom shrinkage, hydrogen atoms at the surface of the cathode 106 form hydrogen gas which can form bubbles on the surface of the cathode. These bubbles act as an boundary layer between the hydrogen atoms and the electrocatalytic ion or couple. The boundary can be ameliorated by vibrating the cathode and/or the electrolytic solution 102 or by applying ultrasound with vibrating means 112; and by adding wetting agents to the electrolytic solution 102 to reduce the surface tension of the water and prevent bubble formation. The use of a cathode having a smooth surface or a wire cathode prevents gas adherence. And an intermittent current, provided by an on-off circuit of power controller 108 provides periodic replenishing of hydrogen atoms which are dissipated by hydrogen gas formation followed by diffusion into the solution while preventing excessive hydrogen gas formation which could form a boundary layer.

The shrinkage reaction can be temperature dependent. Most chemical reactions double their rates for each 10° C. rise in temperature. Increasing the temperature increases the collision rate between the hydrogen atoms (molecules) and the electrocatalytic ion or couple which will increase the shrinkage reaction rate. With large temperature excursions from room temperature, the kinetic energy distribution of the reactants can be sufficiently altered to cause the energy hole and the resonance shrinkage energy to conform to a more or lesser extent. The rate can be proportional to the extent of the conformation or resonance of these energies. The temperature can be adjusted to optimize the shrinkage reaction rate-energy production rate. In the case of the $K^+/K^+$ electrocatalytic couple, a preferred embodiment can be to run the reaction at a temperature above room temperature by applying heat with heater 114.

The shrinkage reaction can be dependent on the current density. An increase in current density can be equivalent, in some aspects, to an increase in temperature. The collision rate increases, and the energy of the reactants increases with current density. Thus, the rate can be increased by increasing the collision rate of the reactants; however, the rate may be increased or decreased depending on the effect of the increased reactant energies on the conformation of the energy hole and the resonance shrinkage energy. Also, increased current dissipates more energy by ohmic heating and may cause hydrogen bubble formation, in the case of the shrinkage of hydrogen atoms. But, a high flow of gas may dislodge bubbles which diminishes any hydrogen gas boundary layer. The current density can be adjusted with power controller 108 to optimize the excess energy production. In a preferred embodiment, the current density can be in the range 1 to 1000 milliamps per square centimeter.

The pH of the aqueous electrolytic solution 102 can affect the shrinkage reaction rate. In the case that the electrocatalytic ion or couple is positively charged, an increase in the pH will reduce the concentration of hydronium at the negative cathode; thus, the concentration of the electrocatalytic ion or couple cations will increase. An increase in reactant concentration increases the reaction rate. In the case of the $Rb^+$ or $K^+/K^+$ ($Sc^{3+}/Sc^{3+}$) ion or couple, a preferred pH can be basic (7.1–14).

The counterion of the electrocatalytic ion or couple of the electrolytic solution 102 can affect the shrinkage reaction rate by altering the energy of the transition state. For example, the transition state complex of the $K^+/K^+$ electrocatalytic couple with the hydrogen atom has a plus two charge and involves a three body collision which can be unfavorable. A negative two charged oxyanion can bind the two potassium ions; thus, it provides a neutral transition state complex of lower energy whose formation depends on a binary collision which can be greatly favored. The rate can be dependent on the separation distance of the potassium ions as part of the complex with the oxyanion. The greater the separation distance, the less favorable can be the transfer of an electron between them. A close juxtaposition of the potassium ions will increase the rate. The relationship of the reaction rate to the counterion in the case where the $K^+/K^+$ couple is used can be:

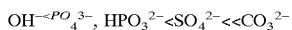

Thus, a planar negative two charge oxyanion including carbonate with at least two binding sites for $K^+$ which provides close juxtaposition of the $K^+$ ions can be preferred as the counterion of the $K^+/K^+$ electrocatalytic couple. The carbonate counterion can be also a preferred counterion for the $Rb^+$ electrocatalytic ion.

A power controller 108 comprising an intermittent current, on-off, electrolysis circuit will increase the excess heat by providing optimization of the electric field as a function of time which provides maximum conformation of reactant energies, provides an optimal concentration of hydrogen atoms (molecules) while minimizing ohmic and electrolysis power losses and, in the case of the shrinkage of hydrogen atoms, minimizes the formation of a hydrogen gas boundary layer. The frequency, duty cycle, peak voltage, step waveform, peak current, and offset voltage are adjusted to achieve the optimal shrinkage reaction rate and shrinkage reaction power while minimizing ohmic and electrolysis power losses. In the case where the $K^+/K^+$ electrocatalytic couple can be used with carbonate as the counterion; nickel as the cathode: and platinum as the anode, a preferred embodiment can be to use an intermittent square-wave having an offset voltage of approximately 1.4 volts to 2.2 volts; a peak voltage of approximately 1.5 volts to 3.75 volts; a peak current of approximately 1 mA to 100 mA per square centimeter of cathode surface area; approximately a 5%–90% duty cycle; and a frequency in the range of 1 Hz to 1500 Hz.

Further energy can be released by repeating the shrinkage reaction. The atoms (molecules) which have undergone shrinkage diffuse into the cathode lattice. A cathode 106 can be used which will facilitates multiple shrinkage reactions of hydrogen atoms (molecules). One embodiment is to use a cathode which can be fissured and porous to the electrocatalytic ion or couple such that it can contact shrunken atoms (molecules) which have diffused into a lattice, including a metal lattice. A further embodiment is to use a cathode of alternating layers of a material which provides hydrogen atoms (molecules) during electrolysis including a transition metal and an electrocatalytic ion or couple such that shrunken hydrogen atoms (molecules) periodically or repetitively diffuse into contact with the electrocatalytic ion or couple.

The shrinkage reaction can be dependent on the dielectric constant of the media. The dielectric constant of the media alters the electric field at the cathode and concomitantly alters the energy of the reactants. Solvents of different dielectric constants have different solvation energies, and the dielectric constant of the solvent can also lower the overpotential for electrolysis and improve electrolysis efficiency. A solvent, including water, can be selected for the electrolytic solution 102 which optimizes the conformation of the energy hole and resonance shrinkage energy and maximizes the efficiency of electrolysis.

The solubility of hydrogen in the reaction solution can be directly proportional to the pressure of hydrogen above the solution. Increasing the pressure increases the concentration of reactant hydrogen atoms (molecules) at the cathode 106 and thereby increases the rate. But, in the case of the shrinkage of hydrogen atoms this also favors the development of a hydrogen gas boundary layer. The hydrogen pressure can be controlled by pressure regulator means 116 to optimize the shrinkage reaction rate.

In a preferred embodiment, the cathode 106 of the electrolytic cell comprises the catalytic material including a hydrogen spillover catalyst described in the Pressurized Gas Energy Reactor Section below. In another embodiment, the cathode comprises multiple hollow vessels comprising a thin film conductive shell whereby lower-energy hydrogen diffuses through the thin film and collects inside each vessel and undergoes disproportionation reactions therein.

The heat output can be monitored with thermocouples present in at least the vessel 100 and the condensor 140 of FIG. 6 and the heat exchanger 60 of FIG. 5. The output power can be controlled by a computerized monitoring and control system which monitors the thermistors and controls the means to alter the power output.

Pressurized Gas Energy Reactor

A pressurized gas energy reactor comprises the first vessel 200 of FIG. 7 containing a source of hydrogen including hydrogen from metal-hydrogen solutions, hydrogen from hydrides, hydrogen from the dissociation of water including thermal dissociation, hydrogen from the electrolysis of water, or hydrogen gas. In the case of a reactor which shrinks hydrogen atoms, the reactor further comprises a means to dissociate the molecular hydrogen into atomic hydrogen such as a dissociating material including an element, compound, alloy, or mixture of transition elements and inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal (carbon), and intercalated Cs carbon (graphite) or electromagnetic radiation including UV light provided by photon source 205 such that the dissociated hydrogen atoms (molecules) contact a source of energy holes including a molten, liquid, gaseous, or solid source of the energy holes including the electrocatalytic ions and couples described in my previous U.S. Patent Applications entitled "Energy/Matter Conversion Methods and Structures", Ser. No. 08/467,051 filed on Jun. 6, 1995 which is a continuation-in-part application of Ser. No. 08/416,040 filed on Apr. 3, 1995 which is a continuation-in-part application of Ser. No. 08/107,357 filed on Aug. 16, 1993, which is a continuation-in-part application of Ser. No. 08/075,102 (Dkt. 99437) filed on Jun. 11, 1993, which is a continuation-in-part application of Ser. No. 07/626,496 filed on Dec. 12, 1990 which is a continuation-in-part application of Ser. No. 07/345,628 filed Apr. 28, 1989 which is a continuation-in-part application of Ser. No. 07/341,733 filed Apr. 21, 1989, which are incorporated herein by reference. The pressurized gas energy reactor further comprises a means 201 to remove the (molecular) lower-energy hydrogen such as a selective venting valve to prevent the exothermic shrinkage reaction from coming to equilibrium. One embodiment comprises heat pipes as heat exchanger 60 of FIG. 5 which have a lower-energy hydrogen venting valve at a cold spot.

A preferred embodiment of the pressurized gas energy reactor of the present invention comprises a first reaction vessel 200 with inner surface 240 comprised of a material to dissociate the molecular hydrogen into atomic hydrogen including an element, compound, alloy, or mixture of transition elements and inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Th, Dy, Ho, Er, Tm, Vb, Lu, Th, Pa, U, activated charcoal (carbon), and intercalated Cs carbon (graphite). In a further embodiment, the inner surface 240 can be comprised of a proton conductor. The first reaction vessel 200 can be sealed in a second reaction vessel 220 and receives hydrogen from source 221 under pressure which can be controlled by pressure measurement and control means 222 and 223. In a preferred embodiment the hydrogen pressure can be in the range of $10^{-3}$ atmospheres to 100 atmospheres. The wall 250 of the first vessel 200 can be permeable to hydrogen. The outer surface 245 and/or outer vessel 220 has a source of energy holes equal to the resonance shrinkage energy. In one embodiment the source of energy holes can be a mixture or solution containing energy holes in the molten, liquid, or solid state. In another embodiment an electric current can be passed through the material having a source of energy holes. The reactor further comprises a means to control the reaction rate such as current source 225 and heating means 230 which heat the first reaction vessel 200 and the second reaction vessel 220. In a preferred embodiment the outer reaction vessel 220 contains oxygen, the inner surface 240 comprises one or more of a coat of nickel, platinum, or palladium. The outer surface 245 can be coated with one or more of copper, tellurium, arsenic, cesium, platinum, or palladium and an oxide such as $CuO_x$, $PtO_x$, $PdO_x$, $MnO_x$, $AlO_x$, $SiO_x$. The electrocatalytic ion or couple can be regenerated spontaneously or via a regeneration means including heating means 230 and current source 225.

In another embodiment, the pressurized gas energy reactor comprises only a single reaction vessel 200 with a hydrogen impermeable wall 250. In the case of a reactor which shrinks hydrogen atoms, one or more of a hydrogen dissociating materials including transition elements and inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal (carbon), and intercalated Cs carbon (graphite) are coated on the inner surface 240 with a source of energy holes including one or more of copper, tellurium, arsenic, cesium, platinum, or palladium and an oxide such as $CuO_x$, $PtO_x$, $PdO_x$, $MnO_x$, $AlO_x$, $SiO_x$. In another embodiment, the source of energy hole can be one of a inelastic photon or particle scattering reaction(s). In a preferred embodiment the photon source 205 supplies the energy holes where the energy hole corresponds to stimulated emission by the photon. In the case of a reactor which shrinks hydrogen atoms the photon source 205 dissociates hydrogen molecules into hydrogen atoms. The photon source producing photons of at least one energy of approximately mX27.21 eV, $$\frac{m}{2} \times 27.21 \text{ eV},$$

or 40.8 eV causes stimulated emission of energy as the hydrogen atoms undergo the shrinkage reaction. In another preferred embodiment, a photon source 205 producing photons of at least one energy of approximately mX48.6 eV, 95.7 eV, or mX31.94 eV causes stimulated emission of energy as the hydrogen molecules undergo the shrinkage reaction.

A preferred inner surface, 240, and outer surface, 245, of the pressurized gas energy reactor including a nickel surface has the properties of a high surface area, a highly stressed and hardened surface such as a cold drawn or cold worked surface, and a large number of grain boundaries.

In an embodiment of the pressurized gas energy reactor, the source of energy holes can be incorporated into the inner surface, 240, and outer surface, 245, mechanically by methods including cold working the source of energy holes into the surface material and thermally by methods including melting the source of energy holes into the surface material (fusion). Further methods of incorporation include dry impregnation, evaporation of a solution of the source of energy holes in contact with the surface material (precipitation), ion bombardment, vacuum deposition, impregnation, leaching, and electrostatic incorporation including electrolytic deposition and electroplating. A preferred method to clean the inner surface 240 and the outer surface 245 including a nickel surface is to fill the inner vessel and the outer vessel with a basic electrolytic solution including approximately 0.57 M $X_2CO_3$ (X is the alkali cation of the electrolyte including $K^+$) and to fill the inner vessel and the outer vessel with a dilute solution of $H_2O_2$. Each of the inner vessel and the outer vessel can be then thoroughly rinsed with distilled water. In one embodiment, at least one of the vessel 200 or the vessel 220 can be then filled with a solution of the energy hole including an approximately 0.57 M $K_2CO_3$ solution.

In a further embodiment, textural and/or structural promoters are incorporated with the source of energy holes to increase the shrinkage reaction rate.

In one embodiment of the method of operation of the pressurized gas energy reactor, hydrogen can be introduced inside of the first vessel from source 221 under pressure which can be controlled by pressure control means 222. In the case of a reactor which shrinks hydrogen atoms, the molecular hydrogen can be dissociated into atomic hydrogen by a dissociating material or electromagnetic radiation including UV light provided by photon source 205 such that the dissociated hydrogen atoms contact a source of energy holes including a molten, liquid, gaseous, or solid source of the energy holes. The atomic (molecular) hydrogen releases energy as its electrons are stimulated to undergo transitions to lower energy levels by the energy holes. Alternatively, the hydrogen dissociates on the inner surface 240, diffuses though the wall 250 of the first vessel 200 and contacts a source of energy holes on the outer surface 245 or contact a source of energy holes including a molten, liquid, gaseous, or solid source of the energy holes as hydrogen atoms or recombined hydrogen molecules. The atomic (molecular) hydrogen releases energy as its electrons are stimulated to undergo transitions to lower energy levels by the energy holes. The electrocatalytic ion or couple can be regenerated spontaneously or via a regeneration means including heating means 230 and current source 225. The (molecular) lower-energy hydrogen can be removed from vessel 200 and/or vessel 220 by a means to remove the (molecular) lower-energy hydrogen such as a selective venting valve means 201 which prevents the exothermic shrinkage reaction from coming to equilibrium. To control the reaction rate (the power output), an electric current can be passed through the material having a source of energy holes equal to the resonance shrinkage energy with current source 225, and/or the first reaction vessel 200 and the second reaction vessel 220 are heated by heating means 230. The heat output can be monitored with thermocouples present in at least the first vessel 200, the second vessel 220, and the heat exchanger 60 of FIG. 5. The output power can be controlled by a computerized monitoring and control system which monitors the thermistors and controls the means to alter the power output. The (molecular) lower-energy hydrogen can be removed by a means 201 to prevent the exothermic shrinkage reaction from coming to equilibrium.

A method of preparation of the catalytic material of the present invention of catalytic systems that hinge on the transfer of an electron from a cation to another capable of producing energy holes for shrinking hydrogen atoms includes the steps of:

Mixing the oxides of the cations with the hydrogen dissociating material.

Thoroughly mixing by repeatedly sintering and pulverizing.

Example of a Ceramic Catalytic Material: Strontium Niobium Oxide ($SrNb_2O_6$) on Ni Powder To prepare the ceramic catalytic material: strontium niobium oxide ($SrNb_2O_6$) on Ni powder, 2.5 kg of $SrNb_2O_6$ are added to 1.5 kg of –300 mesh Ni powder. The materials are mixed to make a homogeneous mixture. The powder can be sintered or calcinated in an oven at 1600° C. in atmospheric air for 24 hours. The material can be cooled and ground to remove lumps. The material can be re-sintered at 1600° C. in air for another 24 hours. The material can be cooled to room temperature and powderized.

A method of preparation of the catalytic material of the present invention of catalytic systems that hinge on the transfer of an electron from a cation to another capable of producing energy holes for shrinking hydrogen atoms includes the steps of:

Dissolving ionic salts of the cations into a solvent. In a preferred embodiment, the ionic salts are dissolved in deionized demineralized water to concentration of 0.3 to 0.5 molar.

Uniformly wetting a dissociation material with the dissolved salt solution.

Draining the excess solution.

Drying the wetted dissociation material in an oven preferably at a temperature of 220° C.

Pulverizing the dried catalytic material into a powder.

Example of a Ionic Catalytic Material: Potassium Carbonate ($K_2CO_3$) on Ni Powder To prepare the ionic catalytic material: potassium carbonate ($K_2CO_3$) on Ni powder, a 1 liter solution of 0.5 M $K_2CO_3$ in water is poured over 500 grams of −300 mesh Ni powder. The materials are stirred to remove air pockets around the grains of Ni. The excess solution can be drained off. The powder can be dried in an oven at 200° C. If necessary the material can be ground to remove lumps.

Hydrogen Spillover Catalysts

In a preferred embodiment, the source of hydrogen atoms for the catalytic shrinkage reaction comprises a hydrogen spillover catalyst.

A hydrogen spillover catalyst according to the present invention comprises:

A hydrogen dissociation material or means which forms free hydrogen atoms or protons;

A conduit material onto which free hydrogen atoms spill and which supports free, mobile hydrogen atoms and provides a path or conduit for the flow of hydrogen atoms or protons;

A source of energy holes which catalyze the shrinkage reaction, and optionally

A support material into which the former materials are embedded as a mixture, compound, or solution.

Such hydrogen dissociation materials include surfaces or materials to dissociate hydrogen, deuterium, or tritium, comprise an element, compound, alloy, or mixture of transition elements and inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal (carbon), and intercalated Cs carbon (graphite). Such conduit materials onto which free hydrogen atoms spill and which supports free, mobile hydrogen atoms and which provides a path or conduit for the flow of hydrogen atoms include nickel, platinum, carbon, tin, iron, aluminum, and copper and their compounds, mixtures, or alloys. In an embodiment, such support materials into which the former materials are embedded as a mixture, compound, or solution includes carbon, silica, nickel, copper, titania, zinc oxide, chromia, magnesia, zirconia, alumina, silica-alumina, and zeolites. In an embodiment, one or more of the other components are deposited on the support material by electroplating. The source of energy holes to cause atomic hydrogen "shrinkage" are preferably of approximately mX27.21 eV and/or to cause molecular hydrogen "shrinkage" are of approximately mX48.6eV where m is an integer including the electrocatalytic ions and couples described in my previous U.S. Patent Applications entitled "Energy/Matter Conversion Methods and Structures", Ser. No. 08/467,051 filed on Jun. 6, 1995 which is a continuation-in-part application of Ser. No. 08/416,040 filed on Apr. 3, 1995 which is a continuation-in-part application of Ser. No. 08/107,357 filed on Aug. 16, 1993, which is a continuation-in-part application of Ser. No. 08/075,102 (Dkt. 99437) filed on Jun. 11, 1993, which is a continuation-in-part application of Ser. No. 07/626,496 filed on Dec. 12, 1990 which is a continuation-in-part application of Ser. No. 07/345,628 filed Apr. 28, 1989 which is a continuation-in-part application of Ser. No. 07/341,733 filed Apr. 21, 1989, which are incorporated herein by reference. The counterion of the energy hole of the spillover catalyst includes those given in the Handbook of Chemistry and Physics, Robert C. Weast, Editor, 58th Edition, CRC Press, West Palm Beach, Fla., (1974) pp. B61–B178 which is incorporated by reference herein, organic ions including benzoic acid, phthalate, salicylate, aryl sulfonate, alky sulfate, alkyl sulfonate, and alkyl carboxylate, and the anion of an acid which forms an acid anhydride including sulfite, sulfate, carbonate, bicarbonate, nitrite, nitrate, perchlorate, phosphite, hydrogen phosphite, dihydrogen phosphite, phosphate, hydrogen phosphate, and dihydrogen phosphate. In another embodiment the anion can be in equilibrium with its acid and its acid anhydride.

The functionalities of the hydrogen spillover catalyst are combined with the other functionalities as separate species or as combinations comprising a mixture, solution, compound, or alloy of more than one functionality. For example, in one embodiment, the hydrogen dissociation material and the source of energy holes each comprise homogeneous crystals— each crystal contains one component. and these functionalities are mixed with the conduit material without a support material. Whereas, in another embodiment, the hydrogen dissociation material and the source of energy holes comprise heterogeneous crystals-each crystal contains both of the components, and the heterogeneous crystals are mixed with the conduit material which coats a support material. In a third exemplary embodiment, the source of energy holes can be embedded in the conduit material. and this combined species can be mixed with the hydrogen dissociation material which can be embedded in the same or a different conduit material without a support material.

A method of preparation of the hydrogen spillover catalytic material of the present invention includes the steps of:

Mixing the components of the spillover catalyst by the method of incipient wetness impregnation.

Thoroughly mixing the components by sintering.

A further method of preparation of the hydrogen spillover catalytic material of the present invention includes the steps of:

Dissolving or dispersing the components to be mixed in a suitable solvent such as water and drying the solution or mixture.

Removing the solvent by drying, or the wet mixture, suspension, or solution can be frozen and the solvent can be sublimed.

Thoroughly mixing the components by sintering.

An incipient wetness method of preparation of the hydrogen spillover catalytic material of the present invention comprising a source of energy holes for shrinking hydrogen atoms that hinge on the transfer of an electron from a cation to another includes the steps of:

Dissolving a desired weight of the ionic salts of the cations into a desired volume of solvent. In a preferred embodiment, the ionic salts are dissolved in deionized demineralized water.

Preparing an incipiently wet conduit-hydrogen dissociation material by uniformly wetting the conduit-hydrogen dissociation material with the dissolved salt solution so that the pores of the material are just filled. The total volume of solvent required can be the desired amount, and the weight percent of the ionic salts of the cations in the final material can be determined by the desired weight of the ionic salts of the cations dissolved in the desired volume of solvent.

Mechanically mixing the wetted material to insure uniform wetting.

Drying the incipiently wet conduit-hydrogen dissociation material in an oven preferably at a temperature of 150° C. In an embodiment the material can be heated until the counterion(s) of the cations chemically decompose to preferably oxides.

Pulverizing the dried material comprised of the conduit-hydrogen dissociation-source of energy holes material into a powder.

Optionally, mechanically mixing the dried and powdered material with further hydrogen dissociation material including a powder mixed with a conduit material and a support material.

Example of a Ionic Hydrogen Spillover Catalytic Material: 40% by Weight Potassium Nitrate ($KNO_3$) on 1%-Pd-on-Graphitic Carbon Powder To prepare one kilogram of the ionic hydrogen spillover catalytic material: 40% by weight potassium nitrate ($KNO_3$) on 1%-Pd-on-graphitic carbon powder, 0.40 kg of $KNO_3$ are dissolved in 1 liter of $H_2O$. Incipient wetness requires 1 ml of $H_2O$ per gram of −300 mesh graphite powder, and 0.67 grams of $KNO_3$ are required per gram of graphitic carbon powder to achieve a 40% by weight $KNO_3$ content in the final material. The aqueous $KNO_3$ solution can be slowly added to 0.6 kg of 1%-Pd-on-300-mesh-graphitic carbon powder as the slurry can be mixed. The slurry can be then placed on an evaporation dish which can be inserted into an oven at 150° C. for one hour. Heating causes the water to evaporate from the slurry. The $KNO_3$ coated 1%-Pd-on-graphitic carbon can be ground into a powder.

Another incipient wetness method of preparation of the hydrogen spillover catalytic material of the present invention comprising a source of energy holes for shrinking hydrogen atoms that hinge on the transfer of an electron from a cation to another includes the steps of:

Dissolving a desired weight of the ionic salts of the cations into a desired volume of solvent. In a preferred embodiment, the ionic salts are dissolved in deionized demineralized water.

Preparing an incipiently wet conduit material by uniformly wetting the conduit material with the dissolved salt solution so that the pores of the material are just filled. The total volume of solvent required can be the desired amount, and the weight percent of the ionic salts of the cations in the final material can be determined by the desired weight of the ionic salts of the cations dissolved in the desired volume of solvent.

Mechanically mixing the wetted material to insure uniform wetting.

Drying the incipiently wet conduit material in an oven preferably at a temperature of 150° C. In an embodiment, the material can be heated until the counterion(s) of the cations chemically decompose to preferably oxides.

Pulverizing the dried material comprised of the conduit material and the source of energy holes into a powder.

Mechanically mixing the dried and powdered material with a hydrogen dissociation material including a powder mixed with a conduit material and a support material.

Example of a Ionic Hydrogen Spillover Catalytic Material: 40% by Weight Potassium Nitrate ($KNO_3$) on Graphitic Carbon Powder with 5% by Weight 1%-Pd-on-Graphitic Carbon Powder To prepare one kilogram of the ionic hydrogen spillover catalytic material: 40% by weight potassium nitrate ($KNO_3$) on graphitic carbon powder with 5% by weight 1%-Pd-on-graphitic carbon powder, 0.67 kg of $KNO_3$ are dissolved in 1 liter of $H_2O$. Incipient wetness requires 1 ml of $H_2O$ per gram of −300 mesh graphite powder, and 0.40 grams of $KNO_3$ are required per gram of graphite powder to achieve a 40% by weight $KNO_3$ content in the final material. The aqueous $KNO_3$ solution can be slowly added to 0.55 kg of graphite powder as the slurry can be mixed. The slurry can be then placed on an evaporation dish which can be inserted into an oven at 150° C. for one hour. Heating causes the water to evaporate from the slurry. The $KNO_3$ coated graphite can be ground into a powder. The powder can be weighed. Approximately 50 grams (5% of the weight of the $KNO_3$ coated graphite) of 1%-Pd-on-−300-mesh graphitic carbon powder can be mixed into the $KNO_3$ coated graphitic carbon powder.

Example of the Mode of Operation of the Exemplary Catalytic Materials

The catalytic material can be placed into the pressurizable vessel 200. The vessel can be flushed with an inert gas such as He, Ar, or Ne to remove air contaminants in the vessel. The vessel and its contents are heated to the operational temperature, typically 100° C. to 400° C., before the vessel can be pressurized with hydrogen, typically 20 to 140 PSIG.

In an embodiment, the source of energy holes is potassium ions ($K^+/K^+$) or rubidium ions ($Rb^+$) intercalated into carbon. In another embodiment, the source of energy holes is an amalgam of the electrocatalytic ion or couple and its reduced metallic form such as rubidium ions ($Rb^+$) and rubidium metal or potassium ions ($K^+/K^+$) and potassium metal.

In an embodiment, the source of hydrogen atoms is a hydrogen dissociation means including a hydrogen gas stream blown over a hot filament or grid such as a hot refractory metal including a filament or grid of Ti, Ni, Fe, W, Au, Pt, or Pd at an elevated temperature such as 1800° C. The dissociation means provides hydrogen atoms as well as hydrogen ions, and the momentum of the atoms brings them in contact with the source of energy holes. Or, the hydrogen atoms and ions sputter onto the spillover catalyst. In one preferred embodiment of the pressurized gas reactor, a low pressure can be maintained by pressure regulator means 222 and a pump means 223 to minimize hydrogen atom recombination into molecular hydrogen and remove (molecular) lower-energy hydrogen.

In an embodiment the source of hydrogen atoms is water which dissociates to hydrogen atoms and oxygen on a water dissociation material such as an element, compound, alloy, or mixture of transition elements and inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal (carbon), and intercalated Cs carbon (graphite). In a further embodiment, the water dissociation material can be maintained at an elevated temperature by a heat source and temperature control means 230. In an embodiment including one comprising a hydrogen spillover catalyst, the source of hydrogen can be from hydrocarbons including natural gas which can be reformed on a reforming a material such as nickel, cobalt, iron, or a platinum-group metal to hydrogen atoms and carbon dioxide. In a further embodiment, the reforming material can be maintained at an elevated temperature by a heat source and a temperature control means 230. In another embodiment, the source of hydrogen atoms can be from the decomposition of a metal hydride where the decomposition can be controlled by controlling the temperature of the metal hydride with the heat source and temperature control means 230. In another embodiment, the hydride can be coated by methods including electroplating with another material such as the hydrogen dissociation material.

In a preferred embodiment a product of the shrinkage reaction, (molecular) lower-energy hydrogen, can be removed to prevent product inhibition. Thus, the forward energy yielding reaction rate can be increased. One means to remove lower-energy (molecular) hydrogen is to supply the reaction mixture with a scavenger for lower-energy hydrogen. The scavenger absorbs or reacts with the product, lower-energy, hydrogen, and the resulting species can be removed from the reaction mixture. In another embodiment lower-energy hydrogen which is absorbed on the catalysts can be removed via displacement with an inert molecule or atom such as helium that flows through the vessel 200.

Other objects, features, and characteristics of the art of catalysis as well as the methods of preparation, operation and the functions of the related elements, as described by Satterfield [Charles N. Satterfield, Heterogeneous Catalysis in Industrial Practice, Second Edition, McGraw-Hill, Inc., New York, (1991)] are applied to the present invention and are incorporated by reference herein. Application of the art of catalysis to the present invention of a pressurized gas energy reactor for the release of energy by the catalytic reaction wherein the electrons of hydrogen atoms undergo transitions to lower energy states include the use of an adiabatic reactor, fluidized-bed reactor, transport line reactor, multitube reactor, reverse multitube reactor having the heat exchange means including a fluid in the tubes and the catalytic material surrounding the tubes, and a multitube reactor or reverse multitube reactor comprising a fluidized bed of the catalytic material. Furthermore, in an embodiment comprising a solvated source of energy holes, a suspended hydrogen dissociation material including a hydrogen spillover catalyst, and hydrogen gas, the reactor comprises a trickle-bed reactor, a bubble-column reactor, or a slurry reactor.

For example, in a preferred embodiment, the fluidized bed reactor 200 comprises the hydrogen spillover catalytic material: 40% by weight potassium nitrate ($KNO_3$) on graphitic carbon powder with 5% by weight 1%-Pd-on-graphitic carbon powder. The reacting hydrogen gas can be passed up through a bed of the finely divided solid catalytic material, preferably having a particle size in the range of about 20 to 100 $\mu$m, which can be highly agitated and assumes many of the characteristics of a fluid. A cyclone separator 275 returns the fines to the bed. The hydrogen pressure and flow rate are controlled by pressure and flow rate control means 222. Preferably at atmospheric or slightly higher pressures, the corresponding maximum linear velocity can be less than 60 cm/s.

Gaseous Source of Energy Holes

A preferred hydrogen gas energy reactor for the release of energy by an electrocatalytic and/or a disproportination reaction, wherein the electrons of hydrogen atoms undergo transitions to lower energy states in the gas phase, comprises a vessel 200 of FIG. 7 capable of containing a vacuum or pressures greater than atmospheric; a source of hydrogen 221; a means 222 to control the pressure and flow of hydrogen into the vessel; a source of atomic hydrogen in the gas phase, and a source of energy holes in the gas phase.

The reaction vessel 200 comprises a vacuum or pressure vessel comprised of a temperature resistance material such as ceramic, stainless steel, tungsten, alumina, Incoloy, and Inconel.

In an embodiment, the source of hydrogen atoms in the gas phase is a hydrogen dissociation means including a hydrogen gas stream blown over a hot filament or grid 280 such as a hot refractory metal including a filament or grid of Ti, Ni, Fe, W, Au, Pt, or Pd at an elevated temperature such as 1800° C. The dissociation means provides hydrogen atoms as well as hydrogen ions, and the momentum of the atoms brings them in contact with the source of energy holes. In a preferred embodiment of the gaseous-source-of-energy-holes gas reactor, a low pressure can be maintained by pressure regulator means 222 and a pressure measurement and pump means 223 to minimize hydrogen atom recombination into molecular hydrogen. The pressure can be measured by measuring the power dissipated in the hot filament or grid which can be operated at constant resistance by a servo loop 285 comprising a voltage and current measurement means, a power supply, and a voltage and current controller where the hydrogen pressure versus power dissipation of the filament or grid at the operating resistance has been calibrated. In another embodiment, the source of atomic hydrogen comprises one or more hydrogen dissociation materials which provide hydrogen atoms by dissociation of molecular hydrogen. Such hydrogen dissociation materials include surfaces or materials to dissociate hydrogen, deuterium, or tritium, including a hydrogen spillover material such as palladium or platinum on carbon and an element, compound, alloy, or mixture of transition elements and inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal (carbon), and intercalated Cs carbon (graphite). In one embodiment, nonequilibrium conditions of the hydrogen and hydride are maintained by controlling the temperature and hydrogen pressure to provide atomic hydrogen in the gas phase. In another embodiment, the source of atomic hydrogen comprises a tungsten capillary which on the outlet can be heated by electron bombardment to 1800–2000 K such as the atomic hydrogen source described by Bischler [Bischler, U.; Bertel, E., J. Vac. Sci. Technol., A. (1993), 11(2), 458–60] which is incorporated herein by reference. In a further embodiment, the tungsten capillary can be heated by the energy released by the hydrogen shrinkage reaction. In another embodiment, the source of atomic hydrogen comprises an inductively coupled plasma flow tube such as that described by Gardner [Gardner, W. L., J. Vac. Sci. Technol., A. (1995), 13(3, Pt. 1), 763–6] which is incorporated herein by reference, and the hydrogen dissociation fraction can be measured with the sensor of Gardner.

The source of energy holes can be placed in a chemically resistant open container such as a ceramic boat 290 inside the reaction vessel. Or, the source of energy holes can be placed in a vessel which has a connection for the passage of the gaseous source of energy holes to the reaction vessel.

The cell can have a boat or container, which is connected to the reaction vessel, for containing the material used for forming the gaseous catalyst.

The gaseous source of energy holes includes those that sublime, boil, and/or are volatile at the elevated operating temperature of the gas energy reactor wherein the shrinkage reaction occurs in the gas phase. For example, $RbNO_3$ and $KNO_3$ are each volatile at a temperature much less than that at which each decomposes [C. J. Hardy, B. O. Field, J. Chem. Soc., (1963), pp. 5130–5134]. In one embodiment, the ionic hydrogen spillover catalytic material: 40% by weight potassium or rubidium nitrate on graphitic carbon powder with 5% by weight 1%-Pd-on-graphitic carbon powder can be operated at a temperate at which the potassium or rubidium nitrate can be volatile. Further disproportionation reactions of the product, lower-energy hydrogen atoms, release additional heat energy.

In a preferred embodiment, the source of energy holes is a thermally stable salt of rubidium or potassium such as RbF, RbCl, RbBr, RbI, $Rb_2S_2$, RbOH, $Rb_2SO_4$, $Rb_2CO_3$, $Rb_3PO_4$, and KF, KCl, KBr, KI, $K_2S_2$, KOH, $K_2SO_4$, $K_2CO_3$, $K_3PO_4$, $K_2GeF_4$. Further preferred sources of energy holes of approximately mX27.21 eV to cause atomic hydrogen "shrinkage" and/or approximately mX48.6 eV to cause molecular hydrogen "shrinkage" where m is an integer include the electrocatalytic ions and couples described in my previous U.S. Patent Applications entitled "Energy/Matter Conversion Methods and Structures", Ser. No. 08/467,051 filed on Jun. 6, 1995 which is a continuation-in-part application of Ser. No. 08/416,040 filed on Apr. 3, 1995 which is a continuation-in-part application of Ser. No. 08/107,357 filed on Aug. 16, 1993, which is a continuation-in-part application of Ser. No. 08/075,102 (Dkt. 99437) filed on Jun. 11, 1993, which is a continuation-in-part application of Ser. No. 07/626,496 filed on Dec. 12, 1990 which is a continuation-in-part application of Ser. No. 07/345,628 filed Apr. 28, 1989 which is a continuation-in-part application of Ser. No. 07/341,733 filed Apr. 21, 1989, which are incorporated herein by reference. The counterion includes those given in the Handbook of Chemistry and Physics, Robert C. Weast, Editor, 58th Edition, CRC Press, West Palm Beach, Fla., (1974) pp. B61–B178 which is incorporated by reference herein. The preferred anion can be stable to hydrogen reduction and thermal decomposition and can be volatile at the operating temperature of the energy reactor.

The catalyst may be an ionic compound which is resistant to hydrogen reduction. Moreover, the catalyst is adapted to provide gaseous atoms which may be ionized.

The following compounds are preferred gaseous sources of energy holes in the gas energy reactor. Higher temperatures result in a higher vapor pressure of the source of energy holes which increases the reaction rate; however, the increase in total pressure increases the recombination rate of hydrogen atoms to hydrogen molecules. In each exemplary case that follows, the operating temperature of the energy reactor can be that which provides an optimal reaction rate. In an embodiment, the cell temperature can be about 50° C. higher than the (highest) melting point of the source of energy holes (in the case that the source of energy holes comprises an electron transfer between two cations—an electrocatalytic couple). The hydrogen pressure can be maintained at about 200 millitorr, and molecular hydrogen can be dissociated with a hot filament or grid 280 of FIG. 7.

Single Ion Catalysts (Electrocatalytic Ions)

Single-ion catalysts (electrocatalytic ions) capable of producing energy holes for shrinking hydrogen atoms. The number following the atomic symbol (n) is the nth ionization energy of the atom. That is for example, $Rb^+ + 27.28$ eV = $Rb^{2+} + e^-$. (melting point=(MP); boiling point=(BP))

| Catalytic Ion | n | nth ionization energy |
|---|---|---|
| $Mo^{2+}$ | 3 | 27.16 |
| $MoI_2$ | | |
| $Ti^{2+}$ | 3 | 27.49 |
| $TiCl_2$(MP = subl $H_2$,BP = d 475° C. vac) ($TiCl_4/Ti_{metal}$) | | |
| $Rb^{1+}$ | 2 | 27.28 |
| $RbNO_3$(MP = 310° C.,BP = subl) | | |
| $Rb_2S_2$(MP = 420° C.,BP = volat > 850) | | |
| RbI(MP = 647° C.,BP = 1300° C.) | | |

Two Ion Catalyts (Electrocatalytic Couples)

Two-ion catalysts (electrocatalytic couples) capable of producing energy holes for shrinking hydrogen atoms. The number in the column following the ion, (n), is the nth ionization energy of the atom. That is for example, $K^+ + 31.63$ eV = $K^{2+} + e^-$ and $K^+ + e^- = K + 4.34$ eV. (melting point=(MP); boiling point=(BP))

| Atom Energy Oxidized Hole (ev) | n | nth Ionization Energy (ev) | Atom Reduced | n | nth Ionization Energy (ev) |
|---|---|---|---|---|---|
| Sn 4+ 27.14 | 5 | 72.28 | Si 4+ | 4 | 45.14 |
| $SnCl_4$(MP = −33° C.,BP = 114.1° C.) $SiCl_4$(MP = −70° C., BP = 57.57° C.) | | | | | |
| Pr 3+ 27.11 | 4 | 38.98 | Ca 2+ | 2 | 11.87 |
| $PrBr_3$(MP = 691° C.,BP = 1547° C.) $CaBr_2$(MP = 730° C. sl d, BP = 806 – 812° C.) | | | | | |
| Sr 2+ 27.10 | 3 | 43.60 | Cr 2+ | 2 | 16.50 |
| $SrCl_2$(MP = 875° C.,BP = 1250° C.) $CrI_2$(MP = 856° C., BP = 800 sub vac° C.) | | | | | |
| Cr 3+ 27.19 | 4 | 49.10 | Tb 3+ | 3 | 21.91 |
| $CrF_3$(MP = >1000° C.,BP = 1100 – 1200° C. subl) $TbI_3$(MP = 946° C.,BP > 1300° C.) | | | | | |
| Sb 3+ 27.14 | 4 | 44.20 | Co 2+ | 2 | 17.06 |
| $SbCl_3$(MP = 73.4° C.,BP = 283° C.) $CoCl_2$(MP = 724° C. in HCl gas, BP = 1049° C.) | | | | | |
| Bi 3+ 27.13 | 4 | 45.30 | Ni 2+ | 2 | 18.17 |
| $BiCl_3$(MP = 230 – 232° C.,BP = 447° C.) $NiCl_2$(MP = 1001° C., BP = 973° C. subl) | | | | | |
| Pd 2+ 27.14 | 3 | 32.93 | In 1+ | 1 | 5.79 |
| $PdF_2$ (MP = volat) InCl(MP = 225° C.,BP = 608° C.) | | | | | |
| La 3+ 27.15 | 4 | 49.95 | Dy 3+ | 3 | 22.80 |
| $LaCl_3$(MP = 860° C.,BP > 1000° C.) $DyCl_3$(MP = 718° C., BP = 1500° C.) | | | | | |
| La 3+ 27.11 | 4 | 49.95 | Ho 3+ | 3 | 22.84 |
| $LaI_3$(MP = 772° C.) $HoI_3$(MP = 989° C.,BP = 1300° C.) | | | | | |
| K 1+ 27.28 | 2 | 31.63 | K 1+ | 1 | 4.34 |
| $KNO_3$(MP = 334° C.,BP = subl) $KNO_3$(MP = 334° C.,BP = subl) $K_2S_2$(MP = 470° C.) $K_2S_2$(MP = 470° C.) KI(MP = 681° C.,BP = 1330° C.) KI(MP = 681° C.,BP = 1330° C.) | | | | | |
| V 3+ 27.28 | 4 | 46.71 | Pd 2+ | 2 | 19.43 |
| $VF_3$(MP > 800° C.,BP Subl) $PbF_2$(MP = 855° C.,BP = 1290° C.) VOCl(BP = 127° C.) $PbI_2$(MP = 402° C.,BP = 954° C.) | | | | | |
| Lu 3+ 27.23 | 4 | 45.19 | Zn 2+ | 2 | 17.96 |
| $LuCl_3$(MP = 905° C.,BP = subl 750° C.) $PbCl_2$(MP = 283° C., BP = 732° C.) | | | | | |
| As 3+ 27.29 | 4 | 50.13 | Ho 3+ | 3 | 22.84 |
| $AsI_3$(MP = 146° C.,BP = 403° C.) $HoI_3$(MP = 989° C., BP = 1300° C.) | | | | | |
| Mo 5+ 27.27 | 6 | 68.00 | Sn 4+ | 4 | 40.73 |
| $MoCl_5$(MP = 194° C.,BP = 268° C.) $SnCl_4$(MP = −33° C., BP = 114.1° C.) | | | | | |
| Sb 3+ 27.29 | 4 | 44.20 | Cd 2+ | 2 | 16.91 |
| $SbI_3$(MP = 170° C.,BP = 401° C.) $CdI_2$(MP = 387° C., BP = 796° C.) | | | | | |
| Ag 2+ 27.25 | 3 | 34.83 | Ag 1+ | 1 | 7.58 |
| $AgF_2$(MP = 690° C.,BP = 700° C. d) AgF(MP = 435° C., BP = 1159° C.) | | | | | |
| La 3+ 27.21 | 4 | 49.95 | Er 3+ | 3 | 22.74 |
| $LaI_3$(MP = 772° C.,BP = 1000° C.) $ErI_3$(MP = 1020° C., BP = 1280° C.) | | | | | |
| V 4+ 27.30 | 5 | 65.23 | B 3+ | 3 | 37.93 |
| $VCl_4$(MP = −28° C.,BP = 148.5° C.) $BCl_3$(MP = −107.3° C., BP = 12.5° C.) | | | | | |
| Fe 3+ | 4 | 54.80 | Ti 3+ | 3 | 27.49 |

-continued

| Atom Energy Oxidized-Hole (ev) | n | nth Ionization Energy (ev) | Atom Reduced | n | nth Ionization Energy (ev) |
|---|---|---|---|---|---|
| 27.31 FeCl$_3$(MP = 306° C.,BP = 315° C. d) TiCl$_3$(MP = 440° C. d, BP = 660° C.) | | | | | |
| Co 2+ 27.39 | 3 | 33.50 | Tl 1+ | 1 | 6.11 |
| CoI$_2$(MP = 515 vac° C.,BP = 570° C. vac) TlI(MP = 440° C. d, BP = 823° C.) | | | | | |
| CoF$_2$(MP = 1200° C.,BP = 1400° C.) TlF(MP = 327° C. d, BP = 655° C.) | | | | | |
| Bi 3+ 27.34 | 4 | 45.30 | Zn 2+ | 2 | 17.96 |
| BiBr$_3$(MP = 218° C.,BP = 453° C.) ZnBr$_2$(MP = 394° C. d, BP = 650° C.) | | | | | |
| As 3+ 27.33 | 4 | 50.13 | Dy 3+ | 3 | 22.80 |
| AsI$_3$(MP = 146° C.,BP = 403° C.) DyI$_3$(MP = 955° C. d, BP = 1320° C.) | | | | | |
| Ho 3+ 27.47 | 4 | 42.50 | Mg 2+ | 2 | 15.03 |
| HoCl$_3$(MP = 718° C.,BP = 1500° C.) MgCl$_2$(MP = 714° C., BP = 1412° C.) | | | | | |
| K 1+ 27.45 | 2 | 31.63 | Rb 1+ | 1 | 4.18 |
| KI(MP = 618° C.,BP = 1330° C.) RbI(MP = 647° C.,BP = 1300° C.) | | | | | |
| Cr 3+ 27.48 | 4 | 49.10 | Pr 3+ | 3 | 21.62 |
| CrCl$_3$(MP = 1150° C.,BP = 1300° C. subl) PrCl$_3$(MP = 786° C., BP = 1700° C.) | | | | | |
| Sr 2+ 27.42 | 3 | 43.60 | Fe 2+ | 2 | 16.18 |
| SrCl$_2$(MP = 875° C.,BP = 1250° C.) FeCl$_2$(MP = 670° C.,BP subl) | | | | | |
| Ni 2+ 27.44 | 3 | 35.17 | Cu 1+ | 1 | 7.73 |
| NiCl$_2$(MP = 1001° C.,BP = 973° C. subl) CuCl(MP = 430° C., BP = 1490° C.) | | | | | |
| Sr 2+ 27.45 | 3 | 43.60 | Mo 2+ | 2 | 16.15 |
| SrCl$_2$(MP = 875° C.,BP = 1250° C.) MoCl$_2$ | | | | | |
| Y 3+ 27.46 | 4 | 61.80 | Zr 4+ | 4 | 34.34 |
| YCl$_3$(MP = 721° C.,BP = 1507° C.) ZrCl$_4$(MP = 437° C., BP = 331° C. subl) | | | | | |
| Cd 2+ 27.48 | 3 | 37.48 | Ba 2+ | 2 | 10.00 |
| CdI$_2$(MP = 387° C.,BP = 796° C.) BaI$_2$(MP = 740° C.) | | | | | |
| Ho 3+ 27.47 | 4 | 42.50 | Pb 2+ | 2 | 15.03 |
| HoI$_3$(MP = 989° C.,BP = 1300° C.) PbI$_2$(MP = 402° C., BP = 954° C.) | | | | | |
| Pd 2+ 27.54 | 3 | 32.93 | Li 1+ | 1 | 5.39 |
| PdF$_2$(MP = volat) LiF(MP = 845° C.,BP = 1676° C.) | | | | | |
| Eu 3+ 27.56 | 4 | 42.60 | Mg 2+ | 2 | 15.03 |
| EuCl$_3$(MP = 850° C.) MgCl$_2$(MP = 714° C.,BP = 1412° C.) | | | | | |
| Er 3+ 27.56 | 4 | 42.60 | Mg 2+ | 2 | 15.03 |
| ErCl$_3$(MP = 774° C.,BP = 1500° C.) MgCl$_2$(MP = 714° C., BP = 1412° C.) | | | | | |
| Bi 4+ 27.55 | 5 | 56.00 | Al 3+ | 3 | 28.45 |
| BiCl$_4$(MP = 226° C.) AlCl$_3$(MP = 190° C.,BP = 177.8° C. subl) | | | | | |
| Ca 2+ 27.51 | 3 | 50.91 | Sm 3+ | 3 | 23.40 |
| CaBr$_2$(MP = 730° C. sl d, BP = 806 – 812° C.) SmBr$_3$(MP subl > 1000° C.) | | | | | |
| V 3+ 27.53 | 4 | 46.71 | La 3+ | 3 | 19.18 |
| VaF$_3$(MP > 800° C., subl) LaCl$_3$(MP = 860° C.,BP > 1000° C.) | | | | | |
| Gd 3+ 27.50 | 4 | 44.00 | Cr 2+ | 2 | 16.50 |
| GdI$_3$(MP = 926° C.,BP = 1340° C.) CrI$_2$(MP = 856° C., BP = 800° C. subl vac) | | | | | |
| Mn 2+ 27.56 | 3 | 33.67 | Ti 1+ | 1 | 6.11 |
| MnI$_2$(MP = 638° C. vac, BP = 500° C. subl vac) TlF(MP = 327° C., BP = 655° C.) | | | | | |
| Yb 3+ 27.52 | 4 | 43.70 | Fe 2+ | 2 | 16.18 |
| YbBr$_3$(MP = 956° C.,BP = d) FeBr$_2$(MP = 684° C. d) | | | | | |
| Ni 2+ 27.59 | 3 | 35.17 | Ag 1+ | 1 | 7.58 |
| NiCl$_2$(MP = 1001° C.,BP = 973° C. subl) AgCl(MP = 455° C., BP = 1550° C.) | | | | | |
| Zn 2+ 27.54 | 3 | 39.72 | Yb 2+ | 2 | 12.18 |
| ZnCl$_2$(MP = 283° C.,BP = 732° C. subl) YbCl$_2$(MP = 702° C., BP = 1900° C.) | | | | | |
| Se 4+ 27.57 | 5 | 68.30 | Sn 4+ | 4 | 40.73 |
| SeF$_4$(MP = –13.8° C.,BP > 100° C.) SnCl$_4$(MP = –33° C., BP = 114.1° C.) SnF$_4$(MP = 705° C.subl) | | | | | |
| Sb 3+ 27.51 | 4 | 44.20 | Bi 2+ | 2 | 16.69 |
| SbI$_3$(MP = 170° C.,BP = 401° C.) BiI$_2$(MP = 400° C., BP = subl vac) | | | | | |
| Eu 3+ 27.57 | 4 | 42.60 | Pb 2+ | 2 | 15.03 |
| EuF$_3$(MP = 1390° C.,BP = 2280° C.) PbCl$_2$(MP = 501° C., BP = 950° C.) | | | | | |

In an embodiment wherein the anion can be reduced by hydrogen, the anion is chemically stabilized. For example, the product of the reduction is added to the gas cell to stabilize the anion. In a further embodiment, the anion can be replaced continuously or intermittently. In the case of the nitrate ion, the product ammonia can be removed from the vessel. oxidized to nitrate, and returned to the cell. In one embodiment, the product ammonia can be removed from the vessel by collection in a condenser and can be oxidized to nitrate on a platinum or iridium screen at elevated temperatures such as 912° C. In a further embodiment, the nitrate ion to ammonia reaction can be minimized by decreasing the hydrogen pressure while optimizing the vapor phase catalytic hydrogen shrinkage reaction. In an embodiment, a low pressure of hydrogen atoms can be generated by dissociation of molecular hydrogen on a hot filament or grid 280 of FIG. 7. A low pressure of molecular hydrogen can be maintained via the hydrogen supply 221, the hydrogen flow control means 222, and the hydrogen pressure measurement and vacuum means 223. The hydrogen pressure can be maintained at a low pressure by adjusting the supply through the inlet with flow controller 222 versus the amount pumped away at the outlet by the pressure measurement and pump means 223. The pressure can be adjusted to maximize the output power while minimizing the degradation of nitrate. The optimal hydrogen pressure can be less than about one torr. In an embodiment, the source of hydrogen atoms in the gas phase can be a hydrogen dissociation means including a hydrogen gas stream blown over a hot filament or grid 280 such as a hot refractory metal including a filament or grid of Ti, Ni, Fe, W, Au, Pt, or Pd at an elevated temperature such as 1800° C. The hydrogen molecular source can be directed over the filament or grid and onto the gaseous source of energy holes. The pressure and flow of the hydrogen atoms prohibits the collision of the counterion of the source of energy holes (such as the nitrate ion) from contacting the hot filament or grid. Thus, the thermal decomposition or reduction of the anion on the filament or grid can be prevented. In another embodiment, a negative potential can be maintained as a grid electrode 287 surrounding the filament or grid. The grid electrode permits the passage of hydrogen atoms from the filament or grid and repels the anion from contacting the hot filament or grid. Thus, the thermal or chemical breakdown of the anion (couterion) can be prevented.

In an embodiment, the source of energy holes is an electrocatalytic ion or electrocatalytic couple comprising cation-anion pairs in the gas phase wherein the cation-anion pairs are dissociated by external source means 75 of FIG. 5 which includes, for example, a particle source 75b and/or photon source 75a and/or a source of heat, acoustic energy, electric fields, or magnetic fields. In a preferred embodiment, the cation-anion pairs are thermally dissociated by heat source 230 or photodissociated by photon source 205 of FIG. 7.

In another embodiment of the gas energy reactor having a gaseous source of energy holes, the source of energy holes is atomized with an atomizer means 295 to provide a gaseous source of energy holes. In a preferred embodiment of the atomizer, atoms are boiled, sublimed, or vaporized by a heating means such as the boat heating means 299, and the gaseous atoms are ionized to form a source of energy holes including the electrocatalytic ions or electrocatalytic couples of my previous patent applications incorporated herein by reference. In one embodiment, the atoms are thermally ionized by the heating means 230, by the hydrogen atom source 280 including a hot filament or grid, or by an inductively coupled plasma flow tube. For example, the gas energy cell shown in FIG. 7 comprises rubidium or potassium metal in the boat 290 which has a vapor pressure that can be controlled by controlling the temperature of the boat by heating means 230 and or 299. Hydrogen molecules are dissociated to atoms on the hot filament or grid 280. The rubidium (potassium) metal in the gas phase can be ionized to $Rb^+$ ($K^+$) by the same or different hot filament or grid 280. The $Rb^+$ ($K^+/K^+$) electrocatalytic ion (couple) serves as a source of energy holes to shrink the hydrogen atoms. In another embodiment, the hot filament or grid 280 comprises a metal(s) or can be electroplated with a metal(s) which boils off as a cation(s) that are a source of energy holes. For example, $Mo^{2+}$ ions ($Mo^{2+}$ electrocatalytic ion) enter the gas phase of the energy cell 200 from the hot molybdenum filament or grid 280. The hot molybdenum filament or grid 280 also dissociates hydrogen molecules to hydrogen atoms. For a further example, $Ni^{2+}$ and $Cu^+$ ions ($Ni^{2+}/Cu^+$ electrocatalytic couple) enter the gas phase of the energy cell 200 from the hot nickel and hot copper or hot nickel-copper alloy filament or grid 280. In another embodiment, the photon source 75a and the particle source 75b of FIG. 5, including an electron beam, ionize species such as atoms in the gas phase to form the source of energy holes including the electrocatalytic ions or electrocatalytic couples of my previous patent applications incorporated herein by reference. In another embodiment, the atoms or ions are ionized chemically by a volatilized reactant such as an ionic species which oxidizes or reduces the atoms or ions to form a source of energy holes.

The power of the gas energy reactor can be controlled by controlling the amount of the source of energy holes (electrocatalytic ion or couple) in the gas phase and/or by controlling the concentration of atomic or lower-energy hydrogen. The concentration of the gaseous source of energy holes (electrocatalytic ion or couple) can be controlled by controlling the initial amount of the volatile source of energy holes (electrocatalytic ion or couple) present in the reactor, and/or by controlling the temperature of the reactor with temperature control means 230 which determines the vapor pressure of the volatile source of energy holes (electrocatalytic ion or couple). The reactor temperature further controls the power by changing the rate of the catalytic hydrogen shrinkage reaction. The concentration of atomic hydrogen can be controlled by controlling the amount of atomic hydrogen provided by the atomic hydrogen source 280. For example, the amount of hydrogen atoms in the gas phase can be controlled by controlling the flow of hydrogen over or through the hot filament or grid, the tungsten capillary heated by electron bombardment, or the inductively coupled plasma flow tube; by controlling the power dissipated in the inductively coupled plasma flow tube; by controlling the temperature of the hot filament or grid, or the tungsten capillary heated by electron bombardment; by controlling the pressure of the hydrogen and temperature of the hydride maintained under nonequilibrium conditions, and by controlling the rate of removal of recombined hydrogen from the cell by pump means 223. Another means to control the shrinkage reaction rate can be by controlling the pressure of a non reactive gas with non reactive gas source 299, non reactive gas flow control means 232, and pressure measurement and pump means 223. The non reactive gas such as a noble gas competes with collisions between the source of energy holes (electrocatalytic ion or couple) and hydrogen atoms or competes with collisions that yield lower-energy hydrogen disproportionation reactions. Noble gases include He, Ne, and Ar. Further such reaction non reactive "reaction quenching" gases include carbon dioxide and nitrogen.

The hydrogen partial pressure can be further controlled by throttling hydrogen into the cell by a hydrogen value control means 222 while monitoring the pressure with a pressure measurement means 222 and 223. In a preferred embodiment, the hydrogen pressure can be controlled by controlling the temperature with heating means 230 of the gas energy reactor which further comprises a hydrogen storage means such as a metal hydride or other hydride including saline hydrides, titanium hydride, vanadium, niobium, and tantalum hydrides, zirconium and hafnium hydrides, rare earth hydrides, yttrium and scandium hydrides, transition element hydrides, intermetalic hydrides, and their alloys known in the art as given by W. M. Mueller, J. P. Blackledge, and G. G. Libowitz, *Metal Hydrides*, Academic Press, New York, (1968), *Hydrogen in Intermetalic Compounds I*, Edited by L. Schlapbach, Springer-Verlag, Berlin, and *Hydrogen in Intermetalic Compounds II*, Edited by L. Schlapbach, Springer-Verlag, Berlin, which are incorporated by reference herein. The temperature of the cell can be controlled by a temperature control and measurement means 230 such that the vapor pressure of the hydrogen in equilibrium with the hydrogen storage material can be the desired pressure. In one embodiment, nonequilibrium conditions of the hydrogen and hydride are maintained by controlling the temperature and hydrogen pressure to provide atomic hydrogen. In several embodiments, the hydrogen storage means can be a rare earth hydride with an operating temperature of about 800° C.; lanthanum hydride with an operating temperature of about 700° C.; gadolinium hydride with an operating temperature of about 750° C.; neodymium hydride with an operating temperature of about 750° C.; yttrium hydride with an operating temperature of about 800° C.; scandium hydride with an operating temperature of about 800° C.; ytterbium hydride with an operating temperature of about 850–900° C.; titanium hydride with an operating temperature of about 450° C.; cerium hydride with an operating temperature of about 950° C.; praseodymium hydride with an operating temperature of about 700° C.; zirconium-titanium (50%/50%) hydride with an operating temperature of about 600° C.; an alkali metal/alkali metal hydride mixture such as Rb/RbH or K/KH with an operating temperature of about 450° C., and an alkaline earth metal/alkaline earth hydride mixture such as Ba/BaH$_2$ with an operating temperature of about 900–1000° C.

The heat output can be monitored with thermocouples present in at least the vessel 200 and the heat exchanger 60 of FIG. 5. The rate of the shrinkage reaction rate can be monitored by ultraviolet or electron spectroscopy of the photons or electrons emitted via lower-energy hydrogen transitions, by X-ray photoelectron spectroscopy (XPS) of lower-energy hydrogen, and by mass spectroscopy, Raman or infrared spectroscopy, and gas chromatography of the molecular lower-energy hydrogen (dihydrino). Lower-energy hydrogen atoms and molecules are identified by XPS as higher binding energy species than normal hydrogen. The dihydrino can be identified by mass spectroscopy as a species with a mass to charge ratio of two (m/e=2) that has a higher ionization potential than that of normal hydrogen by recording the ion current as a function of the electron gun energy. The dihydrino can be identified by gas chromatography at low temperature such as gas chromatography with an activated carbon (charcoal) column at liquid nitrogen temperature or with a column that will separate para from ortho hydrogen such as an Rt-Alumina column, or a HayeSep column at liquid nitrogen temperature wherein normal hydrogen can be retained to a greater extent than dihydrino. The dihydrino can be identified by Raman and infrared spectroscopy as a molecule with higher vibrational and rotational energy levels as compared to those of normal hydrogen. The output power can be controlled by a computerized monitoring and control system which monitors the thermistors, spectrometers, and gas chromatograph and controls the means to alter the power output. The (molecular) lower-energy hydrogen can be removed by a means 201 to prevent the exothermic shrinkage reaction from coming to equilibrium.

In another embodiment of the gas energy reactor having a gaseous source of energy holes, hydrogen atoms are produced by a pyrolysis reaction such as the combustion of a hydrocarbon wherein the catalytic source of energy holes can be in the gas phase with the hydrogen atoms. In a preferred mode, the pyrolysis reaction occurs in an internal combustion engine whereby the hydrocarbon or hydrogen containing fuel comprises a source of energy holes that are vaporized (become gaseous) during the combustion. In a preferred mode, the source of energy holes (electrocatalytic ion or couple) is a thermally stable salt of rubidium or potassium such as RbF, RbCl, RbBr, RbI, Rb$_2$S$_2$, RbOH, Rb$_2$SO$_4$, Rb$_2$CO$_3$, Rb$_3$PO$_4$, and KF, KCl, KBr, KI, K$_2$S$_2$, KOH, K$_2$SO$_4$, K$_2$CO$_3$, K$_3$PO$_4$, K$_2$GeF$_4$. Additional counterions of the electrocatalytic ion or couple include organic anions including wetting or emulsifying agents. In another embodiment, the hydrocarbon or hydrogen containing fuel further comprises water as a mixture and a solvated source of energy holes including emulsified electrocatalytic ions or couples. During the pyrolysis reaction, water serves as a further source of hydrogen atoms which undergo a shrinkage reaction catalyzed by the source of energy holes wherein the water can be dissociated to hydrogen atoms thermally or catalytically on a surface such as the cylinder or piston head which can be comprised of material which dissociates water to hydrogen and oxygen. The water dissociation material includes an element, compound, alloy, or mixture of transition elements and inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U. activated charcoal (carbon), and intercalated Cs carbon (graphite).

POWER DENSITY OF GAS ENERGY REACTOR (GAS PHASE HYDROGEN SHRINKAGE REACTION)

The equations numbers which follow referred to those given by Mills [Mills, R., *The Grand Unified Theory of Classical Quantum Mechanics*, (1995), Technomic Publishing Company, Lancaster, Pa.]. The rate of the disproportionation reaction, $r_{m,m',p}$, to cause resonant shrinkage, Eqs. (5.22–5.30), is dependent on the collision rate between the reactants and the efficiency of resonant energy transfer. It is given by the product of the rate constant, $k_{m,m',p}$, (Eq. (5.47)), the total number of hydrogen or hydrino atoms, $N_H$, and the efficiency, E (Eq. (6.33)), of the transfer of the resonance shrinkage energy from the donor hydrino atom to the energy hole provided by the acceptor hydrino atom, $$E = \frac{1}{1 + \left[\frac{r}{R_0}\right]^6} \quad (6.37)$$

$$R_0^6 = (8.8 \times 10^{-25}) J \eta^{-4} \phi_D^0 \kappa^2$$

where r is the distance between the donor and the acceptor, J is the overlap integral between the resonance shrinkage energy distribution of the donor hydrino atom and the distribution of the energy hole provided by the acceptor hydrino atom, η is the dielectric constant, and $\kappa^2$ is a function of the mutual orientation of the donor and acceptor transition moments. Electronic transitions of lower-energy hydrogen atoms occur only by nonradiative energy transfer; thus, the quantum yield of the fluorescence of the donor, $\Phi_D$, of Eq. (6.37) is equal to one. The rate of the disproportionation reaction, $r_{m,m',p}$, to cause resonant shrinkage is $$r_{m,m',p} = E N_H 4\pi \frac{1}{2} \sqrt{2} \, n_H \left(\frac{a_H}{p}\right)^2 \sqrt{\frac{3kT}{m_H}} \quad (6.38)$$

The factor of one half in Eq. (6.38) corrects for double counting of collisions [Levine, I., Physical Chemistry, McGraw-Hill Book Company, New York, (1978), pp. 420–421]. The power, $P_{m,m',p}$, is given by the product of the rate of the transition, Eq. (6.38), and the energy of the disproportination reaction (Eq. (5.27)).

$$P_{m,m',p} = E \frac{N_H^2}{V} 4\pi \frac{1}{\sqrt{2}} \left(\frac{a_H}{p}\right)^2 \quad (6.39)$$

$$\sqrt{\frac{3kT}{m_H}} \, [2pm + m^2 - m'^2 + 1] \times 2.2 \times 10^{-18} \, W$$

where V is the volume. For a disproportionation reaction in the gas phase, the energy transfer efficiency is one. The power given by substitution of $$E=1, \, p=2, \, m=1, \, m'=2, \, V=1 \, m^3, \, N=3\times10^{21}, \, T=675 \, K \quad (6.40)$$

into Eq. (6.39) is $$P_{m,m',p} = 1 \text{ GW}(1 \text{ kW/cm}^3) \quad (6.41)$$

In the case that the reaction of hydrogen to lower-energy states occurs by the reaction of a catalytic source of energy holes with hydrogen or hydrino atoms, the reaction rate is dependent on the collision rate between the reactants and the efficiency of resonant energy transfer. The hydrogen-or-hydrino-atom/electrocatalytic-ion collision rate per unit volume, $$Z_H\left[\frac{a_H}{p}\right]_{Catalyst},$$

for a gas containing $n_H$ hydrogen or hydrino atoms per unit volume, each with radius $$\frac{a_H}{p}$$

and velocity $v_H$ and $n_c$ electrocatalytic ions per unit volume, each with radius $r_{Catalyst}$ and velocity $v_c$ is given by Levine [Levine, I., Physical Chemistry, McGraw-Hill Book Company, New York, (1978), pp. 420–421].

$$Z_H\left[\frac{a_H}{p}\right]_{Catalyst} = \pi\left(\frac{a_H}{p} + r_{Catalyst}\right)^2 \left[\langle v_H \rangle^2 + \langle v_C \rangle^2\right]^{1/2} n_H n_C \quad (6.42)$$

The average velocity, $v_{avg}$, can be calculated from the temperature, T, [Bueche, F. J., Introduction to Physics for Scientists and Engineers, McGraw-Hill Book Company, New York, (1986), pp. 261–265].

$$\frac{1}{2}m_H v_{avg}^2 = \frac{3}{2}kT \quad (6.43)$$

where k is Boltzmann's constant. Substitution of Eq. (5.44) into Eq. (5.42) gives the collision rate per unit volume, $$Z_H\left[\frac{a_H}{p}\right]_{Catalyst},$$

in terms of the temperature, T.

$$Z_H\left[\frac{a_H}{p}\right]_{Catalyst} = \pi\left(\frac{a_H}{p} + r_{Catalyst}\right)^2 \left[3kT\left(\frac{1}{m_H} + \frac{1}{m_C}\right)\right]^{1/2} n_H n_C \quad (6.44)$$

The rate of the catalytic reaction, $r_{m,p}$, to cause resonant shrinkage is given by the product of the collision rate per unit volume, $$Z_H\left[\frac{a_H}{p}\right]_{Catalyst},$$

the volume, V, and the efficiency, E, of resonant energy transfer given by Eq. (6.37).

$$r_{m,p} = E\pi\left(\frac{a_H}{p} + r_{Catalyst}\right)^2 \left[3kT\left(\frac{1}{m_H} + \frac{1}{m_C}\right)\right]^{1/2} \frac{N_H N_C}{V} \quad (6.45)$$

The power, $P_{m,p}$, is given by the product of the rate of the transition, Eq. (6.45), and the energy of the transition, Eq. (5.8).

$$P_{m,p} = E\pi\left(\frac{a_H}{p} + r_{Catalyst}\right)^2 \left[3kT\left(\frac{1}{m_H} + \frac{1}{m_C}\right)\right]^{1/2} \quad (6.46)$$
$$\frac{N_H N_C}{V}[2mp + m^2] \times 2.2 \times 10^{-18} \text{ W}$$

In the case of a gas phase catalytic shrinkage reaction wherein the source of energy holes is a single cation having an ionization energy of 27.21 eV with hydrogen or hydrino atoms, the energy transfer efficiency is one. Rubidium (Rb$^+$) is an electrocatalytic ion with a second ionization energy of 27.28 eV. The power for the reaction given by Eqs. (5.9). (5.10), and (5.8) with the substitution of $$E=1, p=1, m=1, V=1 \text{ m}^3, N_H=3\times10^{21}, N_c=3\times10^{21}, m_c=1.4\times10^{-25} \text{ kg}, r_c=2.16\times10^{-10} \text{ m}, T=675 \text{ K} \quad (6.47)$$

into Eq. (6.46) is $$P_{m,p} = 55 \text{ GW} (55 \text{ kW/cm}^3) \quad (6.48)$$

In the case that the catalytic reaction of hydrogen to lower-energy states occurs on a surface, the energy transfer efficiency is less than one due to differential surface interactions of the absorbed hydrogen or hydrino atoms and the electrocatalytic ion. The power given by Eqs. (6.46) and (6.47) with $$E=0.001 \quad (6.49)$$

is $$P_{m,p} = 55 \text{ MW} (55 \text{ W/cm}^3) \quad (6.50)$$

Less efficient catalytic systems hinge on the coupling of three resonator cavities. For example, an electron transfer occurs between two cations which comprises an energy hole for a hydrogen or hydrino atom. The reaction rate is dependent on the collision rate between catalytic cations and hydrogen or hydrino atoms and the efficiency of resonant energy transfer with a concomitant electron transfer with each shrinkage reaction. The rate of the catalytic reaction, $r_{m,p}$, to cause resonant shrinkage is given by the product of the collision rate per unit volume, $$Z_H\left[\frac{a_H}{p}\right]_{Catalyst},$$

the volume, V, and the efficiency, $E_e$, of resonant energy transfer given by Eq. (6.37) where r is given by the average distance between cations in the reaction vessel.

$$r_{m,p} = E_c\pi\left(\frac{a_H}{p} + r_{Catalyst}\right)^2 \left[3kT\left(\frac{1}{m_H} + \frac{1}{m_C}\right)\right]^{1/2} \frac{N_H N_C}{V} \quad (6.51)$$

The power, $P_{m,p}$, is given by the product of the rate of the transition, Eq. (6.51), and the energy of the transition, Eq. (5.8).

$$P_{m,p} = E_c\pi\left(\frac{a_H}{p} + r_{Catalyst}\right)^2 \left[3kT\left(\frac{1}{m_H} + \frac{1}{m_C}\right)\right]^{1/2} \quad (6.52)$$
$$\frac{N_H N_C}{V}[2mp + m^2] \times 2.2 \times 10^{-18} \text{ W}$$

A catalytic system that hinges on the coupling of three resonator cavities involves potassium. For example, the second ionization energy of potassium is 31.63 eV. This energy hole is obviously too high for resonant absorption. However, $K^+$ releases 4.34 eV when it is reduced to K. The combination of $K^+$ to $K^{2+}$ and $K^+$ to K, then, has a net energy change of 27.28 eV. Consider the case of a gas phase catalytic shrinkage reaction of hydrogen or hydrino atoms by potassium ions as the electrocatalytic couple having an energy hole of 27.28 eV. The energy transfer efficiency is given by Eq. (6.37) where r is given by the average distance between cations in the reaction vessel. When the $K^+$ concentration is $$3 \times 10^{22} \frac{K^+}{m^3},$$

r is approximately $5 \times 10^{-9}$ m. For J=1, $\Phi_D$=1, $\kappa^2$=1, $\tau_D$=$10^{-13}$ sec (based on the vibrational frequency of $KH^+$), and m=1 in Eq. (5.8), the energy transfer efficiency, $E_c$, is approximately 0.001. The power for the reaction given by Eqs. (5.13), (5.14), and (5.8) with the substitution of E=0.001, p=1, m=1, V=1 $m^3$, $N_H$=$3 \times 10^{22}$, $N_c$=$3 \times 10^{21}$, $m_c$=$6.5 \times 10^{-26}$ kg, $r_c$=$1.38 \times 10^{-10}$ m, T=675 K  (6.53)

into Eq. (6.52) is $P_{m,p}$=300 MW (300 W/$cm^3$)  (6.54)

Gas Discharge Energy Reactor

A gas discharge energy reactor comprises a hydrogen isotope gas filled glow discharge vacuum chamber 300 of FIG. 8 including an ozonizer-type capacitor, a hydrogen source 322 which supplies hydrogen to the chamber 300 through control valve 325, and a voltage and current source 330 to cause current to pass between a cathode 305 and an anode 320. In one embodiment comprising an ozonizer-type capacitor gas discharge cell, one of the electrodes can be shielded by a dielectric barrier such as glass or a ceramic moiety. In a preferred embodiment, the cathode further comprises a source of energy holes of approximately mX27.21 eV to cause atomic hydrogen "shrinkage" and/or approximately mX48.6 eV to cause molecular hydrogen "shrinkage" where m is an integer (including the electrocatalytic ions and couples described in my previous U.S. patent applications entitled "Energy/Matter Conversion Methods and Structures", Ser. No. 08/467,051 filed on Jun. 6, 1995 which is a continuation-in-part application of Ser. No. 08/416,040 filed on Apr. 3, 1995 which is a continuation-in-part application of Ser. No. 08/107,357 filed on Aug. 16, 1993, which is a continuation-in-part application of Ser. No. 08/075,102 (Dkt. 99437) filed on Jun. 11, 1993, which is a continuation-in-part application of Ser. No. 07/626,496 filed on Dec. 12, 1990 which is a continuation-in-part application of Ser. No. 07/345,628 filed Apr. 28, 1989 which is a continuation-in-part application of Ser. No. 07/341,733 filed Apr. 21, 1989 which are incorporated by reference). A preferred cathode 305 for shrinking hydrogen atoms is a palladium cathode whereby a resonant energy hole can be provided by the ionization of electrons from palladium to the discharge current. A second preferred cathode 305 for shrinking hydrogen atoms comprises a source of energy holes via electron transfer to the discharge current including at least one of beryllium, copper, platinum, zinc, and tellurium and a hydrogen dissociating means such as a source of electromagnetic radiation including UV light provided by photon source 350 or a hydrogen dissociating material including the transition elements and inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal (carbon), and intercalated Cs carbon (graphite). The reactor further comprises a means to control the energy dissipated in the discharge current when electrons are transferred from an electron donating species to provide an energy hole for hydrogen atoms (molecules) including pressure controller means 325 and current (voltage) source 330. The gas discharge energy reactor further comprises a means 301 to remove the (molecular) lower-energy hydrogen such as a selective venting valve to prevent the exothermic shrinkage reaction from coming to equilibrium.

In another embodiment of the gas discharge energy reactor, the source of energy hole can be one of a inelastic photon or particle scattering reaction(s). In a preferred embodiment the photon source 350 supplies the energy holes where the energy hole corresponds to stimulated emission by the photon. In the case of a reactor which shrinks hydrogen atoms, the photon source 350 dissociates hydrogen molecules into hydrogen atoms. The photon source producing photons of at least one energy of approximately mX27.21 eV, $$\frac{m}{2} \times 27.21 \text{ eV},$$

or 40.8 eV causes stimulated emission of energy as the hydrogen atoms undergo the shrinkage reaction. In another preferred embodiment, a photon source 350 producing photons of at least one energy of approximately mX48.6 eV, 95.7 eV, or mX31.94 eV causes stimulated emission of energy as the hydrogen molecules undergo the shrinkage reaction.

In another embodiment, a magnetic field can be applied by magnetic field generator 75 of FIG. 5 to produce a magnetized plasma of the gaseous ions which can be a nonlinear media. Coupling of resonator cavities and enhancement of the transfer of energy between them can be increased when the media is nonlinear. Thus, the reaction rate (transfer of the resonance shrinkage energy of the hydrogen atoms to the energy holes, the electrocatalytic ions or couples) can be increased and controlled by providing and adjusting the applied magnetic field strength.

In one embodiment of the method of operation of the gas discharge energy reactor, hydrogen from source 322 can be introduced inside of the chamber 300 through control valve 325. A current source 330 causes current to pass between a cathode 305 and an anode 320. The hydrogen contacts the cathode which comprises a source of energy holes of approximately mX27.21 eV to cause atomic hydrogen "shrinkage" and approximately mX48.6 eV to cause molecular hydrogen "shrinkage" where m is an integer. In a preferred embodiment, electrons are transferred from an electron donating species present on the cathode 305 to the discharge current to provide energy holes for hydrogen atoms (molecules). In the case of a reactor which shrinks hydrogen atoms, the molecular hydrogen can be dissociated into atomic hydrogen by a dissociating material on the cathode 305 or by a source of electromagnetic radiation including UV light provided by photon source 350 such that the dissociated hydrogen atoms contact a source of energy holes including a molten, liquid, gaseous, or solid source of the energy holes. The atomic (molecular) hydrogen releases energy as its electrons are stimulated to undergo transitions to lower energy levels by the energy holes. The energy dissipated in the discharge current when electrons are transferred from an electron donating species can be controlled to provide an energy hole equal to the resonance shrinkage energy for hydrogen atoms (molecules) by controlling the gas pressure from source 322 with pressure controller means 325 and the voltage with the current (voltage) source 330. The heat output can be monitored with thermocouples present in at least the cathode 305, the anode 320, and the heat exchanger 60 of FIG. 5. The output power can be controlled by a computerized monitoring and control system which monitors the thermistors and controls the means to alter the power output. The (molecular) lower-energy hydrogen can be removed by a means 301 to prevent the exothermic shrinkage reaction from coming to equilibrium.

In another embodiment of the gas discharge energy reactor, a preferred cathode 305 comprises the catalytic material including a spillover catalyst described in the Pressurized Gas Energy Reactor Section.

Another embodiment of the gas discharge energy reactor comprises a gaseous source of energy holes wherein the shrinkage reaction occurs in the gas phase, and the gaseous hydrogen atoms are provided by a discharge of molecular hydrogen gas. In a further embodiment the gaseous source of energy holes can be provided by a discharge current which produces the gaseous source of energy holes (electrocatalytic ion or couple) such as a discharge in potassium metal to form $K^+/K^+$, rubidium metal to form $Rb^+$, or titanium metal to form $Ti^{2+}$. The embodiment comprises a hydrogen isotope gas filled glow discharge chamber 300. The glow discharge cell can be operated at an elevated temperature such this the source of energy holes (electrocatalytic ion or couple) can be sublimed, boiled, or volatilized into the gas phase. In an embodiment, the counterion of the source of energy holes (electrocatalytic ion or couple) can be the hydride anion ($H^-$) such as rubidium hydride ($Rb^+$ electrocatalytic ion) and/or potassium hydride ($K^+/K^+$ electrocatalytic couple).

In an embodiment, the source of energy holes can be an electrocatalytic ion or electrocatalytic couple comprising cation-anion pairs in the gas phase wherein the cation-anion pairs are dissociated by external source means 75 of FIG. 5 which includes, for example, a particle source 75b and/or photon source 75a and/or a source of heat, acoustic energy, electric fields, or magnetic fields. In a preferred embodiment, the cation-anion pairs are thermally dissociated by heat source 75 of FIG. 5 or photodissociated by photon source 350 of FIG. 8.

Refrigeration Means

A further embodiment of the present invention comprises a refrigeration means which comprises the electrolytic cell of FIG. 6, the pressurized hydrogen gas cell of FIG. 7, and the hydrogen gas discharge cell of FIG. 8 of the present invention wherein a source of lower-energy atomic (molecular) hydrogen is supplied rather than a source of normal hydrogen. The lower-energy hydrogen atoms are reacted to a higher energy state with the absorption of heat energy according to the reverse of the catalytic shrinkage reaction such as those given by Eqs. (4–6); (7–9); (10–12); (13–15); (16–18); (48–50); (51–53); (54–56); (57–59); (60–62), (63–65), (66–68), (69–71), (72–74), and (75–77). The lower-energy hydrogen molecules are reacted to a higher energy state with the absorption of heat energy according to the reverse of the catalytic shrinkage reaction such as that given by Eqs. (78–80); (81–83); (84–86); (88–90), and (91–93). In this embodiment, means 101, 201 and 301 of FIGS. 6, 7, and 8, respectively, serve to remove the normal hydrogen such as a selective venting valves to prevent the endothermic reaction from coming to equilibrium.

Compositions of Matter Comprising at Least Lower-Energy Hydrogen Atom(s) and/or Lower-energy Hydrogen Molecule(s)

The present invention further comprises molecules containing lower-energy hydrogen atoms. Lower-energy hydrogen can be reacted with any atom of the periodic chart or known organic or inorganic molecule or compound or metal, nonmetal, or semiconductor to form an organic or inorganic molecule or compound or metal, nonmetal, or semiconductor containing lower-energy hydrogen atoms and molecules. The reactants with lower-energy hydrogen include neutral atoms, negatively or positively charged atomic and molecular ions, and free radicals. For example, lower-energy hydrogen can be reacted with water or oxygen to form a molecule containing lower-energy hydrogen and oxygen, and lower-energy hydrogen can be reacted with singly ionized helium to form a molecule containing helium and lower-energy hydrogen. Lower-energy hydrogen can be also reacted with metals. In one embodiment of the electrolytic cell energy reactor, lower-energy hydrogen produced during operation at the cathode can be incorporated into the cathode by reacting with it; thus, a metal-lower-energy hydrogen material can be produced. In all such reactions, the reaction rate and product yield are increased by applying heat, and/or pressure.

Lower-energy hydrogen molecules (dihydrinos) are purified from hydrogen gas by combustion of the normal hydrogen. Oxygen can be mixed with the sample to be purified, and the sample can be ignited. In a second embodiment of the method of dihydrino purification, the sample can be flowed over a hydrogen recombiner which reacts with the normal hydrogen in the gas stream to form water. In a third embodiment, lower-energy hydrogen molecules (dihydrinos) are collected in a cathode of an electrolytic energy reactor of the present invention such as a metal cathode including a nickel cathode or a carbon cathode. The cathode can be heated in a vessel to a first temperature which causes normal hydrogen to preferentially off gas by external heating or by flowing a current through the cathode. The normal hydrogen can be pumped off, then the cathode can be heated to a second higher temperature at which dihydrino gas can be released and collected. In a fourth embodiment, the gas sample is purified by cryofiltration including gas chromatography at low temperature such as gas chromatography with an activated carbon (charcoal) column at liquid nitrogen temperature and with a column which will separate para from ortho hydrogen such as an Rt-Alumina column, or a HayeSep column at liquid nitrogen temperature wherein normal hydrogen can be retained to a greater extent than dihydrino. In a fifth embodiment, the gas sample is purified by cryodistillation wherein normal hydrogen can be liquefied and separated from gaseous lower-energy hydrogen (dihydrino). The dihydrino can be concentrated by liquefaction in liquid helium.

EXPERIMENTAL VERIFICATION OF THE PRESENT THEORY

EXAMPLE 1

The article by Mills and Good [Mills, R., Good, W., "Fractional Quantum Energy Levels of Hydrogen", Fusion Technology, Vol. 28, No. 4, November, (1995), pp. 1697–1719] describes the determination of excess heat release during the electrolysis of aqueous potassium carbonate by the very accurate and reliable method of heat measurement, flow calorimetry; describes the experimental identification of hydrogen atoms in fractional quantum energy levels—hydrinos—by X-ray Photoelectron Spectroscopy (XPS); describes the experimental identification of hydrogen atoms in fractional quantum energy levels—hydrinos—by emissions of soft x-rays from dark matter; describes the experimental identification of hydrogen molecules in fractional quantum energy levels—dihydrino molecules by high resolution magnetic sector mass spectroscopy with ionization energy determination, and gives a summary.

In Summary

The complete theory which predicts fractional quantum energy levels of hydrogen and the exothermic reaction whereby lower-energy hydrogen is produced is given elsewhere [Mills, R., *The Grand Unified Theory of Classical Quantum Mechanics*, (1995), Technomic Publishing Company, Lancaster, Pa., provided by HydroCatalysis Power Corporation, Great Valley Corporate Center, 41 Great Valley Parkway, Malvern, Pa., 19355, R. Mills; *Unification of Spacetime, the Forces, Matter, and Energy* (Technomic Publishing Company, Lancaster, Pa., 1992)].

Excess power and heat were observed during the electrolysis of aqueous potassium carbonate. Flow calorimetry of pulsed current electrolysis of aqueous potassium carbonate at a nickel cathode was performed in a single-cell dewar. The average power out of 24.6 watts exceeded the average input power (voltage times current) of 4.73 watts by a factor greater than 5. The total input energy (integration of voltage times current) over the entire duration of the experiment was 5.72 MJ; whereas, the total output energy was 29.8 MJ. No excess heat was observed when the electrolyte was changed from potassium carbonate to sodium carbonate. The source of heat is assigned to the electrocatalytic, exothermic reaction whereby the electrons of hydrogen atoms are induced to undergo transitions to quantized energy levels below the conventional "ground state". These lower energy states correspond to fractional quantum numbers: $n=\frac{1}{2}, \frac{1}{3}, \frac{1}{4}, \ldots$. Transitions to these lower energy states are stimulated in the presence of pairs of potassium ions ($K^+/K^+$ electrocatalytic couple) which provide 27.2 eV energy sinks.

The identification of the $n=\frac{1}{2}$ hydrogen atom, $H(n=\frac{1}{2})$ is reported. Samples of the nickel cathodes of aqueous potassium carbonate electrolytic cells and aqueous sodium carbonate electrolytic cells were analyzed by XPS. A broad peak centered at 54.6 eV was present only in the cases of the potassium carbonate cells. The binding energy (in vacuum) of $H(n=\frac{1}{2})$ is 54.4 eV. Thus, the theoretical and measured binding energies for $H(n=\frac{1}{2})$ are in excellent agreement.

Further experimental identification of hydrinos—down to $H(n=\frac{1}{8})$—can be found in the alternative explanation by Mills et al. for the soft X-ray emissions of the dark interstellar medium observed by Labov and Bowyer [S. Labov and S. Bowyer, Astrophysical Journal, 371 (1991) 810] of the Extreme UV Center of the University of California, Berkeley. The agreement between the experimental spectrum and the energy values predicted for the proposed transitions is remarkable.

The reaction product of two $H(n=\frac{1}{2})$ atoms, the dihydrino molecule, was identified by mass spectroscopy (Shrader Analytical & Consulting Laboratories). The mass spectrum of the cryofiltered gases evolved during the electrolysis of a light water $K_2CO_3$ electrolyte with a nickel cathode demonstrated that the dihydrino molecule, $H_2(n=\frac{1}{2})$, has a higher ionization energy, about 63 eV, than normal molecular hydrogen, $H_2(n=1)$, 15.46 eV. The high resolution (0.001 AMU) magnetic sector mass spectroscopic analysis of the postcombustion gases indicated the presence of two peaks of nominal mass two at 70 eV and one peak at 25 eV. The same analysis of molecular hydrogen indicates only one peak at 25 eV and one peak at 70 eV. In the case of the postcombustion sample at 70 eV, one peak was assigned as the hydrogen molecular ion peak, $H_2^+(n=1)$, and one peak was assigned as the dihydrino molecular peak, $H_2^+(n=\frac{1}{2})$ which has a slightly larger magnetic moment.

EXAMPLE 2

In the January 1994 edition of Fusion Technology, [Mills, R., Good, W., Shaubach, R., "Dihydrino Molecule Identification", Fusion Technology, 25, 103 (1994)] Mills et al. review and present three sets of data of heat production and "ash" identification including the work of HydroCatalysis Power Corporation (Experiments #1–#3) and Thermacore, Inc. (Experiments #4–#14).

In Summary

Mills et al. report the experimental evidence supporting the Mills theory that an exothermic reaction occurs wherein the electrons of hydrogen atoms and deuterium atoms are stimulated to relax to quantized potential energy levels below that of the "ground state" via electrochemical reactants $K^+$ and $K^+$; $Pd^{2+}$ and $Li^+$, or Pd and $O_2$ of redox energy resonant with the energy hole which stimulates this transition. Calorimetry of pulsed current and continuous electrolysis of aqueous potassium carbonate ($K^+/K^+$ electrocatalytic couple) at a nickel cathode was performed. The excess power out of 41 watts exceeded the total input power given by the product of the electrolysis voltage and current by a factor greater than 8. The "ash" of the exothermic reaction is atoms having electrons of energy below the "ground state" which are predicted to form molecules. The predicted molecules were identified by lack of reactivity with oxygen, by separation from molecular deuterium by cryofiltration, and by mass spectroscopic analysis.

The combustion of the gases evolved during the electrolysis of a light water $K_2CO_3$ electrolyte ($K^+/K^+$ electrocatalytic couple) with a nickel cathode was incomplete. The mass spectroscopic analysis (Air Products & Chemicals, Inc.) of uncombusted gases demonstrated that the species predominantly giving rise to the m/e=2 peak must have a different m/e=1 to m/e=2 production efficiency than hydrogen. And, the further mass spectroscopic analysis of the m/e=2 peak of the uncombusted gas demonstrated that the dihydrino molecule, $H_2(n=\frac{1}{2})$, has a higher ionization energy than $H_2$.

According to the analysis by Mills et al. of the raw data, Miles of the China Lake Naval Air Warfare Center Weapons Division observed the dideutrino molecule as a species with a mass to charge ratio of four and having a higher ionization potential than normal molecular deuterium. Miles was using mass spectroscopy to analyze the cryofiltered gases evolved from excess power producing electrolysis cells (palladium cathode and a $LiOD/D_2O$ electrolyte; an electrocatalytic couple of 27.54 eV). [B. F. BUSH, J. J. LAGOWSKI, M. H. MILES, and G. S. OSTROM, "Helium Production During the Electrolysis of $D_2O$ in Cold Fusion Experiments", J. Electroanal. Chem., 304, 271 (1991); M. H. MILES, B. F. BUSH, G. S. OSTROM, and J. J. LAGOWSKI, "Heat and Helium Production in Cold Fusion Experiments", Proc. Conf. The Science of Cold Fusion, Como, Italy, Jun. 29–Jul. 4, 1991, p. 363, T. BRESSANI, E. DEL GIUDICE, and G. PREPARATA, Eds., SIF (1991); M. H. MILES, R. A. HOLLINS, B. F. BUSH, J. J. LAGOWSKI, and R. E. J. MILES, "Correlation of Excess Power and Helium Production During $D_2O$ and $H_2O$ Electrolysis Using Palladium Cathodes", J. Electroanal. Chem., 346, 99 (1993); M. H. MILES and B. F. BUSH, "Search for Anomalous Effects Involving Excess Power and Helium During $D_2O$ Electrolysis Using Palladium Cathodes," Proc. 3rd Int. Conf. Cold Fusion, Nagoya, Japan, Oct. 21–25, 1992, p. 189].

Palladium sheets coated on one side with a hydrogen impermeant gold layer and coated on the other surface with an oxide coat ($MnO_x$, $AlO_x$, $SiO_x$) were deuterium or hydrogen loaded at NTT Laboratories. Heat was observed from light and heavy hydrogen only when the mixed oxide coat was present ($Pd/O_2$ electrocatalytic couple). The high resolution (0.001 AMU) quadrapole mass spectroscopic analysis of the gases released when a current was applied to a deuterium (99.9%) loaded $MnO_x$ coated palladium sheet indicate the presence of a large shoulder on the $D_2$ peak which Mills et al. assign to the dideutrino molecule, $D_2(n=½)$. [E. YAMAGUCHI and T. NISHIOKA, "Direct Evidence for Nuclear Fusion Reactions in Deuterated Palladium," Proc. 3rd Int. Conf. Cold Fusion,, Nagoya, Japan, October 21–25, 1992, p. 179; E. YAMAGUCHI and T. NISHIOKA, "Helium-4 Production from Deuterated Palladium at Low Energies," NTT Basic Research Laboratories and IMRA Europe S. A., Personal Communication (1992)].

EXAMPLE 3

Pennsylvania State University has determined excess heat release from flowing hydrogen in the presence of nickel oxide powder containing strontium niobium oxide ($Nb^{3+}/Sr^{2+}$ electrocatalytic couple) by the very accurate and reliable method of heat measurement, thermopile conversion of heat into an electrical output signal [Phillips, J., "A Calorimetric Investigation of the Reaction of Hydrogen with Sample PSU #1", Sep. 11, 1994, A Confidential Report submitted to HydroCatalysis Power Corporation provided by HydroCatalysis Power Corporation, Great Valley Corporate Center, 41 Great Valley Parkway, Malvern, Pa. 19355]. Excess power and heat were observed with flowing hydrogen over the catalyst which increased with increasing flow rate. However, no excess power was observed with flowing helium over the catalyst/nickel oxide mixture or flowing hydrogen over nickel oxide alone. As shown in FIG. 9, approximately 10 cc of nickel oxide powder containing strontium niobium oxide immediately produced 0.55 W of steady state output power at 523° K. When the gas was switched from hydrogen to helium, the power immediately dropped. The switch back to hydrogen restored the excess power output which continued to increase until the hydrogen source cylinder emptied at about the 40,000 second time point. With no hydrogen flow the output power fell to zero.

The source of heat is assigned to the electrocatalytic, exothermic reaction whereby the electrons of hydrogen atoms are induced to undergo transitions to quantized energy levels below the conventional "ground state". These lower energy states correspond to fractional quantum numbers: $n=½, ⅓, ¼, \ldots$. Transitions to these lower energy states are stimulated in the presence of pairs of niobium and strontium ions ($Nb^{3+}/Sr^{2+}$ electrocatalytic couple) which provide 27.2 eV energy sinks.

EXAMPLE 4

The article in the Spectral Data of Hydrinos from the Dark Interstellar Medium and from the Sun Section of Mills [Mills, R., *The Grand Unified Theory of Classical Quantum Mechanics*, (1995), Technomic Publishing Company, Lancaster, Pa.] describes the experimental identification of hydrogen atoms in fractional quantum energy levels—hydrinos—by emissions of soft X-rays from dark matter and the Sun; provides a resolution to the Solar Neutrino Problem, the Temperature of the Solar Corona Problem, the Broadening of the Hydrogen 911.8 Å Line Problem, the Temperature of the Transition from "Radiation Zone" to "Convection Zone" Problem, the Cool Carbon Monoxide Clouds Problem, the Stellar Age Problem, the Solar Rotation Problem, the Solar Flare Problem, and the problem of the ionizing energy source of hydrogen planets, and describes the experimental identification of hydrogen atoms in fractional quantum energy levels—hydrinos—by spin/nuclear hyperfine structure transition energies obtained by COBE for which no other satisfactory assignment exists.

In Summary

As shown in Table 1 Mills [Mills, R., *The Grand Unified Theory of Classical Quantum Mechanics*, (1995), Technomic Publishing Company, Lancaster, Pa.], hydrogen transitions to electronic energy levels below the "ground" state corresponding to fractional quantum numbers predicted by Mills' theory match the spectral lines of the extreme ultraviolet background of interstellar space. And, hydrogen disproportionation reactions yield ionized hydrogen, energetic electrons, and hydrogen ionizing radiation. This assignment resolves the paradox of the identity of dark matter and accounts for many celestial observations such as: diffuse Hα emission is ubiquitous throughout the Galaxy, and widespread sources of flux shortward of 912 Å are required [Labov, S., Bowyer, S., "Spectral observations of the extreme ultraviolet background", The Astrophysical Journal, 371, (1991), pp. 810–819].

Further experimental identification of hydrinos-down to $H(n=⅛)$—can be found in the alternative explanation by Mills for the soft X-ray emissions of the dark interstellar medium observed by Labov and Bowyer [S. Labov and S. Bowyer, Astrophysical Journal, 371 (1991) 810] of the Extreme UV Center of the University of California, Berkeley. The agreement between the experimental spectrum and the energy values predicted for the proposed transitions is remarkable.

The paradox of the paucity of solar neutrinos to account for the solar energy output by the pp chain is resolved by assigning a major portion of the solar output to lower-energy hydrogen transitions. The photosphere of the Sun is 6000 K; whereas, the temperature of the corona based on the assignment of the emitted X-rays to highly ionized heavy elements is in excess of $10^6$ K. No satisfactory power transfer mechanism is known which explains the excessive temperature of the corona relative to that of the photosphere. The paradox is resolved by the existence of a power source associated with the corona. The energy which maintains the corona at a temperature in excess of $10^6$ K is that released by disproportionation reactions of lower-energy hydrogen as given by Eqs. (13–15). In Table 2 of Mills, the energy released by the transition of the hydrino atom with the initial lower-energy state quantum number p and radius $$\frac{a_H}{p}$$

to the state with lower-energy state quantum number (p+m) and radius $$\frac{a_H}{(p+m)}$$

catalyzed by a hydrino atom with the initial lower-energy state quantum number m', initial radius $$\frac{a_H}{m'},$$

and final radius $a_H$ are given in consecutive order of energy from the 1→½ H transition to the ⅑→⅒ H transition. The agreement between the calculated and the experimental values is remarkable. Furthermore, many of the lines of Table 2 had no previous assignment, or the assignment was unsatisfactory [Thomas, R. J., Neupert. W., M., Astrophysical Journal Supplement Series, Vol. 91, (1994), pp. 461–482; Malinovsky, M., Heroux, L., Astrophysical Journal, Vol. 181, (1973), pp. 1009–1030; Noyes, R., *The Sun, Our Star*, Harvard University Press, Cambridge, Ma., (1982), p. 172; Phillips, J. H., *Guide to the Sun*, Cambridge University Press, Cambridge, Great Britain, (1992), pp. 118–119; 120–121; 144–145]. The calculated power of $4 \times 10^{26}$ W matches the observed power output of $4 \times 10^{26}$ W.

The broadening of the solar HI911.8 Å line (911.8 Å to ≈600 Å) is six times that predicted based on the thermal electron energy at the surface of the photosphere (T=6,000 K) where the HI 911.8 Å continuum originates, and based on the relative width of the helium continuum lines, He I 504.3 Å (He I 504.3 Å to ≈530 Å) and He II 227.9 Å (He II 227.9 Å to ≈225 Å) [Thomas, R. J., Neupert, W., M., Astrophysical Journal Supplement Series, Vol. 91, (1994), pp. 461–482; Stix, M., *The Sun*, Springer-Verlag, Berlin, (1991), pp. 351–356; Malinovsky, M., Heroux, L.. Astrophysical Journal, Vol. 181, (1973), pp. 1009–1030; Noyes, R., *The Sun, Our Star*, Harvard University Press, Cambridge, Ma., (1982), p. 172; Phillips, J. H., *Guide to the Sun*, Cambridge University Press, Cambridge, Great Britain, (1992), pp. 118–119; 120–121; 144–145]. The latter lines are proportionally much narrower; yet, the corresponding temperatures of origin must be higher because the transitions are more energetic. Furthermore, the H 911.8 Å continuum line of the spectrum of a prominence is about one half the width of the same line of the quiet Sun spectrum. Yet, the temperature rises to greater than 10,000 K in a prominence. The problem of the anomalous spectral feature of the excessive broadening of the continuum line of hydrogen to higher energies can be resolved by assignment of the broadening mechanism to energetic disproportionation reactions involving hydrogen atoms as reactants.

The reaction product, lower-energy hydrogen, can be reionized as it diffuses towards the center of the Sun. The abrupt change in the speed of sound and transition from "radiation zone" to "convection zone" at a radius of 0.7 the solar radius, $0.7 R_s$, with a temperature of $2 \times 10^6$ K matches the ionization temperature of lower-energy hydrogen.

Another spectroscopic mystery concerns an infrared absorption band of the chromosphere at a wavelength of 4.7 $\mu$m which was previously assigned to carbon monoxide despite the implausibility of its existence in the observed region which has a temperature above that at which carbon monoxide would break up into its constituent carbon and oxygen atoms. This problem can be resolved by assignment of the broad 4.7 $\mu$m feature to a temperature broadened rotational transition of a molecular ion of lower-energy hydrogen. The assignment of the 4.7 $\mu$m absorption line to the J=0 to J=1 transition rotational transition of $H_2^*[2c'=3a_o]^+$ provides a resolution of the problem of cool carbon monoxide clouds.

Modeling how stars evolve leads to age estimates for some stars that are greater than the age of the universe. Mills' theory predicts that presently, stars exist which are older than the elapsed time of the present expansion as stellar evolution occurred during the contraction phase. General Relativity provides a resolution to the problem of the loss of angular momentum of the core which is in agreement with the current Solar models and helioseismology data. The photon transfer of momentum to expanding spacetime mechanism provides a resolution to the solar rotation problem of the slowly rotating Solar core.

Further stellar evidence of disproportionation reactions is the emission of extreme ultraviolet radiation by young stars called A stars. They appear to have energetic, ultraviolet-emitting upper atmospheres, or coronas, even though astronomers believe such stars lack the ability to heat these regions.

Numerous late-type stars, particularly dM stars, are known to flare from time to time at visible and X-ray wavelengths. An extremely pronounced flare was observed by the Extreme Ultraviolet Explorer (EUVE) Deep Survey telescope on the star AU Microscopii at a count of 20 times greater than that at quiescence [Bowyer, S., Science, Vol. 263, (1994), pp. 55–59]. Emission lines in the extreme ultraviolet were observed for which there is no satisfactory assignment. These spectral lines match hydrogen transitions to electronic energy levels below the "ground" state corresponding to fractional quantum numbers as shown in Table 3 of Mills. The lines assigned to lower-energy hydrogen transitions increased significantly in intensity during the flare event. The data is consistent with disproportionation reactions of lower-energy hydrogen as the mechanism of solar flare activity.

Planetary evidence of disproportionation reactions is the emission of energy by Jupiter, Saturn, and Uranus in excess of that absorbed from the Sun. Jupiter is gigantic ball of gaseous hydrogen. Saturn and Uranus are also largely comprised of hydrogen. $H_3^+$ is detected from all three planets by infrared emission spectroscopy [J. Tennyson, Physics World, July, (1995), pp. 33–36]. Disproportionation reactions of hydrogen yield ionizing electrons, energy, and ionized hydrogen atoms. Ionizing electrons and protons can both react with molecular hydrogen to produce $H_3^+$.

The spin/nuclear hyperfine structure transition energies of lower-energy hydrogen match closely certain spectral lines obtained by COBE [E. L. Wright, et. al., The Astrophysical Journal, 381, (1991), pp. 200–209; J. C. Mather, et. al., The Astrophysical Journal, 420, (1994), pp. 439–444] for which no other satisfactory assignment exists.

EXAMPLE 5

Pennsylvania State University has determined excess heat release from flowing hydrogen in the presence of ionic hydrogen spillover catalytic material: 40% by weight potassium nitrate ($KNO_3$) on graphitic carbon powder with 5% by weight 1%-Pd-on-graphitic carbon ($K^+/K^+$ electrocatalytic couple) by the very accurate and reliable method of heat measurement, thermopile conversion of heat into an electrical output signal [Phillips, J., Shim, H., "Additional Calorimetric Examples of Anomalous Heat from Physical Mixtures of K/Carbon and Pd/Carbon", Jan. 1, 1996, A Confidential Report submitted to HydroCatalysis Power Corporation provided by HydroCatalysis Power Corporation, Great Valley Corporate Center, 41 Great Valley Parkway, Malvern, Pa. 19355]. Excess power and heat were observed with flowing hydrogen over the catalyst. However, no excess power was observed with flowing helium over the catalyst mixture. Rates of heat production were reproducibly observed which were higher than that expected from the conversion of all the hydrogen entering the cell to water, and the total energy observed was over four times larger than that expected if all the catalytic material in the cell were converted to the lowest energy state by "known" chemical reactions. Thus, "anomalous" heat, heat of a magnitude and duration which could not be explained by conventional chemistry, was reproducibly observed.

EXAMPLE 6

Excess heat from a pressurized gas energy cell having a gaseous source of energy holes has been observed by HydroCatalysis Power Corporation [manuscript in progress] with low pressure hydrogen in the presence of molybdenum iodide ($MoI_2$) ($Mo^{2+}$ electrocatalytic ion) which was volatilized at the operating temperature of the cell, 210° C. The calorimeter was placed inside a large convection oven that maintained the ambient temperature of the cell at the operating temperature. The cell comprised a 40 cc stainless steel pressure vessel that was surrounded by a 2 inch thick molded ceramic thermal insulator. The cell was sealed with a vacuum tight flange that had a two hole Buffalo gland for a tungsten wire to dissociate molecular hydrogen, a perforation for a Type K thermocouple, a ⅟₁₆ inch inlet for hydrogen which was connected to a ¼ inch stainless steel tube which connected to the hydrogen supply. The flange was sealed with a copper gasket. The bottom of the vessel had a ¼" vacuum port connected to a stainless steel tube with a valve between the cell and a vacuum pump and vacuum gauge. Less than one gram of $MoI_2$ catalyst was placed in a ceramic boat inside the vessel. The vapor pressure of the catalyst was estimated to be about 50 millitorr at the operating temperature 210° C. The hydrogen pressure of about 200 to 250 millitorr was controlled manually by adjusting the supply through the inlet versus the amount pumped away at the outlet where the pressure was monitored in the outlet tube by the vacuum gauge. For each run, the total pressure was made (including the $MoI_2$ pressue in the case of the experimental run) precisely 250 millitorr.

The output power was determined by measuring difference between the cell temperature and the ambient oven temperature and comparing the result to a calibration curve generated by applying power to the inside of the cell with the tungsten filament. Excess power of 0.3 watts was observed from the 40 cc stainless steel reaction vessel containing less than 1 g of $MoI_2$ when hydrogen was flowed over the hot tungsten wire ($\approx$2000° C.). However, no excess power was observed when helium was flowed over the hot tungsten wire or when hydrogen was flowed over the hot tungsten wire with no $MoI_2$ present in the cell. Rates of heat production were reproducibly observed which were higher than that expected from the conversion of all the hydrogen inside the cell to water, and the total energy observed was over 30 times larger than that expected if all the catalytic material in the cell were converted to the lowest energy state by "known" chemical reactions. Thus, "anomalous" heat, heat of a magnitude and duration which could not be explained by conventional chemistry, was reproducibly observed.

The gaseous contents of the reactor were monitored with a mass spectrometer. At the time that excess energy was produced corresponding to the case wherein hydrogen was flowed over the hot filament, a higher ionizing mass two species was observable; whereas, during the control run wherein hydrogen was flowed over the hot tungsten wire with no $MoI_2$ present in the cell, a higher ionizing mass two species was not observed. The higher ionizing mass two species is was assigned to the dihydrino molecule, $$2H\left[\frac{a_H}{p}\right] \to H_2^*\left[2c' = \frac{\sqrt{2}\,a_o}{p}\right].$$

We claim:
1. A cell for extracting energy from hydrogen atoms comprising:
   a reaction vessel containing
   gaseous hydrogen atoms; and
   a gaseous catalyst having a net enthalpy of reaction of about 27*(p/2) eV, where p is an integer greater than 1.
2. A cell according to claim 1, wherein said gaseous catalyst comprises hydrogen atoms having a binding energy of about $E_b$=13.6/$n^2$ eV, where n is a fraction whose numerator is 1 and denominator is an integer greater than 1.
3. A cell according to claim 1, wherein said cell is constructed and arranged to be capable of maintaining the reaction,

$$m \times 27.21\text{ eV} + H\left[\frac{a_H}{m'}\right] + H\left[\frac{a_H}{p}\right] \to$$

$$H^+ + e^- + H\left[\frac{a_H}{(p+m)}\right] + [(p+m)^2 - p^2 - (m'^2 - 2m)] \times 13.6\text{ eV}$$

$$H^+ + e^- \to H\left[\frac{a_H}{1}\right] + 13.6\text{ eV}$$

$$H\left[\frac{a_H}{m'}\right] + H\left[\frac{a_H}{p}\right] \to$$

$$H\left[\frac{a_H}{1}\right] + H\left[\frac{a_H}{(p+m)}\right] + [2pm + m^2 - m'^2] \times 13.6\text{ eV} + 13.6\text{ eV}$$

where m and p are positive non-zero integers, m' is an integer greater than 1, and $a_H$ is the radius of the hydrogen atom (n=1).
4. A cell according to claim 1, further comprising a source of hydrogen atoms including molecules containing hydrogen atoms, and a second catalyst for disassociating said molecules to produce hydrogen atoms.
5. A cell according to claim 4, wherein said second catalyst comprises at least one element selected from the group consisting of transition elements, inner transition elements, precious metals, refractory metals, lanthanides, actinides, and activated charcoal.
6. A cell according to claim 4, wherein said second catalyst is at least one element selected from the group consisting of the refractory metals, activated charcoal, platinum, palladium, gold, rhenium and iridium.
7. A cell according to claim 4, further comprising a valve for controlling the flow of said molecules over said second catalyst.
8. A cell according to claim 1, wherein said gaseous catalyst is formed from a source of gaseous catalyst which is adapted to sublime, boil, or volatize when heated.
9. A cell according to claim 1, wherein said gaseous catalyst is formed from a salt.
10. A cell according to claim 9, wherein said salt is selected from the group consisting of halides, sulfates, phosphates, carbonates, hydroxides, and sulfides.
11. A cell according to claim 9, wherein said gaseous catalyst is formed from a salt of rubidium or potassium.
12. A cell according to claim 11, wherein said salt of potassium is selected from the group consisting of KF, KCl, KBr, KI, $K_2S_2$, KOH, $K_2SO_4$, $K_2CO_3$, $K_2PO_4$, and $K_2GeF_4$.
13. A cell according to claim 11, wherein said salt of rubidium is selected from the group consisting of RbF, RbCl, RbBr, RbI, $Rb_2S_2$, RbOH, $Rb_2SO_4$, $Rb_2CO_3$, and $Rb_3PO_4$.

14. A cell according to claim 1, wherein said gaseous catalyst comprises a cation having a vapor pressure greater than zero when said gaseous catalyst is heated, said cation being selected from the group consisting of $(K^+)$, $(Rb^+)$, $(Mo^{2+})$, and $(Ti^{2+})$.

15. A cell according to claim 1, wherein said gaseous catalyst comprises a pair of cations having a vapor pressure greater than zero when said gaseous catalyst is heated, said pair of cations being selected from the group consisting of: $(Sn^{4+}, Si^{4+})$, $(Pr^{3+}, Ca^{2+})$, $(Sr^{2+}, Cr^{2+})$, $(Cr^{3+}, Tb^{3+})$, $(Sb^{3+}, Co^{2+})$, $(Bi^{3+}, Ni^{2+})$, $(Pd^{2+}, In^+)$, $(La^{3+}, Dy^{3+})$, $(La^{3+}, Ho^{3+})$, $(K^+, K^+)$, $(V^{3+}, Pd^{2+})$, $(Lu^{3+}, Zn^{2+})$, $(As^{3+}, Ho^{3+})$, $(Mo^{5+}, Sn^{4+})$, $(Sb^{3+}, Cd^{2+})$, $(Ag^{2+}, Ag^+)$, $(La^{3+}, Er^{3+})$, $(V^{4+}, B^{3+})$, $(Fe^{3+}, Ti^{3+})$, $(Co^{2+}, Ti^+)$, $(Bi^{3+}, Zn^{2+})$, $(As^{3+}, Dy^{3+})$, $(Ho^{3+}, Mg^{2+})$, $(K^+, Rb^+)$, $(Cr^{3+}, Pr^{3+})$, $(Sr^{2+}, Fe^{2+})$, $(Ni^{2+}, Cu^+)$, $(Sr^{2+}, Mo^{2+})$, $(Y^{3+}, Zr^{4+})$, $(Cd^{2+}, Ba^{2+})$, $(Ho^{3+}, Pb^{2+})$, $(Pd^{2+}, Li^+)$, $(Eu^{3+}, Mg^{2+})$, $(Er^{3+}, Mg^{2+})$, $(Bi^{4+}, Al^{3+})$, $(Ca^{2+}, Sm^{3+})$, $(V^{3+}, La^{3+})$, $(Gd^{3+}, Cr^{2+})$, $(Mn^{2+}, Tl^+)$, $(Yb^{3+}, Fe^{2+})$, $(Ni^{2+}, Ag^+)$, $(Zn^{2+}, Yb^{2+})$, $(Se^{4+}, Sn^{4+})$, $(Sb^{3+}, Bi^{2+})$, and $(Eu^{3+}, Pb^{2+})$.

16. A cell according to claim 1, wherein said gaseous catalyst comprises an ionic compound resistant to reduction by hydrogen atoms.

17. A cell according to claim 1, wherein said gaseous catalyst is adapted to provide ions.

18. A cell according to claim 1, wherein said vessel includes temperature controlling structure capable of maintaining an atomic hydrogen partial pressure of less than about 1 torr.

19. A cell according to claim 1, wherein said vessel includes temperature controlling structure capable of maintaining said catalyst in molten form.

20. A cell according to claim 1, wherein said vessel includes temperature controlling structure capable of maintaining the temperature of said vessel at about 50° C. above the melting point of said gaseous catalyst.

21. A cell according to claim 1, wherein said vessel is constructed and arranged to be capable of maintaining the hydrogen partial pressure in said vessel at about 200 millitorr.

22. A cell according to claim 15, wherein said vessel includes temperature controlling structure capable of maintaining the temperature of said vessel at about 500° C. above the melting point of the compound having the highest melting point of a plurality of compounds which comprise a source of said gaseous catalyst.

23. A cell according to claim 1, further comprising a valve for releasing said catalyst from said vessel.

24. A cell according to claim 1, further comprising a valve for releasing said hydrogen atoms having a binding energy of about $E_b=13.6/n^2$ eV, where n is a fraction whose numerator is 1 and denominator is an integer greater than 1.

25. A cell according to claim 1, wherein said vessel includes temperature controlling structure to control a temperature of said vessel.

26. A cell according to claim 1, further comprising a heater for heating said vessel.

27. A cell according to claim 1, further comprising a catalyst reservoir communicating with said reaction vessel, said catalyst reservoir containing said gaseous catalyst or a source of gaseous catalyst.

28. A cell according to claim 27, further comprising a heater for heating said catalyst.

29. A cell according to claim 27, wherein said catalyst reservoir is external to said reaction vessel.

30. A cell according to claim 29, further comprising a flow control valve for controlling the flow of said catalyst from said catalyst reservoir into said vessel.

31. A cell according to claim 1, further comprising a chamber for containing hydrogen atoms or a source of hydrogen atoms communicating with said reaction vessel.

32. A cell according to claim 31, further comprising a flow control valve for controlling the flow of hydrogen atoms from said chamber into said vessel.

33. A cell according to claim 31 wherein said source of hydrogen atoms comprises an internal combustion engine.

34. A cell according to claim 31, wherein said source of hydrogen atoms comprises a tungsten capillary constructed and arranged to be heated for dissociating molecules containing hydrogen atoms to produce said gaseous hydrogen atoms.

35. A cell according to claim 34, further comprising a valve for controlling the flow of said molecules over said tungsten capillary.

36. A cell according to claim 31, wherein said source of hydrogen atoms comprises an inductively coupled plasma flow tube for dissociating molecules containing hydrogen atoms to produce hydrogen atoms.

37. A cell according to claim 36, further comprising a valve for controlling the flow of said molecules into said inductively coupled plasma flow tube.

38. A cell according to claim 36, further comprising a power controller for controlling the power dissipated in said inductively coupled plasma flow tube.

39. A cell according to claim 1, further comprising a heat exchanger for removing said extracted power from said cell.

40. A cell according to claim 1, further comprising a power gauge for measuring the amount of extracted power in said cell.

41. A cell according to claim 1, wherein said source of gaseous catalyst comprises an ionic compound which is resistant to hydrogen reduction and which is adapted to sublime, boil or become volatile when heated.

42. A cell according to claim 1, wherein said source of gaseous catalyst comprises an ionic compound which is adapted to sublime, boil or become volatile when heated.

43. A cell according to claim 1, wherein said source of gaseous catalyst comprises an ionic compound which is resistant to thermal degradation.

44. A cell according to claim 1, wherein said gaseous catalyst is formed from at least one metal selected from the group consisting of Mo, Ti, and Rb.

45. A cell according to claim 1, wherein said gaseous catalyst is formed from at least one salt selected from the group consisting of $MoI_2$, $TiCl_2$, $TiCl_4$, $SnCl_4$, $SiCl_4$, $PrBr_3$, $CaBr_2$, $SrCl_2$, $CrI_2$, $TbI_3$, $SbCl_3$, $CrF_3$, $CoCl_2$, $BiCl_3$, $NiCl_2$, $PdF_2$, $InCl$, $LaCl_3$, $DyCl_3$, $LaI_3$, $HoI_3$, $VF_3$, $PbF_2$, $VOCl$, $PbI_2$, $LuCl_3$, $PbCl_2$, $AsI_3$, $HoI_3$, $MoCl_5$, $SnCl_4$, $SbI_3$, $CdI_2$, $AgF_2$, $AgF$, $LaI_3$, $ErI_3$, $VCl_4$, $BCl_3$, $FeCl_3$, $TiCl_3$, $CoI_2$, $CoF_2$, $TlI$, $TlF$, $BiBr_3$, $ZnBr_2$, $AsI_3$, $DyI_3$, $HOCl_3$, $MgCl_2$, $CrCl_3$, $PrCl_3$, $SrCl_2$, $FeCl_2$, $NiCl_2$, $CuCl$, $SrCl_2$, $MoCl_2$, $YCl_3$, $ZrCl_4$, $CdI_2$, $BaI_2$, $HoI_3$, $PbI_2$, $PdF_2$, $LiF$, $EuCl_3$, $MgCl_2$, $ErCl_3$, $MgCl_2$, $ErCl_3$, $MgCl_2$, $BiCl_4$, $AlCl_3$, $CaBr_2$, $SmBr_3$, $VaF_3$, $LaCl_3$, $GdI_3$, $CrI_2$, $MnI_2$, $YbBr_3$, $FeBr_2$, $NiCl_2$, $AgCl$, $ZnCl_2$, $YbCl_2$, $SeF_4$, $SnCl_4$, $SnF_4$, $SbI_3$, $BiI_2$, $EuF_3$, and $PbCl_2$.

46. A cell according to claim 1, wherein said catalyst comprises potassium and has a net enthalpy of reaction of 27.28 eV.

47. A cell according to claim 1, wherein said catalyst has a net enthalpy of reaction of about 27.2 eV.

48. A cell according to claim 1, wherein said cell comprises a source of said gaseous catalyst combined with at least one of a hydrocarbon or water disposed such that said gaseous catalyst and said gaseous hydrogen atoms are capable being formed during combustion.

49. A cell according to claim 1, further comprising a means for converting a source of catalyst to said gaseous catalyst.

50. A cell according to claim 49, wherein said means for converting said source of catalyst to said gaseous catalyst comprises at least one of heat, electron-beam energy, photon energy, acoustic energy, electric field, or magnetic field.

51. A cell according to claim 1, further comprising a filament coated with a source of gaseous catalyst.

52. A cell according to claim 1, further comprising a source of gaseous hydrogen atoms is selected from the group consisting of hydrogen gas, water, hydrides, metal-hydrogen solutions, and hydrocarbons.

53. A cell according to claim 52, further comprising means to disassociate water to form gaseous hydrogen atoms.

54. A cell according to claim 1, further comprising a hot filament and a hydrogen containing gas stream.

55. A cell according to claim 1, further comprising a hot grid and a hydrogen containing gas stream.

56. A cell according to claim 1, further comprising a heated tungsten capillary and a hydrogen containing gas stream.

57. A cell according to claim 1, further comprising a hydride maintained under nonequilibrium conditions.

58. A cell according to claim 1, further comprising an inductively coupled plasma flow tube and a hydrogen gas containing stream.

59. A cell according to claim 1, further comprising means to reform hydrocarbons to at least one of gaseous molecular and gaseous atomic hydrogen.

60. A cell according to claim 4, wherein said second catalyst is treated with an aqueous solution of $K_2CO_3$ and $H_2O_2$.

61. A cell according to claim 4, further comprising a temperature controlling structure capable of maintaining a selected atomic hydrogen partial pressure by controlling the temperature of said second catalyst.

62. A cell according to claim 61, wherein said temperature controlling structure is at least one selected from the group consisting of an internal heater, an external heater, the catalysis of hydrogen, and a heat exchanger which removes energy from the cell.

63. A cell according to claim 1, further comprising a source of UV light for disassociating hydrogen containing molecules to form said gaseous hydrogen atoms.

64. A cell according to claim 1, further comprising a means for pyrolysis of hydrocarbons or water to form said gaseous hydrogen atoms.

65. A cell according to claim 4, wherein said second catalyst comprises at least one selected from the group consisting of an element, compound, alloy or mixture of transition elements, inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal, and intercalated Cs carbon.

66. A cell according to claim 4, further comprising a heater to heat said second catalyst.

67. A cell according to claim 4, further comprising a filament or grid constructed and arranged to dissociate hydrogen and to heat said second catalyst.

68. A cell according to claim 4, further comprising means for controlling the power output of said cell.

69. A cell according to claim 68, wherein said means for controlling the power output of said cell comprises means for controlling the temperature of said second catalyst.

70. A cell according to claim 69, wherein said means for controlling the temperature of said second catalyst comprises a filament or grid.

71. A cell according to claim 31, further comprising a flow control means for controlling the flow of a source of gaseous hydrogen atoms or said gaseous hydrogen atoms from said chamber to said reaction vessel.

72. A cell according to claim 1, further comprising a flow control means for controlling the flow of hydrogen from said reaction vessel.

73. A cell according to claim 71, wherein said flow control means comprises a valve.

74. A cell according to claim 1, further comprising a vacuum pump constructed and arranged for controlling the flow of hydrogen from said reaction vessel.

75. A cell according to claim 27, further comprising a flow control means for controlling the flow of catalyst from said catalyst reservoir to said reaction vessel.

76. A cell according claim 1, further comprising means for controlling the flow of said gaseous catalyst from said reaction vessel.

77. A cell according to claim 76, wherein said means for controlling the flow of said gaseous catalyst from said reaction vessel comprises a valve.

78. A cell according to claim 1, further comprising a vacuum pump constructed and arranged for controlling the flow of said gaseous catalyst from said reaction vessel.

79. A cell according to claim 1, further comprising a nonreactive gas.

80. A cell according to claim 1, further comprising a means for controlling the amount of a nonreactive gas in said reaction vessel.

81. A cell according to claim 1, further comprising flow control means for controlling the flow of a nonreactive gas into said reaction vessel.

82. A cell according to claim 81, wherein said means for controlling the amount of nonreactive gas in said vessel comprises a valve constructed and arranged to regulate the flow of said nonreactive gas into said reaction vessel.

83. A cell according to claim 1, further comprising at least one of a valve or pump constructed and arranged for controlling the flow of a nonreactive gas from said reaction vessel.

84. A cell according to claim 1, further comprising a pump in communication with said reaction vessel.

85. A cell according to claim 1, further comprising structure for controlling the vapor pressure of said catalyst.

86. A cell according to claim 85, wherein said structure for controlling the vapor pressure of said catalyst comprises a heater constructed and arranged to control the temperature of said reaction vessel.

87. A cell according to claim 1, further comprising structure for maintaining a selected vapor pressure of said gaseous catalyst or source of said gaseous catalyst.

88. A cell according to claim 1, further comprising structure for maintaining a selected vapor pressure of said gaseous catalyst or source of gaseous catalyst.

89. A cell according to claim 88, wherein said structure for maintaining a selected vapor pressure of said gaseous catalyst or source of gaseous catalyst comprises a valve constructed and arranged for controlling the flow of said source of gaseous catalyst or gaseous catalyst from said catalyst reservoir and a valve constructed and arranged for controlling the flow of said source of gaseous catalyst or gaseous catalyst from said reaction vessel.

90. A cell according to claim 88, wherein said structure for maintaining a selected vapor pressure of said source of gaseous catalyst or said gaseous catalyst comprises a valve constructed and arranged for controlling the flow of said source of gaseous catalyst or gaseous catalyst from said reaction vessel.

91. A cell according to claim 1, further comprising a valve for releasing hydrogen atoms having a binding energy of about $E_b=13.6/n^2$ eV, where n is a fraction whose numerator is 1 and denominator is an integer greater than 1 or a compound containing said hydrogen atoms from said reaction vessel.

92. A cell according to claim 1, further comprising means for adsorbing energy released from said hydrogen atom.

93. A cell according to claim 1, wherein said vessel comprises an internal combustion chamber.

94. A cell according to claim 93, wherein said internal combustion chamber is an engine cylinder.

95. A cell according to claim 1, further comprising means for controlling the power output of said cell.

96. A cell according to claim 95, wherein said means for controlling the power output of said cell comprises means for controlling the amount of said gaseous catalyst.

97. A cell according to claim 96, wherein said means for controlling the amount of gaseous catalyst comprises means for controlling the temperature of said vessel and said gaseous catalyst is selected to have a vapor pressure dependent upon the temperature of said reaction vessel.

98. A cell according to claim 95, wherein said means for controlling the power output of said cell comprises means for controlling the flow of a source of gaseous catalyst or gaseous catalyst from said reaction vessel.

99. A cell according to claim 95, wherein said means for controlling the power output of said cell comprises means for controlling the temperature of a source of catalyst.

100. A cell according to claim 95, wherein said means for controlling the power output of said cell comprises means for controlling the amount of said gaseous hydrogen atoms or a source of gaseous hydrogen atoms in said vessel.

101. A cell according to claim 95, wherein said means for controlling the power output of said cell comprises means for controlling the flow of gaseous hydrogen atoms or source of said hydrogen atoms into said reaction vessel.

102. A cell according to claim 95, wherein said means for controlling the power output of said cell comprises means for controlling the flow of gaseous hydrogen atoms or source of said hydrogen atoms from said reaction vessel.

103. A cell according to claim 95, wherein said means for controlling the power output of said cell comprises controlling the amount of said nonreactive gas present in said reaction vessel.

104. A cell according to claim 103, wherein said means for controlling the amount of nonreactive gas comprises means for controlling the flow of said nonreactive gas into said reaction vessel.

105. A cell according to claim 103, wherein said means for controlling the amount of nonreactive gas comprises means for controlling the flow of said nonreactive gas from said reaction vessel.

106. A cell according to claim 95, wherein said means for controlling the power output of said cell comprises means for controlling the flow of a hydrogen containing gas over at least one of a hot filament, a tungsten capillary heated by electron bombardment, or an inductively coupled plasma flow.

107. A cell according to claim 95, wherein said means for controlling the power output of said cell comprises means for controlling the power dissipated in an inductively coupled plasma flow tube.

108. A cell according to claim 95, wherein said means for controlling the power output of said cell comprises means for controlling the power dissipated in a hot filament, grid, or tungsten capillary heated by electron bombardment.

109. A cell according to claim 95, wherein said means for controlling the power output of said cell comprises means for controlling the temperature of a hot filament, grid or tungsten capillary heated by electron bombardment over which a hydrogen containing gas flows.

110. A cell according to claim 95, wherein said means for controlling the power output of said cell comprises means for controlling the temperature of a hydride maintained under nonequilibrium conditions.

111. A cell according to claim 27, further comprising means for controlling the power output of said cell.

112. A cell according to claim 111, wherein said means for controlling the power output of said cell comprises means for controlling the temperature of said catalyst reservoir and said gaseous catalyst is selected to have a vapor pressure dependent upon the temperature of said catalyst reservoir.

113. A cell according to claim 111, wherein said means for controlling the power output of said cell comprises means for controlling the flow of said source of gaseous catalyst or gaseous catalyst from said catalyst reservoir into said reaction vessel.

114. A cell according to claim 1, further comprising a boat contained within said reaction chamber, said boat containing a source of gaseous catalyst or said gaseous catalyst.

115. A cell according to claim 114, further comprising a means for controlling the power of said cell.

116. A cell according to claim 114, wherein said means for controlling the power output of said cell comprises means for controlling the temperature of said boat and said gaseous catalyst is selected to have a vapor pressure dependent upon the temperature of said boat.

117. A cell according to claim 27, further comprising means for measuring the temperature of said catalyst reservoir.

118. A cell according to claim 114, further comprising means for measuring the temperature of said boat.

119. A cell according to claim 27, further comprising a means for measuring the temperature of said source of said gaseous catalyst contained in said catalyst reservoir.

120. A cell according to claim 114, further comprising a means for measuring the temperature of said source of said gaseous catalyst contained in said boat.

121. A cell according to claim 1, further comprising means for measuring the temperature of said reaction vessel.

122. A cell according to claim 1, further comprising means for measuring the temperature of a source of said gaseous hydrogen atoms.

123. A cell according to claim 4, further comprising means for measuring the temperature said second catalyst.

124. A cell according to claim 1, further comprising means to measure the cell temperature.

125. A cell according to claim 124, further comprising temperature controlling structure constructed and arranged to maintain a temperature in said reaction vessel greater than a temperature in said catalyst reservoir.

126. A cell according to claim 114, further comprising temperature controlling structure constructed and arranged to maintain a temperature in said reaction vessel greater than a temperature in said boat.

127. A cell according to claim 1, further comprising temperature controlling structure for maintaining a selected temperature of said reaction vessel.

128. A cell according to claim 1, further comprising a nebulizer or atomizer.

129. A cell according to claim 1, further comprising means to measure the pressure in said reaction vessel.

130. A cell according to claim 1, further comprising means to measure the hydrogen pressure in said reaction vessel.

131. A cell according to claim 1, further comprising means to measure the gaseous catalyst pressure in said reaction vessel.

132. A cell according to claim 1, wherein said vessel is capable of containing a pressure within the range of $10^{-3}$ atmospheres to 100 atmospheres.

133. A cell according to claim 1, further comprising a vacuum pump in communication with said vessel and said vessel being constructed and arranged to contain pressures less than atmospheric.

134. A cell according to claim 27, further comprising a temperature controlling structure capable of maintaining a temperature in the said reaction vessel that is greater than a temperature of said catalyst reservoir.

135. A cell according to claim 27, further comprising temperature controlling structure capable of maintaining said source of gaseous catalyst in a molten form.

136. A cell according to claim 114, further comprising temperature controlling structure capable of maintaining said source of gaseous catalyst in a molten form.

137. A cell according to claim 27, further comprising temperature controlling structure capable of maintaining the temperature of said catalyst reservoir at about 50° C. above the melting point of said gaseous catalyst.

138. A cell according to claim 1, further comprising temperature controlling structure capable of maintaining the temperature of said reaction vessel at about 50° C. above the melting point of a source of gaseous catalyst.

139. A cell according to claim 114, further comprising temperature controlling structure capable of maintaining the temperature of said boat at about 50° C. above the melting point of said gaseous catalyst.

140. A cell according to claim 15, further comprising a catalyst reservoir in communication with said reaction vessel and temperature controlling structure capable of maintaining the temperature of said catalyst reservoir at about 50° C. above the melting point of the compound having the highest melting point of a plurality of compounds which comprise said source of gaseous catalyst.

141. A cell according to claim 15, further comprising a boat contained in said reaction vessel and temperature controlling structure capable of maintaining the temperature of said boat at about 50° C. above the melting point of the compound having the highest melting point of a plurality of compounds which comprise said source of gaseous catalyst.

142. A cell according to claim 27, further comprising temperature controlling structure capable of maintaining the temperature of said reaction vessel at about 50° C. above the melting point of said gaseous catalyst.

143. A cell according to claim 15, further comprising a catalyst reservoir containing said source of gaseous catalyst and being in communication with said reaction vessel, and temperature controlling structure capable of maintaining the temperature of said reaction vessel at about 50° C. above the melting point of the compound having the highest melting point of a plurality of compounds which comprise said source of gaseous catalyst.

144. A cell according to claim 15, further comprising a boat containing said source of gaseous catalyst and being disposed in said reaction vessel, and temperature controlling structure capable of maintaining the temperature of said reaction vessel at about 50° C. above the melting point of the compound having the highest melting point of a plurality of compounds which comprise said source of gaseous catalyst.

145. A method for extracting energy from hydrogen atoms comprising the steps of:
providing a gaseous catalyst having a net enthalpy of reaction of about 27*(p/2) eV, where p is an integer greater than 1;
providing gaseous hydrogen atoms; and
reacting said gaseous catalyst with said gaseous hydrogen atoms, thereby releasing energy from said gaseous hydrogen atoms.

146. A method according to claim 145, wherein said gaseous hydrogen atoms are provided by disassociating molecules containing hydrogen atoms.

147. A method according to claim 145, wherein gaseous hydrogen atoms are
provided by contacting molecules containing hydrogen atoms with a second catalyst for disassociating said molecules to produce hydrogen atoms in the gas phase.

148. A method according to claim 145, wherein said gaseous catalyst comprises gaseous hydrogen atoms having a binding energy of about $E_b=13.6/n^2$ eV, where n is a fraction whose numerator is 1 and denominator is an integer greater than 1.

149. A method according to claim 145, wherein said gaseous catalyst is provided according to the reaction,

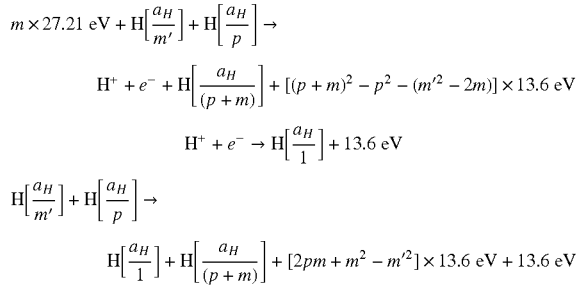

where m and p are positive non-zero integers, m' is an integer greater than 1, and $a_H$ is the radius of the hydrogen atom (n=1).

150. A method according to claim 145, wherein said gaseous catalyst is provided by volatizing a material to a gaseous state and ionizing said gaseous material.

151. A method according to claim 145, wherein said hydrogen atoms are provided by flowing gaseous molecules containing hydrogen atoms over a hot refractory metal, transition metal, platinum, palladium, gold, rhenium, or iridium.

152. A method according to claim 145, wherein said hydrogen atoms are provided by flowing gaseous molecules containing hydrogen atoms over a tungsten capillary heated by electron bombardment to between 1800 and 2000 K.

153. A method according to claim 145, wherein said hydrogen atoms are provided by flowing gaseous molecules containing hydrogen atoms in an inductively coupled plasma flow tube.

154. A method according to claim 145, wherein said reaction occurs at a pressure less than about one torr.

155. A method according to claim 145, wherein the partial pressure of hydrogen atoms in the reaction is less than about one torr.

156. A method according to claim 145, wherein the partial pressure of hydrogen atoms in the reaction is about 200 millitorr.

157. A method according to claim 145, wherein said reaction occurs at a temperature of about 50° C. above the melting point of said gaseous catalyst.

158. A method according to claim 145, wherein the vapor partial pressure of said gaseous catalyst is controlled by varying the temperature of said gaseous catalyst.

159. A method according to claim 145, further comprising a step of isolating produced hydrogen atoms having a binding energy of about $E_b = 13.6/n^2$ eV, where n is a fraction whose numerator is 1 and denominator is an integer greater than 1.

160. A method according to claim 145, further comprising the step of forming said gaseous hydrogen atoms from a source of gaseous catalyst comprising an ionic compound which is resistant to hydrogen reduction.

161. A method according to claim 145, further comprising the step of forming said gaseous hydrogen atoms from a source of gaseous catalyst comprising an ionic compound which is resistant to hydrogen reduction and which is adapted to sublime, boil or become volatile when heated.

162. A method according to claim 145, further comprising the step of forming said gaseous compound from a source of gaseous catalyst comprising an ionic compound which is adapted to sublime, boil or become volatile when heated.

163. A method according to claim 145, further comprising the step of forming said gaseous compound from a source of gaseous catalyst comprising an ionic compound which is resistant to thermal degradation.

164. A method according to claim 145, further comprising the step of forming said gaseous hydrogen atoms from a source of gaseous catalyst comprising a salt of rubidium or potassium.

165. A method according to claim 145, further comprising the step of forming said gaseous hydrogen atoms from a source of gaseous catalyst comprising a salt that can form a vapor comprising ions when heated.

166. A method according to claim 145, further comprising the step of forming said gaseous hydrogen atoms from a source of gaseous catalyst comprising a salt of rubidium selected from the group consisting of RbF, RbCl, RbBr, RbI, $Rb_2S_2$, RbOH, $Rb_2SO_4$, $Rb_2CO_3$, and $Rb_3PO_4$.

167. A method according to claim 145, further comprising the step of forming said gaseous hydrogen atoms from a source of gaseous catalyst comprising a salt of potassium selected from the group consisting of KF, KCl, KBr, KI, $K_2S_2$, KOH, $K_2SO_4$, $K_2CO_3$, $K_3PO_4$, and $K_2GeF_4$.

168. A method according to claim 145, further comprising the step of forming said gaseous hydrogen atoms from a source of gaseous catalyst comprising at least one metal selected from the group consisting of Mo, Ti, and Rb.

169. A method according to claim 145, further comprising the step of forming said gaseous hydrogen atoms from a source of gaseous catalyst comprising at least one salt selected from the group consisting of $MoI_2$, $TiCl_2$, $TiCl_4$, $SnCl_4$, $SiCl_4$, $PrBr_3$, $CaBr_2$, $SrCl_2$, $CrI_2$, $TbI_3$, $SbCl_3$, $CrF_3$, $CoCl_2$, $BiCl_3$, $NiCl_2$, $PdF_2$, $InCl$, $LaCl_3$, $DyCl_3$, $LaI_3$, $HoI_3$, $KNO_3$, $VF_3$, $PbF_2$, $VOCl$, $PbI_2$, $LuCl_3$, $PbCl_2$, $AsI_3$, $HoI_3$, $MoCl_5$, $SnCl_4$, $SbI_3$, $CdI_2$, $AgF_2$, $AgF$, $LaI_3$, $ErI_3$, $VCl_4$, $BCl_3$, $FeCl_3$, $TiCl_3$, $CoI_2$, $CoF_2$, $TlI$, $TlF$, $BiBr_3$, $ZnBr_2$, $AsI_3$, $DyI_3$, $HoCl_3$, $MgCl_2$, $CrCl_3$, $PrCl_3$, $SrCl_2$, $FeCl_2$, $NiCl_2$, $CuCl$, $SrCl_2$, $MoCl_2$, $YCl_3$, $ZrCl_4$, $CdI_2$, $BaI_2$, $HoI_3$, $PbI_2$, $PdF_2$, $LiF$, $EuCl_3$, $MgCl_2$, $ErCl_3$, $MgCl_2$, $ErCl_3$, $MgCl_2$, $BiCl_4$, $AlCl_3$, $CaBr_2$, $SmBr_3$, $VaF_3$, $LaCl_3$, $GdI_3$, $CrI_2$, $MnI_2$, $YbBr_3$, $FeBr_2$, $NiCl_2$, $AgCl$, $ZnCl_2$, $YbCl_2$, $SeF_4$, $SnCl_4$, $SnF_4$, $SbI_3$, $BiI_2$, $EuF_3$, and $PbCl_2$.

170. A method according to claim 145, wherein said gaseous catalyst comprises at least one ion selected from the group consisting of $Mo^{2+}$, $Ti^{2+}$, and $Rb^+$.

171. A method according to claim 145, wherein said gaseous catalyst comprises at least one pair of ions selected from the group consisting of: $(Sn^{4+}, Si^{4+})$, $(Pr^{3+}, Ca^{2+})$, $(Sr^{2+}, Cr^{2+})$, $(Cr^{3+}, Tb^{3+})$, $(Sb^{3+}, Co^{2+})$, $(Bi^{3+}, Ni^{2+})$, $(Pd^{2+}, In^+)$, $(La^{3+}, Dy^{3+})$, $(La^{3+}, Ho^{3+})$, $(K^+, K^+)$, $(V^{3+}, Pd^{2+})$, $(Lu^{3+}, Zn^{2+})$, $(As^{3+}, Ho^{3+})$, $(Mo^{5+}, Sn^{4+})$, $(Sb^{3+}, Cd^{2+})$, $(Ag^{2+}, Ag^+)$, $(La^{3+}, Er^{3+})$, $(V^{4+}, B^{3+})$, $(Fe^{3+}, Ti^{3+})$, $(Co^{2+}, Ti^+)$, $(Bi^{3+}, Zn^{2+})$, $(As^{3+}, Dy^{3+})$, $(Ho^{3+}, Mg^{2+})$, $(K^+, Rb^+)$, $(Cr^{3+}, Pr^+)$, $(Sr^{2+}, Fe^{2+})$, $(Ni^{2+}, Cu^+)$, $(Sr^{2+}, Mo^{2+})$, $(Y^{3+}, Zr^{4+})$, $(Cd^{2+}, Ba^{2+})$, $(Ho^{3+}, Pb^{2+})$, $(Pb^{2+}, Li^+)$, $(Eu^{3+}, Mg^{2+})$, $(Er^{3+}, Mg^{2+})$, $(Bi^{4+}, Al^{3+})$, $(Ca^{2+}, Sm^{3+})$, $(V^{3+}, La^{3+})$, $(Gd^{3+}, Cr^{2+})$, $(Mn^{2+}, Ti^+)$, $(Yb^{3+}, Fe^{2+})$, $(Ni^{2+}, Ag^+)$, $(Zn^{2+}, Yb^{2+})$, $(Se^{4+}, Sn^{4+})$, $(Sb^{3+}, Bi^{2+})$, and $(Eu^{3+}, Pb^{2+})$.

172. A method according to claim 145, further comprising the step of forming said gaseous catalyst from a source of gaseous catalyst comprising a salt of one or more cations and at least one anion selected from the group consisting of halides, sulfates, phosphates, carbonates, hydroxide and sulfides.

173. A method according to claim 145, wherein said gaseous catalyst is selected to have a resonant adsorption with the energy released from said gaseous hydrogen atoms undergoing a transition to a lower energy state.

174. A method according to claim 145, wherein said gaseous catalyst comprises potassium and has a net enthalpy of reaction of 27.28 eV.

175. A method according to claim 145, wherein said gaseous catalyst has a net enthalpy of reaction of about 27.2 eV.

176. A method according to claim 145, further comprising the step of combining a source of gaseous catalyst with a source of gaseous hydrogen atoms comprising at least one of a hydrocarbon or water, and providing combustion which volatizes said source of gaseous catalyst to form said gaseous catalyst and provide said gaseous hydrogen atoms.

177. A method according to claim 145, further comprising the step of forming a source of gaseous catalyst or said gaseous catalyst in situ.

178. A method according to claim 177, wherein said step of forming said source of gaseous catalyst or said gaseous catalyst in situ comprises the ionization of a reactant.

179. A method according to claim 178, wherein said step of ionization comprises thermal ionization of said reactant.

180. A method according to claim 178, wherein said step of ionization comprises chemical ionization of said reactant.

181. A method according to claim 180, wherein said step of chemical ionization comprises oxidation or reduction of said reactant.

182. A method according to claim 145, further comprising the step of volatizing a source of catalyst to form said gaseous catalyst utilizing energy from at least one of heat, electron-beam energy, photon energy, acoustic energy, electric field, or magnetic field.

183. A method according to claim 145, wherein said the step of volatizing a source of catalyst comprises the step of heating a filament coated with said source of gaseous catalyst.

184. A method according to claim 145, further comprising adding a source of catalyst to said reaction vessel and heating said source of catalyst to form said gaseous catalyst.

185. A method according to claim 145, further comprising the step of providing a source of catalyst in a catalyst reservoir comprising a container separate from said vessel and said container communicates with said reaction vessel.

186. A method according to claim 145, further comprising the step of providing a source of catalyst in a boat contained within said reaction vessel.

187. A method according to claim 145, wherein said step of providing hydrogen atoms comprises the steps of disassociating a hydrogen containing compound into hydrogen atoms.

188. A method according to claim 145, wherein said step of providing hydrogen atoms comprises the steps of passing a hydrogen containing gas over a hot filament.

189. A method according to claim 145, wherein said step of providing hydrogen atoms comprises the steps of passing a hydrogen containing gas over a hot grid.

190. A method according to claim 145, wherein said step of providing hydrogen atoms comprises the steps of passing a hydrogen containing gas through a tungsten capillary heated by electron bombardment.

191. A method according to claim 145, wherein said step of providing hydrogen atoms comprises the steps of maintaining a hydride under nonequilibrium conditions.

192. A method according to claim 147, wherein said second catalyst comprises at least one element selected from the group consisting of transition elements, inner transition elements, precious metals, refractory metals, lanthanides, actinides and activated charcoal.

193. A method according to claim 147, wherein said second catalyst is selected from the group consisting of an element, compound, alloy or mixture of transition elements, inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal, and intercalated Cs carbon.

194. A method according to claim 147, further comprising the step of utilizing a hot filament or hot grid to disassociate a hydrogen containing gas into gaseous hydrogen atoms and to heat said second catalyst.

195. A method according to claim 147, further comprising the step of controlling the power output of said cell.

196. A method according to claim 147, wherein said step of controlling the power output of said cell comprises controlling the temperature of said second catalyst.

197. A method according to claim 196, wherein said step of controlling the temperature of said second catalyst comprises utilizing a heated filament or grid.

198. A method according to claim 145, further comprising the step of forming said gaseous hydrogen atoms from at least one source of gaseous hydrogen atoms selected from the group consisting of hydrogen gas, water, hydrides, metal-hydrogen solutions, and hydrocarbons.

199. A method according to claim 145, wherein said step of providing gaseous hydrogen atoms comprises pyrolyzing hydrocarbons or water.

200. A method according to claim 145, further comprising the step of reforming hydrocarbons to at least one of gaseous molecular and gaseous atomic hydrogen.

201. A method according to claim 145, further comprising the step of disassociating hydrogen containing molecules using UV light to form said gaseous hydrogen atoms.

202. A method according to claim 145, further comprising the step of controlling the amount of gaseous hydrogen provided in said reaction vessel.

203. A method according to claim 145, further comprising the step of controlling the flow of a source of gaseous hydrogen atoms or said gaseous hydrogen atoms from a chamber to said reaction vessel.

204. A method according to claim 145, further comprising the step of utilizing a valve for controlling the flow of gaseous hydrogen or source of gaseous hydrogen from said reaction vessel.

205. A method according to claim 145, further comprising the step of controlling the flow of gaseous hydrogen from said reaction vessel.

206. A method according to claim 145, further comprising the step of utilizing a vacuum pump for controlling the flow of gaseous hydrogen from said reaction vessel.

207. A method according to claim 145, further comprising the step of utilizing a valve for controlling the flow of gaseous hydrogen from a chamber into said reaction vessel.

208. A method according to claim 145, further comprising controlling the partial pressure of said gaseous hydrogen atoms.

209. A method according to claim 145, wherein a partial pressure of said gaseous hydrogen atoms or source of gaseous hydrogen atoms in said reaction vessel is maintained within the range of $10^{-3}$ atmospheres to 100 atmospheres.

210. A method according to claim 145, further comprising controlling the amount of gaseous catalyst or a source of gaseous catalyst introduced into said reaction vessel.

211. A method according to claim 145, further comprising controlling the flow of gaseous catalyst or a source of gaseous catalyst from a catalyst reservoir containing gaseous catalyst or a source of gaseous catalyst to said reaction vessel.

212. A method according to claim 145, further comprising controlling the flow of gaseous catalyst or a source of gaseous catalyst from a boat containing gaseous catalyst or a source of gaseous catalyst.

213. A method according to claim 145, further comprising the step of controlling the flow of said gaseous catalyst or a source of gaseous catalyst from said reaction vessel.

214. A method according to claim 145, further comprising the step of controlling the vapor pressure of said gaseous catalyst or a source of gaseous catalyst in said reaction vessel.

215. A method according to claim 145, wherein a vapor pressure of said gaseous catalyst or a source of gaseous catalyst is maintained at about 50 to 210 millitorr.

216. A method according to claim 145, further comprising using a vacuum pump to control the flow of said gaseous catalyst or a source of gaseous catalyst from said reaction vessel.

217. A method according to claim 145, further comprising using a valve to control the flow of a source of gaseous catalyst or a source of gaseous catalyst from a catalyst reservoir into said reaction vessel.

218. A method according to claim 145, further comprising using a valve to control the flow of a source of gaseous catalyst or said catalyst from said reaction vessel.

219. A method according to claim 145, further comprising the step of supplying a nonreactive gas to said reaction vessel.

220. A method according to claim 219, further comprising the step of controlling the vapor pressure of said nonreactive gas in said reaction vessel.

221. A method according to claim 219, further comprising the step of controlling the flow of said nonreactive gas supplied to said reaction vessel.

222. A method according to claim 219, further comprising the step of controlling the amount of said nonreactive gas released from said reaction vessel.

223. A method according to claim 219, further comprising utilizing a vacuum pump for controlling the flow of said nonreactive gas from said reaction vessel.

224. A method according to claim 219, further comprising the step of utilizing a valve for controlling the flow of said nonreactive gas from said reaction vessel.

225. A method according to claim 219, further comprising the step of utilizing a valve for controlling the flow of said nonreactive gas into said reaction vessel.

226. A method according to claim 145, further comprising the step of controlling the vapor pressure of said gaseous catalyst in said reaction vessel.

227. A method according to claim 226, wherein said step of controlling the vapor pressure of said gaseous catalyst comprises controlling the temperature in a catalyst reservoir containing a source of gaseous catalyst or said gaseous catalyst and being in communication with said reaction vessel, and controlling the flow of gaseous catalyst from said catalyst reservoir.

228. A method according to claim 226, wherein said step of controlling the vapor pressure of said gaseous catalyst comprises controlling the temperature in a boat containing a source of gaseous catalyst or said gaseous catalyst and being contained in said reaction vessel, and controlling the flow of gaseous catalyst from said boat.

229. A method according to claim 145, further comprising the step of controlling the temperature in a catalyst reservoir containing a source of gaseous catalyst or said gaseous catalyst and being in communication with said reaction vessel.

230. A method according to claim 145, further comprising the step of controlling the temperature in a boat containing a source of gaseous catalyst or said gaseous catalyst and being contained in said reaction vessel.

231. A method according to claim 145, wherein the reaction to provide a net enthalpy of about 27 (p/2) eV, where p is a positive integer greater than 1, comprises an electrochemical, chemical, photochemical, thermal, free radical, sonic, nuclear, inelastic photon, or particle scattering reaction, or mixtures thereof.

232. A method according to claim 145, wherein a pressure in said reaction vessel is maintained within the range of $10^{-3}$ atmospheres to 100 atmospheres.

233. A method according to claim 145, wherein said reaction occurring at a pressure less than atmospheric pressure.

234. A method according to claim 145, further comprising the step of releasing hydrogen atoms from said reaction vessel having a binding energy of about $E_b=13.6/n^2$ eV, where n is a fraction whose numerator is 1 and denominator is an integer greater than 1 or a compound containing said hydrogen atoms.

235. A method according to claim 145, further comprising the step of adsorbing said released energy.

236. A method according to claim 145, further comprising the step of converting energy released from said hydrogen atom into electrical energy.

237. A method according to claim 145, wherein said reaction step is conducted in an internal combustion chamber.

238. A method according to claim 145, wherein said internal combustion chamber is an engine cylinder.

239. A method according to claim 145, further comprising the step of controlling the power output of said cell.

240. A method according to claim 239, wherein said step of controlling the power output of said cell comprises controlling the amount of said gaseous catalyst present in said reaction vessel.

241. A method according to claim 240, wherein said step of controlling the amount of gaseous catalyst comprises controlling the temperature of said reaction vessel and selecting said gaseous catalyst or source of gaseous catalyst to have a vapor pressure dependent upon the temperature of said reaction vessel.

242. A method according to claim 240, wherein said step of controlling the amount of gaseous catalyst comprises controlling the temperature of a catalyst reservoir containing a source of gaseous catalyst or said gaseous catalyst and being in communication with said reaction vessel, and selecting said gaseous catalyst to have a vapor pressure dependent upon the temperature of said catalyst reservoir.

243. A method according to claim 240, wherein said step of controlling the amount of gaseous catalyst comprises controlling the flow of said source of gaseous catalyst or gaseous catalyst from said catalyst reservoir into said reaction vessel.

244. A method according to claim 240, wherein said step of controlling the amount of gaseous catalyst comprises controlling the flow of said source of gaseous catalyst or gaseous catalyst from said reaction vessel.

245. A method according to claim 240, wherein said step of controlling the amount of gaseous catalyst comprises controlling the temperature of a boat containing a source of gaseous catalyst or said gaseous catalyst and being contained in said reaction vessel, and selecting said gaseous catalyst to have a vapor pressure dependent upon the temperature of said boat.

246. A method according to claim 239, wherein said step of controlling the power output of said cell comprises controlling the amount of said gaseous hydrogen atoms present in said reaction vessel.

247. A method according to claim 246, wherein said step of controlling the amount of said gaseous hydrogen atoms comprises controlling the flow of gaseous hydrogen atoms or source of gaseous hydrogen atoms into said reaction vessel.

248. A method according to claim 246, wherein said step of controlling the amount of said source of gaseous hydrogen atoms or gaseous hydrogen atoms comprises controlling the flow of said source of gaseous hydrogen atoms or gaseous hydrogen atoms from said reaction vessel.

249. A method according to claim 246, wherein said step of controlling the amount of said source of gaseous hydrogen atoms or gaseous hydrogen atoms comprises controlling the temperature of a second catalyst for dissociating a hydrogen containing compound into gaseous hydrogen atoms.

250. A method according to claim 249, wherein said step of controlling the temperature of a second catalyst for dissociating a hydrogen containing compound into gaseous hydrogen atoms comprises controlling the power dissipated in a second catalyst heater.

251. A method according to claim 239, wherein said step of controlling the power output of said cell comprises controlling the amount of nonreactive gas in said reaction vessel.

252. A method according to claim 251, wherein said step of controlling the amount of nonreactive gas in said reaction vessel comprises controlling the flow of nonreactive gas into said reaction vessel.

253. A method according to claim 252, wherein said step of controlling the amount of nonreactive gas in said reaction vessel comprises controlling the flow of nonreactive gas from said reaction vessel.

254. A method according to claim 239, wherein said step of controlling the power output of said cell comprises controlling the temperature of a source of gaseous catalyst.

255. A method according to claim 239, wherein said step of controlling the power output of said cell comprises controlling the flow of a hydrogen containing gas over at least one of a hot filament, a tungsten capillary heated by electron bombardment, or an inductively coupled plasma flow.

256. A method according to claim 239, wherein said step of controlling the power output of said cell comprises controlling the power dissipated in an inductively coupled plasma flow tube, hot filament or grid, or tungsten capillary heated by electron bombardment.

257. A method according to claim 239, wherein said step of controlling the power output of said cell comprises controlling the temperature of a hot filament or tungsten capillary heated by electron bombardment over which a hydrogen containing gas flows.

258. A method according to claim 239, wherein said step of controlling the power output of said cell comprises controlling the temperature of a hydride maintained under nonequilibrium conditions.

259. A method according to claim 145, wherein a temperature in said reaction vessel is maintained at a higher temperature than in a catalyst reservoir in communication with said reaction vessel or a boat contained within said reaction vessel.

260. A method according to claim 145, further comprising the step of measuring the temperature of a catalyst reservoir in communication with said reaction vessel or a boat contained in said reaction vessel.

261. A method according to claim 145, further comprising the step of measuring the temperature of a source of said gaseous catalyst contained in a catalyst reservoir in communication with said reaction vessel or a boat contained within said reaction vessel.

262. A method according to claim 145, further comprising the step of measuring the temperature of a chamber containing a source of said hydrogen atoms in communication with said reaction vessel.

263. A method according to claim 145, further comprising the step of measuring the temperature of a source of said gaseous hydrogen atoms.

264. A method according to claim 147, further comprising the step of measuring the temperature of said second catalyst.

265. A method according to claim 145, further comprising the step of controlling the temperature of said reaction vessel.

266. A method according to claim 145, further comprising utilizing a nebulizer or atomizer to form said gaseous catalyst.

267. A method according to claim 145, further comprising the step of measuring the pressure in said reaction vessel.

268. A method according to claim 145, further comprising the step of controlling the pressure in said reaction vessel.

269. A method according to claim 145, further comprising the step of measuring the hydrogen pressure in said reaction vessel.

270. A method according to claim 145, further comprising the step of measuring the gaseous catalyst pressure in said reaction vessel.

271. A method according to claim 145, further comprising the step of converting energy released from said gaseous hydrogen atoms into electrical energy.

272. A method according to claim 145, further comprising controlling the pressure of said gaseous catalyst by controlling the amount of said source of catalyst being added to said reaction vessel.

273. A cell for extracting energy from hydrogen atoms comprising:
a reaction vessel;
a source of gaseous hydrogen atoms; and
a source of a gaseous catalyst having a net enthalpy of reaction of about $27(p/2)$ eV, where p is an integer greater than 1.

274. A cell for extracting energy from hydrogen atoms comprising:
a reaction vessel;
a chamber communicating with said vessel, said chamber containing gaseous hydrogen atoms or a source of said hydrogen atoms; and
a catalyst reservoir communicating with said reaction vessel or a boat contained in said reaction vessel, said catalyst reservoir or boat containing a gaseous catalyst having a net enthalpy of reaction of about $27*(p/2)$ eV, where p is an integer greater than 1, or a source of said gaseous catalyst.

275. A cell according to claim 274, wherein said source of gaseous catalyst comprises an ionic compound which is resistant to hydrogen reduction.

276. A cell according to claim 274, wherein said source of gaseous catalyst comprises an ionic compound which is resistant to hydrogen reduction and which is adapted to sublime, boil or become volatile when heated.

277. A cell according to claim 274, wherein said source of gaseous catalyst comprises an ionic compound which is adapted to sublime, boil or become volatile when heated.

278. A cell according to claim 274, wherein said source of gaseous catalyst comprises an ionic compound which is resistant to thermal degradation.

279. A cell according to claim 274, wherein said source of gaseous catalyst comprises a salt of rubidium or potassium.

280. A cell according to claim 274, wherein said source of gaseous catalyst comprises a salt that can form a vapor comprising ions when heated.

281. A cell according to claim 274, wherein said source of gaseous catalyst comprises a salt of rubidium selected from the group consisting of RbF, RbCl, RbBr, RbI, $Rb_2S_2$, RbOH, $Rb_2SO_4$, $Rb_2CO_3$, and $Rb_3PO_4$.

282. A cell according to claim 274, wherein said source of gaseous catalyst comprises a salt of potassium selected from the group consisting of KF, KCl, KBr, KI, $K_2S_2$, KOH, $K_2SO_4$, $K_2CO_3$, $K_3PO_4$, and $K_2GeF_4$.

283. A cell according to claim 274, wherein said source of gaseous catalyst comprises at least one metal selected from the group consisting of Mo, Ti, and Rb.

284. A cell according to claim 274, wherein said source of gaseous catalyst comprises at least one salt selected from the group consisting of $MoI_2$, $TiCl_2$, $TiCl_4$, $SnCl_4$, $SiCl_4$, $PrBr_3$, $CaBr_2$, $SrCl_2$, $CrI_2$, $TbI_3$, $SbCl_3$, $CrF_3$, $CoCl_2$, $BiCl_3$, $NiCl_2$, $PdF_2$, InCl, $LaCl_3$, $DyCl_3$, $LaI_3$, $HoI_3$, $KNO_3$, $VF_3$, $PbF_2$, VOCl, $PbI_2$, $LuCl_3$, $PbCl_2$, $AsI_3$, $HoI_3$, $MoCl_5$, $SnCl_4$, $SbI_3$, $CdI_2$, $AgF_2$, AgF, $LaI_3$, $ErI_3$, $VCl_4$, $BCl_3$, $FeCl_3$, $TiCl_3$, $CoI_2$, $CoF_2$, TlI, TlF, $BiBr_3$, $ZnBr_2$, $AsI_3$, $DyI_3$, $HoCl_3$, $MgCl_2$, $CrCl_3$, $PrCl_3$, $SrCl_2$, $FeCl_2$, $NiCl_2$, CuCl, $SrCl_2$, $MoCl_2$, $YCl_3$, $ZrCl_4$, $CdI_2$, $BaI_2$, $HoI_3$, $PbI_2$, $PdF_2$, LiF, $EuCl_3$, $MgCl_2$, $ErCl_3$, $MgCl_2$, $ErCl_3$, $MgCl_2$, $BiCl_4$, $AlCl_3$, $CaBr_2$, $SmBr_3$, $VaF_3$, $LaCl_3$, $GdI_3$, $CrI_2$, $MnI_2$, $YbBr_3$, $FeBr_2$, $NiCl_2$, AgCl, $ZnCl_2$, $YbCl_2$, $SeF_4$, $SnCl_4$, $SnF_4$, $SbI_3$, $BiI_2$, $EuF_3$, and $PbCl_2$.

285. A cell according to claim 274, wherein said gaseous catalyst comprises at least one ion selected from the group consisting of $Mo^{2+}$, $Ti^{2+}$, and $Rb^+$.

286. A cell according to claim 274, wherein said gaseous catalyst comprises at least one pair of ions selected from the group consisting of: $(Sn^{4+}, Si^{4+})$, $(Pr^{3+}, Ca^{2+})$, $(Sr^{2+}, Cr^{2+})$, $(Cr^{3+}, Tb^{3+})$, $(Sb^{3+}, Co^{2+})$, $(Bi^{3+}, Ni^{2+})$, $(Pd^{2+}, In^+)$, $(La^{3+}, Dy^{3+}, Ho^{3+})$, $(K^+, K^+)$, $(V^{3+}, Pd^{2+})$, $(Lu^{3+}, Zn^{2+})$, $(As^{3+}, Ho^{3+})$, $(Mo^{5+}, Sn^{4+})$, $(Sb^{3+}, Cd^{2+})$, $(Ag^{2+}, Ag^+)$, $(La^{3+}, Er^{3+})$, $(V^{4+}, B^{3+})$, $(Fe^{3+}, Ti^{3+})$, $(Co^{2+}, Ti^+)$, $(Bi^{3+}, Zn^{2+})$, $(As^{3+}, Dy^{3+})$, $(Ho^{3+}, Mg^{2+})$, $(K^+, Rb^+)$, $(Cr^{3+}, Pr^{3+})$, $(Sr^{2+}, Fe^{2+})$, $(Ni^{2+}, Cu^+)$, $(Sr^{2+}, Mo^{2+})$, $(Y^{3+}, Zr^{4+})$, $(Cd^{2+}, Ba^{2+})$, ($Ho^{3+}$, $Pb^{2+}$), ($Pb^{2+}$, $Li^+$), ($Eu^{3+}$, $Mg^{2+}$), ($Er^{3+}$, $Mg^{2+}$), ($Bi^{4+}$, $Al^{3+}$), ($Ca^{2+}$, $Sm^{3+}$), ($V^{3+}$, $La^{3+}$), ($Gd^{3+}$, $Cr^{2+}$), ($Mn^{2+}$, $Ti^+$), ($Yb^{3+}$, $Fe^{2+}$), ($Ni^{2+}$, $Ag^+$), ($Zn^{2+}$, $Yb^{2+}$), ($Se^{4+}Sn^{4+}$), ($Sb^{3+}$, $Bi^{2+}$), and ($Eu^{3+}$, $Pb^{2+}$).

287. A cell according to claim 274, wherein said source of gaseous catalyst comprises a salt of one or more cations and at least one anion selected from the group consisting of halides, sulfates, phosphates, carbonates, hydroxide and sulfides.

288. A cell according to claim 274, wherein said gaseous catalyst comprises hydrogen atoms having a binding energy of about $E_b = 13.6/n^2$ eV, where n is a fraction whose numerator is 1 and denominator is an integer greater than 1.

289. A cell according to claim 274, wherein said gaseous catalyst comprises potassium and has a net enthalpy of reaction of 27.28 eV.

290. A cell according to claim 274, wherein said gaseous catalyst has a net enthalpy of reaction of about 27.2 eV.

291. A cell according to claim 274, wherein said cell comprises said source of said gaseous catalyst combined with at least one of a hydrocarbon or water disposed such that said gaseous catalyst and said gaseous hydrogen atoms are capable being formed during combustion.

292. A cell according to claim 274, further comprising a means for converting said source of catalyst to said gaseous catalyst.

293. A cell according to claim 292, wherein said means for converting said source of catalyst to said gaseous catalyst comprises at least one of heat, electron-beam energy, photon energy, acoustic energy, electric field, or magnetic field.

294. A cell according to claim 274, further comprising a filament coated with said source of gaseous catalyst.

295. A cell according to claim 274, wherein said source of gaseous hydrogen atoms is selected from the group consisting of hydrogen gas, water, hydrides, metal-hydrogen solutions, and hydrocarbons.

296. A cell according to claim 274, wherein said source of hydrogen atoms comprises a hot filament and a hydrogen containing gas stream.

297. A cell according to claim 274, wherein said source of hydrogen atoms comprises a hot grid and a hydrogen containing gas stream.

298. A cell according to claim 274, wherein said source of hydrogen atoms comprises a heated tungsten capillary and a hydrogen containing gas stream.

299. A cell according to claim 274, wherein said source of hydrogen atoms comprises a hydride maintained under nonequilibrium conditions.

300. A cell according to claim 274, wherein said source of hydrogen atoms comprises an inductively coupled plasma flow tube and a hydrogen gas containing stream.

301. A cell according to claim 274, wherein said source of hydrogen atoms comprises a hydrogen containing gas stream and a second catalyst for disassociating said hydrogen containing gas stream into free hydrogen atoms.

302. A cell according to claim 274, wherein said source of hydrogen atoms comprises an internal combustion engine.

303. A cell according to claim 301, wherein said second catalyst comprises at least one element selected from the group consisting of transition elements, inner transition elements, precious metals, refractory metals, lanthanides, actinides, and activated charcoal.

304. A cell according to claim 301, wherein said second catalyst comprises at least one selected from the group consisting of an element, compound, alloy or mixture of transition elements, inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal, and intercalated Cs carbon.

305. A cell according to claim 301, wherein said second catalyst is treated with an aqueous solution of $K_2CO_3$ and $H_2O_2$.

306. A cell according to claim 301, further comprising a heater to heat said second catalyst.

307. A cell according to claim 301, further comprising a filament or grid constructed and arranged to dissociate hydrogen and to heat said second catalyst.

308. A cell according to claim 301, further comprising means for controlling the power output of said cell.

309. A cell according to claim 308, wherein said means for controlling the power output of said cell comprises means for controlling the temperature of said second catalyst.

310. A cell according to claim 309, wherein said means for controlling the temperature of said second catalyst comprises a filament or grid.

311. A cell according to claim 301, further comprising a temperature controlling structure capable of maintaining a selected atomic hydrogen partial pressure by controlling the temperature of said second catalyst.

312. A cell according to claim 311, wherein said temperature controlling structure is at least one selected from the group consisting of an internal heater, an external heater, the catalysis of hydrogen, and a heat exchanger which removes energy from the cell.

313. A cell according to claim 274, wherein said source of hydrogen atoms comprises a means for pyrolysis of hydrocarbons or water.

314. A cell according to claim 274, further comprising means to reform hydrocarbons to at least one of gaseous molecular and gaseous atomic hydrogen.

315. A cell according to claim 274, further comprising a source of UV light for disassociating hydrogen containing molecules to form said gaseous hydrogen atoms.

316. A cell according to claim 274, further comprising a flow control means for controlling the flow of said source of gaseous hydrogen atoms or said gaseous hydrogen atoms from said chamber to said reaction vessel.

317. A cell according to claim 316, wherein said flow control means comprises a valve.

318. A cell according to claim 274, further comprising a flow control means for controlling the flow of hydrogen from said reaction vessel.

319. A cell according to claim 318, wherein said flow control means comprises a valve.

320. A cell according to claim 274, further comprising a vacuum pump constructed and arranged for controlling the flow of hydrogen from said reaction vessel.

321. A cell according to claim 274, further comprising a flow control means for controlling the flow of said gaseous catalyst or a source of gaseous catalyst from said catalyst reservoir to said reaction vessel.

322. A cell according to claim 321, wherein said flow control means comprises a valve.

323. A cell according claim 274, further comprising means for controlling the flow of catalyst from said reaction vessel.

324. A cell according to claim 274, further comprising a valve constructed and arranged for controlling the flow of said catalyst from said reaction vessel.

325. A cell according to claim 274, further comprising a vacuum pump constructed and arranged for controlling the flow of said gaseous catalyst or source of gaseous catalyst from said reaction vessel.

326. A cell according to claim 274, further comprising a nonreactive gas.

327. A cell according to claim 274, further comprising a means for controlling the amount of a nonreactive gas in said vessel.

328. A cell according to claim 274, further comprising flow control means for controlling the flow of a nonreactive gas into said reaction vessel.

329. A cell according to claim 328, wherein said means for controlling the amount of nonreactive gas in said vessel comprises a valve constructed and arranged to regulate the release of said nonreactive gas from said reaction vessel.

330. A cell according to claim 274, further comprising a valve constructed and arranged for controlling the flow of a nonreactive gas from said reaction vessel.

331. A cell according to claim 274, further comprising a vacuum pump constructed and arranged for controlling the flow of a nonreactive gas from said reaction vessel.

332. A cell according to claim 274, further comprising a pump in communication with said reaction vessel.

333. A cell according to claim 274, further comprising structure for controlling the vapor pressure of said catalyst.

334. A cell according to claim 333, wherein said structure for controlling the vapor pressure of said catalyst comprises a heater constructed and arranged to control the temperature of said catalyst reservoir or said boat.

335. A cell according to claim 333, wherein said structure for controlling the vapor pressure of said catalyst comprises a heater constructed and arranged to control the temperature of said reaction chamber.

336. A cell according to claim 274, further comprising structure for maintaining a selected vapor pressure of said gaseous catalyst.

337. A cell according to claim 336, wherein said structure for maintaining a selected vapor pressure of said gaseous catalyst comprises a valve constructed and arranged for controlling the flow of said source of gaseous catalyst or gaseous catalyst from said catalyst reservoir and a valve constructed and arranged for controlling the flow of said source of gaseous catalyst or gaseous catalyst from said reaction vessel.

338. A cell according to claim 336, wherein said structure for maintaining a selected vapor pressure of said source of gaseous catalyst or said gaseous catalyst comprises a valve constructed and arranged for controlling the flow of said source of gaseous catalyst or gaseous catalyst from said reaction vessel.

339. A cell according to claim 274, further comprising a valve for releasing hydrogen atoms having a binding energy of about $E_b=13.6/n^2$ eV, where n is a fraction whose numerator is 1 and denominator is an integer greater than 1 or a compound containing said hydrogen atoms.

340. A cell according to claim 274, further comprising means for adsorbing energy released from said hydrogen atom.

341. A cell according to claim 274, wherein said vessel comprises an internal combustion chamber.

342. A cell according to claim 341, wherein said internal combustion chamber is an engine cylinder.

343. A cell according to claim 274, further comprising means for controlling the power output of said cell.

344. A cell according to claim 343, wherein said means for controlling the power output of said cell comprises means for controlling the amount of said gaseous catalyst.

345. A cell according to claim 344, wherein said means for controlling the amount of gaseous catalyst comprises means for controlling the temperature of said vessel and said gaseous catalyst is selected to have a vapor pressure dependent upon the temperature of said reaction vessel.

346. A cell according to claim 344, wherein said means for controlling the amount of gaseous catalyst comprises means for controlling the temperature of said catalyst reservoir and said gaseous catalyst is selected to have a vapor pressure dependent upon the temperature of said catalyst reservoir.

347. A cell according to claim 344, wherein said means for controlling the amount of gaseous catalyst comprises means for controlling the temperature of said boat and said gaseous catalyst is selected to have a vapor pressure dependent upon the temperature of said boat.

348. A cell according to claim 344, wherein said means for controlling the amount of gaseous catalyst comprises means for controlling the flow of said source of gaseous catalyst or gaseous catalyst from said catalyst reservoir into said reaction vessel.

349. A cell according to claim 344, wherein said means for controlling the amount of gaseous catalyst comprises means for controlling the flow of said source of gaseous catalyst or gaseous catalyst from said catalyst reservoir from said reaction vessel.

350. A cell according to claim 343, wherein said means for controlling the power output of said cell comprises means for controlling the amount of said gaseous hydrogen atoms or said source of gaseous hydrogen atoms in said vessel.

351. A cell according to claim 350, wherein said means for controlling the amount of said gaseous hydrogen atoms or said source of gaseous hydrogen atoms comprises means for controlling the flow of gaseous hydrogen atoms or source of said hydrogen atoms into said vessel.

352. A cell according to claim 350, wherein said means for controlling the amount of said gaseous hydrogen atoms or said source of gaseous hydrogen atoms comprises means for controlling the flow of gaseous hydrogen atoms or source of said hydrogen atoms from said vessel.

353. A cell according to claim 343, wherein said means for controlling the power output of said cell comprises controlling the amount of said nonreactive gas present in said reaction vessel.

354. A cell according to claim 353, wherein said means for controlling the amount of nonreactive gas comprises means for controlling the flow of said nonreactive gas into said reaction vessel.

355. A cell according to claim 354, wherein said means for controlling the amount of nonreactive gas comprises means for controlling the flow of said nonreactive gas from said reaction vessel.

356. A cell according to claim 343, wherein said means for controlling the power output of said cell comprises means for controlling the temperature of said source of catalyst.

357. A cell according to claim 343, wherein said means for controlling the power output of said cell comprises means for controlling the flow of a hydrogen containing gas over at least one of a hot filament, a tungsten capillary heated by electron bombardment, or an inductively coupled plasma flow.

358. A cell according to claim 343, wherein said means for controlling the power output of said cell comprises means for controlling the power dissipated in an inductively coupled plasma flow tube.

359. A cell according to claim 343, wherein said means for controlling the power output of said cell comprises means for controlling the temperature of a hot filament or tungsten capillary heated by electron bombardment over which a hydrogen containing gas flows.

360. A cell according to claim 343, wherein said means for controlling the power output of said cell comprises means for controlling the temperature of a hydride maintained under nonequilibrium conditions.

361. A cell according to claim 274, further comprising means for measuring the temperature of said catalyst reservoir or said boat.

362. A cell according to claim 274, further comprising a means for measuring the temperature of said source of said gaseous catalyst contained in said catalyst reservoir or said boat.

363. A cell according to claim 274, further comprising means for measuring the temperature of said reaction vessel.

364. A cell according to claim 274, further comprising means for measuring the temperature of said source of said gaseous hydrogen atoms.

365. A cell according to claim 301, further comprising means for measuring the temperature said second catalyst.

366. A cell according to claim 274, further comprising means to measure the cell temperature.

367. A cell according to claim 274, further comprising temperature controlling structure constructed and arranged to maintain a temperature in said reaction vessel greater than a temperature in said catalyst reservoir.

368. A cell according to claim 274, further comprising temperature controlling structure constructed and arranged to maintain a temperature in said reaction vessel greater than a temperature in said boat.

369. A cell according to claim 274, further comprising temperature controlling structure for maintaining a selected temperature of said reaction vessel.

370. A cell according to claim 274, further comprising a nebulizer or atomizer.

371. A cell according to claim 274, further comprising means to measure the pressure in said reaction vessel.

372. A cell according to claim 274, further comprising means to measure the hydrogen pressure in said reaction vessel.

373. A cell according to claim 274, further comprising means to measure the gaseous catalyst pressure in said reaction vessel.

374. A cell according to claim 274, wherein said vessel is capable of containing a pressure within the range of $10^{-3}$ atmospheres to 100 atmospheres.

375. A method for extracting energy from hydrogen atoms comprising the steps of:
  volatizing a source of gaseous catalyst to form a gaseous catalyst having a net enthalpy of reaction of about $27*(p/2)$ eV, where p is an integer greater than 1;
  providing gaseous hydrogen atoms; and
  reacting said gaseous catalyst with said gaseous hydrogen atoms, thereby releasing energy from said gaseous hydrogen atoms and producing hydrogen atoms having a binding energy of about $E_b=13.6/n^2$ eV, where n is a fraction whose numerator is 1 and a denominator is an integer greater than 1.

376. A method according to claim 375, wherein said source of gaseous catalyst comprises an ionic compound which is resistant to hydrogen reduction.

377. A method according to claim 375, wherein said source of gaseous catalyst comprises an ionic compound which is resistant to hydrogen reduction and which is adapted to sublime, boil or become volatile when heated.

378. A method according to claim 375, wherein said source of gaseous catalyst comprises an ionic compound which is adapted to sublime, boil or become volatile when heated.

379. A method according to claim 375, wherein said source of gaseous catalyst comprises an ionic compound which is resistant to thermal degradation.

380. A method according to claim 375, wherein said source of gaseous catalyst comprises a salt of rubidium or potassium.

381. A method according to claim 375, wherein said source of gaseous catalyst comprises a salt that can form a vapor comprising ions when heated.

382. A method according to claim 375, wherein said source of gaseous catalyst comprises a salt of rubidium selected from the group consisting of RbF, RbCl, RbBr, Rbl, $Rb_2S_2$, RbOH, $Rb_2SO_4$, $Rb_2CO_3$, and $Rb_3PO_4$.

383. A method according to claim 375, wherein said source of gaseous catalyst comprises a salt of potassium selected from the group consisting of KF, KCl, KBr, Kl, $K_2S_2$, KOH, $K_2SO_4$, $K_2CO_3$, $K_3PO_4$, and $K_2GeF_4$.

384. A method according to claim 375, wherein said source of gaseous catalyst comprises at least one metal selected from the group consisting of Mo, Ti, and Rb.

385. A method according to claim 375, wherein said source of gaseous catalyst comprises at least one salt selected from the group consisting of $MoI_2$, $TiCl_2$, $TiCl_4$, $SnCl_4$, $SiCl_4$, $PrBr_3$, $CaBr_2$, $SrCl_2$, $CrI_2$, $TbI_3$, $SbCl_3$, $CrF_3$, $CoCl_2$, $BiCl_3$, $NiCl_2$, $PdF_2$, $InCl$, $LaCl_3$, $DyCl_3$, $LaI_3$, $HoI_3$, $KNO_3$, $VF_3$, $PbF_2$, $VOCl$, $PbI_2$, $LuCl_3$, $PbCl_2$, $AsI_3$, $HoI_3$, $MoCl_5$, $SnCl_4$, $SbI_3$, $CdI_2$, $AgF_2$, $AgF$, $LaI_3$, $ErI_3$, $VCl_4$, $BCl_3$, $FeCl_3$, $TiCl_3$, $CoI_2$, $CoF_2$, $TlI$, $TlF$, $BiBr_3$, $ZnBr_2$, $AsI_3$, $DyI_3$, $HoCl_3$, $MgCl_2$, $CrCl_3$, $PrCl_3$, $SrCl_2$, $FeCl_2$, $NiCl_2$, $CuCl$, $SrCl_2$, $MoCl_2$, $YCl_3$, $ZrCl_4$, $CdI_2$, $BaI_2$, $HoI_3$, $PbI_2$, $PdF_2$, $LiF$, $EuCl_3$, $MgCl_2$, $ErCl_3$, $MgCl_2$, $ErCl_3$, $MgCl_2$, $BiCl_4$, $AlCl_3$, $CaBr_2$, $SmBr_3$, $VaF_3$, $LaCl_3$, $GdI_3$, $CrI_2$, $MnI_2$, $YbBr_3$, $FeBr_2$, $NiCl_2$, $AgCl$, $ZnCl_2$, $YbCl_2$, $SeF_4$, $SnCl_4$, $SnF_4$, $SbI_3$, $BiI_2$, $EuF_3$, and $PbCl_2$.

386. A method according to claim 375, wherein said gaseous catalyst comprises at least one ion selected from the group consisting of $Mo^{2+}$, $Ti^{2+}$, and $Rb^+$.

387. A method according to claim 375, wherein said gaseous catalyst comprises at least one pair of ions selected from the group consisting of: $(Sn^{4+}, Si^{4+})$, $(Pr^{3+}, Ca^{2+})$, $(Sr^{2+}, Cr^{2+})$, $(Cr^{3+}, Tb^{3+})$, $(Sb^{3+}, Co^{2+})$, $(Bi^{3+}, Ni^{2+})$, $(Pd^{2+}, In^+)$, $(La^{3+}, Dy^{3+})$, $(La^{3+}, Ho^{3+})$, $(K^+, K^+)$, $(V^{3+}, Pd^{2+})$, $(Lu^{3+}, Zn^{2+})$, $(As^{3+}, Ho^{3+})$, $(Mo^{5+}, Sn^{4+})$, $(Sb^{3+}, Cd^{2+})$, $(Ag^{2+}, Ag^+)$, $(La^{3+}, Er^{3+})$, $(V^{4+}, B^{3+})$, $(Fe^{3+}, Ti^{3+})$, $(Co^{2+}, Ti^+)$, $(Bi^{3+}, Zn^{2+})$, $(As^{3+}, Dy^{3+})$, $(Ho^{3+}, Mg^{2+})$, $(K^+, Rb^+)$, $(Cr^{3+}, Pr^{3+})$, $(Sr^{2+}, Fe^{2+})$, $(Ni^{2+}, Cu^+)$, $(Sr^{2+}, Mo^{2+})$, $(Y^{3+}, Zr^{4+})$, $(Cd^{2+}, Ba^{2+})$, $(Ho^{3+}, Pb^{2+})$, $(Pb^{2+}, Li^+)$, $(Eu^{3+}, Mg^{2+})$, $(Er^{3+}, Mg^{2+})$, $(Bi^{4+}, Al^{3+})$, $(Ca^{2+}, Sm^{3+})$, $(V^{3+}, La^{3+})$, $(Gd^{3+}, Cr^{2+})$, $(Mn^{2+}, Ti^+)$, $(Yb^{3+}, Fe^{2+})$, $(Ni^{2+}, Ag^+)$, $(Zn^{2+}, Yb^{2+})$, $(Se^{4+}, Sn^{4+})$, $(Sb^{3+}, Bi^{2+})$, and $(Eu^{3+}, Pb^{2+})$.

388. A method according to claim 375, wherein said source of gaseous catalyst comprises a salt of one or more cations and at least one anion selected from the group consisting of halides, sulfates, phosphates, carbonates, hydroxide and sulfides.

389. A method according to claim 375, wherein said gaseous catalyst comprises hydrogen atoms having a binding energy of about $E_b=13.6/n^2$ eV, where n is a fraction whose numerator is 1 and denominator is an integer greater than 1.

390. A method according to claim 375, wherein said catalyst is selected to have a resonant adsorption with the energy released from said gaseous hydrogen atoms undergoing a transition to a lower energy state.

391. A method according to claim 375, wherein said gaseous catalyst comprises potassium and has a net enthalpy of reaction of 27.28 eV.

392. A method according to claim 375, wherein said gaseous catalyst has a net enthalpy of reaction of about 27.2 eV.

393. A method according to claim 375, further comprising the step of combining a source of gaseous catalyst with a source of gaseous hydrogen atoms comprising at least one of a hydrocarbon or water, and providing combustion which volatizes said source of gaseous catalyst to form said gaseous catalyst and provide said gaseous hydrogen atoms.

394. A method according to claim 375, further comprising the step of forming said source of gaseous catalyst or said gaseous catalyst in situ.

395. A method according to claim 344, wherein said step of forming said source of gaseous catalyst or said gaseous catalyst in situ comprises the ionization of a reactant.

396. A method according to claim 345, wherein said step of ionization comprises thermal ionization of said reactant.

397. A method according to claim 395, wherein said step of ionization comprises chemical ionization of said reactant.

398. A method according to claim 397, wherein said step of chemical ionization comprises oxidation or reduction of said reactant.

399. A method according to claim 375, wherein said step of volatizing said source of catalyst to form said gaseous catalyst utilizes energy from at least one of heat, electron-beam energy, photon energy, acoustic energy, electric field, or magnetic field.

400. A method according to claim 375, wherein said step of volatizing said source of catalyst comprises the step of heating a filament coated with said source of said gaseous catalyst.

401. A method according to claim 375, wherein said step of volatizing said source of gaseous catalyst to form said gaseous catalyst comprises the steps of volatizing said material to form gaseous atoms and ionizing said gaseous atoms to form ions.

402. A method according to claim 375, further comprising adding a source of catalyst to said reaction vessel and heating said source of catalyst to form said gaseous catalyst.

403. A method according to claim 375, wherein said source of catalyst is provided in a catalyst reservoir comprising a container separate from said reaction vessel and said container communicates with said reaction vessel.

404. A method according to claim 375, wherein said source of catalyst is provided in a boat contained within said reaction vessel.

405. A method according to claim 375, wherein said step of providing hydrogen atoms comprises the steps of disassociating a hydrogen containing compound into hydrogen atoms.

406. A method according to claim 375, wherein said step of providing hydrogen atoms comprises the steps of passing a hydrogen containing gas over a hot filament.

407. A method according to claim 375, wherein said step of providing hydrogen atoms comprises the steps of passing a hydrogen containing gas over a hot grid.

408. A method according to claim 375, wherein said step of providing hydrogen atoms comprises the steps of passing a hydrogen containing gas through a tungsten capillary heated by electron bombardment.

409. A method according to claim 375, wherein said step of providing hydrogen atoms comprises the steps of maintaining a hydride under nonequilibrium conditions.

410. A method according to claim 375, wherein said step of providing hydrogen atoms comprises the steps of passing a hydrogen containing gas through an inductively coupled plasma flow tube.

411. A method according to claim 375, wherein said step of providing hydrogen atoms comprises the steps of contacting a hydrogen containing gas with a second catalyst for disassociating said hydrogen containing gas into free hydrogen atoms.

412. A method according to claim 411, wherein said second catalyst comprises at least one element selected from the group consisting of transition elements, inner transition elements, precious metals, refractory metals, lanthanides, actinides and activated charcoal.

413. A method according to claim 411, wherein said second catalyst is selected from the group consisting of an element, compound, alloy or mixture of transition elements, inner transition elements, iron, platinum, palladium, zirconium, vanadium, nickel, titanium, Sc, Cr, Mn, Co, Cu, Zn, Y, Nb, Mo, Tc, Ru, Rh, Ag, Cd, La, Hf, Ta, W, Re, Os, Ir, Au, Hg, Ce, Pr, Nd, Pm, Sm, Eu, Gd, Tb, Dy, Ho, Er, Tm, Vb, Lu, Th, Pa, U, activated charcoal, and intercalated Cs carbon.

414. A method according to claim 411, further comprising the step of utilizing a hot filament or hot grid to disassociate a hydrogen containing gas into gaseous hydrogen atoms and to heat said second catalyst.

415. A method according to claim 411, further comprising the step of controlling the power output of said cell.

416. A method according to claim 415, wherein said step of controlling the power output of said cell comprises controlling the temperature of said second catalyst.

417. A method according to claim 416, wherein said step of controlling the temperature of said second catalyst comprises utilizing a heated filament or grid.

418. A method according to claim 375, wherein said source of gaseous hydrogen atoms is selected from the group consisting of hydrogen gas, water, hydrides, metal-hydrogen solutions, and hydrocarbons.

419. A method according to claim 375, wherein said step of providing gaseous hydrogen atoms comprises pyrolyzing hydrocarbons or water.

420. A method according to claim 375, further comprising the step of reforming hydrocarbons to at least one of gaseous molecular and gaseous atomic hydrogen.

421. A method according to claim 375, further comprising the step of disassociating hydrogen containing molecules using UV light to form said gaseous hydrogen atoms.

422. A method according to claim 375, further comprising the step of controlling the amount of gaseous hydrogen provided in said reaction vessel.

423. A method according to claim 375, further comprising the step of controlling the flow of a source of gaseous hydrogen atoms or said gaseous hydrogen atoms from a chamber to said reaction vessel.

424. A method according to claim 375, further comprising the step of utilizing a valve for controlling the flow of gaseous hydrogen or source of gaseous hydrogen from said reaction vessel.

425. A method according to claim 375, further comprising the step of controlling the flow of gaseous hydrogen or source of gaseous hydrogen from said reaction vessel.

426. A method according to claim 375, further comprising the step of utilizing a vacuum pump for controlling the flow of gaseous hydrogen or source of gaseous hydrogen from said reaction vessel.

427. A method according to claim 375, further comprising the step of utilizing a valve for controlling the flow of gaseous hydrogen or source of gaseous hydrogen from a chamber into said reaction vessel.

428. A method according to claim 375, further comprising controlling the partial pressure of said gaseous hydrogen atoms.

429. A method according to claim 375, wherein a partial pressure of said gaseous hydrogen atoms or source of gaseous hydrogen atoms in said reaction vessel is maintained within the range of $10^{-3}$ atmospheres to 100 atmospheres.

430. A method according to claim 375, further comprising controlling the amount of gaseous catalyst or source of gaseous catalyst introduced into said reaction vessel.

431. A method according to claim 375, further comprising controlling the flow of gaseous catalyst or source of gaseous catalyst from a catalyst reservoir containing gaseous catalyst or a source of gaseous catalyst to said reaction vessel.

432. A method according to claim 375, further comprising controlling the flow of gaseous catalyst or source of gaseous catalyst from a boat containing gaseous catalyst or a source of gaseous catalyst.

433. A method according to claim 375, further comprising the step of controlling the flow of said gaseous catalyst or said source of gaseous catalyst from said reaction vessel.

434. A method according to claim 375, further comprising the step of controlling the vapor pressure of said gaseous catalyst or source of gaseous catalyst in said reaction vessel.

435. A method according to claim 375, wherein a vapor pressure of said gaseous catalyst or said source of gaseous catalyst is maintained at about 50 to 210 millitorr.

436. A method according to claim 375, further comprising using a vacuum pump to control the flow of said catalyst or said source of gaseous catalyst from said reaction vessel.

437. A method according to claim 375, further comprising using a valve to control the flow of said source of gaseous catalyst or said catalyst from a catalyst reservoir into said reaction vessel.

438. A method according to claim 375, further comprising using a valve to control the flow of said source of gaseous catalyst or said catalyst from said reaction vessel.

439. A method according to claim 375, further comprising the step of supplying a nonreactive gas to said reaction vessel.

440. A method according to claim 375, further comprising the step of controlling the vapor pressure of said nonreactive gas in said reaction vessel.

441. A method according to claim 440, further comprising the step of controlling the flow of said nonreactive gas supplied to said reaction vessel.

442. A method according to claim 440, further comprising the step of controlling the amount of said nonreactive gas released from said reaction vessel.

443. A method according to claim 440, further comprising utilizing a vacuum pump for controlling the flow of said nonreactive gas from said reaction vessel.

444. A method according to claim 440, further comprising the step of utilizing a valve for controlling the flow of said nonreactive gas from said reaction vessel.

445. A method according to claim 440, further comprising the step of utilizing a valve for controlling the flow of said nonreactive gas into said reaction vessel.

446. A method according to claim 375, further comprising the step of controlling the vapor pressure of said gaseous catalyst in said reaction vessel.

447. A method according to claim 446, wherein said step of controlling the vapor pressure of said gaseous catalyst comprises controlling the temperature in a catalyst reservoir containing a source of gaseous catalyst or said gaseous catalyst and being in communication with said reaction vessel, and controlling the flow of gaseous catalyst from said catalyst reservoir.

448. A method according to claim 446, wherein said step of controlling the vapor pressure of said gaseous catalyst comprises controlling the temperature in a boat containing a source of gaseous catalyst or said gaseous catalyst and being contained in said reaction vessel, and controlling the flow of gaseous catalyst from said boat.

449. A method according to claim 375, further comprising the step of controlling the temperature in a catalyst reservoir containing a source of gaseous catalyst or said gaseous catalyst and being in communication with said reaction vessel.

450. A method according to claim 375, further comprising the step of controlling the temperature in a boat containing a source of gaseous catalyst or said gaseous catalyst and being contained in said reaction vessel.

451. A method according to claim 375, wherein the reaction to provide a net enthalpy of about 27 (p/2) eV, where p is a positive integer greater than 1, comprises an electrochemical, chemical, photochemical, thermal, free radical, sonic, nuclear, inelastic photon, or particle scattering reaction, or mixtures thereof.

452. A method according to claim 375, wherein a pressure in said reaction vessel is maintained within the range of $10^{-3}$ atmospheres to 100 atmospheres.

453. A method according to claim 375, wherein said reaction occurring at a pressure less than atmospheric pressure.

454. A method according to claim 375, further comprising the step of releasing hydrogen atoms from said reaction vessel having a binding energy of about $E_b = 13.6/n^2$ eV, where n is a fraction whose numerator is 1 and denominator is an integer greater than 1 or a compound containing said hydrogen atoms.

455. A method according to claim 375, further comprising the step of adsorbing said released energy.

456. A method according to claim 375, further comprising the step of converting energy released from said hydrogen atom into electrical energy.

457. A method according to claim 375, wherein said reaction step is conducted in an internal combustion chamber.

458. A method according to claim 457, wherein said internal combustion chamber is an engine cylinder.

459. A method according to claim 375, further comprising the step of controlling the power output of said cell.

460. A method according to claim 459, wherein said step of controlling the power output of said cell comprises controlling the amount of said gaseous catalyst present in said reaction vessel.

461. A method according to claim 460, wherein said step of controlling the amount of gaseous catalyst comprises controlling the temperature of said reaction vessel and selecting said gaseous catalyst to have a vapor pressure dependent upon the temperature of said reaction vessel.

462. A method according to claim 460, wherein said step of controlling the amount of gaseous catalyst comprises controlling the temperature of a catalyst reservoir containing a source of gaseous catalyst or said gaseous and being in communication with said reaction vessel, and selecting said gaseous catalyst to have a vapor pressure dependent upon the temperature of said catalyst reservoir.

463. A method according to claim 460, wherein said step of controlling the amount of gaseous catalyst comprises controlling the flow of said source of gaseous catalyst or gaseous catalyst from said catalyst reservoir into said reaction vessel.

464. A method according to claim 460, wherein said step of controlling the amount of gaseous catalyst comprises controlling the flow of said source of gaseous catalyst or gaseous catalyst from said reaction vessel.

465. A method according to claim 460, wherein said step of controlling the amount of gaseous catalyst comprises controlling the temperature of a boat containing a source of gaseous catalyst or said gaseous and being contained in said reaction vessel, and selecting said gaseous catalyst to have a vapor pressure dependent upon the temperature of said boat.

466. A method according to claim 459, wherein said step of controlling the power output of said cell comprises controlling the amount of said gaseous hydrogen atoms or source of gaseous hydrogen atoms present in said reaction vessel.

467. A method according to claim 466, wherein said step of controlling the amount of said gaseous hydrogen atoms or source of gaseous hydrogen atoms comprises controlling the flow of gaseous hydrogen atoms or source of gaseous hydrogen atoms into said reaction vessel.

468. A method according to claim 466, wherein said step of controlling the amount of said source of gaseous hydrogen atoms or gaseous hydrogen atoms comprises controlling the flow of said source of gaseous hydrogen atoms or gaseous hydrogen atoms from said reaction vessel.

469. A method according to claim 466, wherein said step of controlling the amount of said source of gaseous hydrogen atoms or gaseous hydrogen atoms comprises controlling the temperature of a second catalyst for dissociating a hydrogen containing compound into gaseous hydrogen atoms.

470. A method according to claim 469, wherein said step of controlling the temperature of a second catalyst for dissociating a hydrogen containing compound into gaseous hydrogen atoms comprises controlling the power dissipated in a second catalyst heater.

471. A method according to claim 459 wherein said step of controlling the power output of said cell comprises controlling the amount of nonreactive gas in said reaction vessel.

472. A method according to claim 471, wherein said step of controlling the amount of nonreactive gas in said reaction vessel comprises controlling the flow of nonreactive gas into said reaction vessel.

473. A method according to claim 472, wherein said step of controlling the amount of nonreactive gas in said reaction vessel comprises controlling the flow of nonreactive gas from said reaction vessel.

474. A method according to claim 459, wherein said step of controlling the power output of said cell comprises controlling the temperature of a source of gaseous catalyst.

475. A method according to claim 459, wherein said step of controlling the power output of said cell comprises controlling the flow of a hydrogen containing gas over at least one of a hot filament, a tungsten capillary heated by electron bombardment, or an inductively coupled plasma flow.

476. A method according to claim 459, wherein said step of controlling the power output of said cell comprises controlling the power dissipated in an inductively coupled plasma flow tube, hot filament or grid, or tungsten capillary heated by electron bombardment.

477. A method according to claim 459, wherein said step of controlling the power output of said cell comprises controlling the temperature of a hot filament or tungsten capillary heated by electron bombardment over which a hydrogen containing gas flows.

478. A method according to claim 459, wherein said step of controlling the power output of said cell comprises controlling the temperature of a hydride maintained under nonequilibrium conditions.

479. A method according to claim 375, wherein a temperature in said reaction vessel is maintained at a higher temperature than in a catalyst reservoir in communication with said reaction vessel or a boat contained within said reaction vessel.

480. A method according to claim 375, further comprising the step of measuring the temperature of a catalyst reservoir in communication with said reaction vessel or a boat contained in said reaction vessel.

481. A method according to claim 375, further comprising the step of measuring the temperature of a source of said gaseous catalyst contained in a catalyst reservoir in communication with said reaction vessel or a boat contained within said reservoir.

482. A method according to claim 375, further comprising the step of measuring the temperature of a chamber containing a source of said hydrogen atoms in communication with said reaction vessel.

483. A method according to claim 375, further comprising the step of measuring the temperature of a source of said gaseous hydrogen atoms.

484. A method according to claim 411, further comprising the step of measuring the temperature of said second catalyst.

485. A method according to claim 375, further comprising the step of controlling the temperature of said reaction vessel.

486. A method according to claim 375, further comprising utilizing a nebulizer or atomizer to form said gaseous catalyst.

487. A method according to claim 375, further comprising the step of measuring the pressure in said reaction vessel.

488. A method according to claim 375, further comprising the step of controlling the pressure in said reaction vessel.

489. A method according to claim 375, further comprising the step of measuring the hydrogen pressure in said reaction vessel.

490. A method according to claim 375, further comprising the step of measuring the gaseous catalyst pressure in said reaction vessel.

491. A method according to claim 375, further comprising the step of converting energy released from said gaseous hydrogen atoms into electrical energy.

492. A method according to claim 375, further comprising controlling the pressure of said gaseous catalyst by controlling the amount of said source of catalyst being added to said reaction vessel.

493. A cell comprising:
a reaction vessel capable of containing a vacuum or pressures greater than atmospheric;
a source of hydrogen atoms; and
a source of a gaseous catalyst or a gaseous catalyst capable of accepting energy from atomic hydrogen thereby catalyzing a transition of the electron of atomic hydrogen to a state lower than that of uncatalyzed hydrogen.

494. A cell comprising:
a reaction vessel capable of containing a vacuum or pressures greater than atmospheric;
a source of hydrogen atoms; and
a source of a gaseous catalyst or a gaseous catalyst capable of accepting energy from atomic hydrogen thereby catalyzing a transition of the electron of atomic hydrogen to a state lower than that of uncatalyzed hydrogen and releasing energy from said hydrogen atom, wherein said gaseous catalyst comprises hydrogen atoms having a binding energy of about $E_b=13.6/n^2$ eV, where n is a fraction whose numerator is 1 and denominator is an integer greater than 1.

495. A cell comprising:

a reaction vessel capable of containing a vacuum or pressures greater than atmospheric;

a source of hydrogen atoms; and a source of a gaseous catalyst or a gaseous catalyst capable of accepting energy from atomic hydrogen thereby catalyzing a transition of the electron of atomic hydrogen to a state lower than that of uncatalyzed hydrogen and releasing energy from said hydrogen atom, wherein said source of gaseous catalyst comprises at least one salt selected from the group consisting of RbF, RbCl, RbBr, RbI, $Rb_2S_2$, RbOH, $Rb_2SO_4$, $Rb_2CO_3$, $Rb_3PO_4$, KF, KCl, KBr, KI, $K_2S_2$, KOH, $K_2SO_4$, $K_2CO_3$, $K_3PO_4$, and $K_2GeF_4$.

496. A cell comprising:

a reaction vessel capable of containing a vacuum or pressures greater than atmospheric;

a source of hydrogen atoms; and a source of a gaseous catalyst or a gaseous catalyst capable of accepting energy from atomic hydrogen thereby catalyzing a transition of the electron of atomic hydrogen to a state lower than that of uncatalyzed hydrogen and releasing energy from said hydrogen atom, wherein said gaseous catalyst comprises at least one ion selected from the group consisting of $Mo^{2+}$, $Ti^{2+}$, and $Rb^+$.

497. A cell comprising:

a reaction vessel capable of containing a vacuum or pressures greater than atmospheric;

a source of hydrogen atoms; and a source of a gaseous catalyst or a gaseous catalyst capable of accepting energy from atomic hydrogen thereby catalyzing a transition of the electron of atomic hydrogen to a state lower than that of uncatalyzed hydrogen and releasing energy from said hydrogen atom, wherein said source of gaseous catalyst comprises at least one metal selected from the group consisting of Mo, Ti, and Rb.

498. A cell comprising:

a reaction vessel capable of containing a vacuum or pressures greater than atmospheric;

a source of hydrogen atoms; and a source of a gaseous catalyst or a gaseous catalyst capable of accepting energy from atomic hydrogen thereby catalyzing a transition of the electron of atomic hydrogen to a state lower than that of uncatalyzed hydrogen and releasing energy from said hydrogen atom, wherein said source of gaseous catalyst comprises at least one salt selected from the group consisting of $MoI_2$, $TiCl_2$, $TiCl_4$, $SnCl_4$, $SiCl_4$, $PrBr_3$, $CaBr_2$, $SrCl_2$, $CrI_2$, $TbI_3$, $SbCl_3$, $CrF_3$, $CoCl_2$, $BiCl_3$, $NiCl_2$, $PdF_2$, InCl, $LaCl_3$, $DyCl_3$, $LaI_3$, $HoI_3$, $KNO_3$, $VF_3$, $PbF_2$, VOCl, $PbI_2$, $LuCl_3$, $PbCl_2$, $AsI_3$, $HoI_3$, $MoCl_5$, $SnCl_4$, $SbI_3$, $CdI_2$, $AgF_2$, AgF, $LaI_3$, $ErI_3$, $VCl_4$, $BCl_3$, $FeCl_3$, $TiCl_3$, $CoI_2$, $CoF_2$, TlI, TlF, $BiBr_3$, $ZnBr_2$, $AsI_3$, $DyI_3$, $HoCl_3$, $MgCl_2$, $CrCl_3$, $PrCl_3$, $SrCl_2$, $FeCl_2$, $NiCl_2$, CuCl, $SrCl_2$, $MoCl_2$, $YCl_3$, $ZrCl_4$, $CdI_2$, $BaI_2$, $HoI_3$, $PbI_2$, $PdF_2$, LiF, $EuCl_3$, $MgCl_2$, $ErCl_3$, $MgCl_2$, $ErCl_3$, $MgCl_2$, $BiCl_4$, $AlCl_3$, $CaBr_2$, $SmBr_3$, $VaF_3$, $LaCl_3$, $GdI_3$, $CrI_2$, $MnI_2$, $YbBr_3$, $FeBr_2$, $NiCl_2$, AgCl, $ZnCl_2$, $YbCl_2$, $SeF_4$, $SnCl_4$, $SnF_4$, $SbI_3$, $BiI_2$, $EuF_3$, and $PbCl_2$.

499. A cell comprising:

a reaction vessel capable of containing a vacuum or pressures greater than atmospheric;

a source of hydrogen atoms; and a source of a gaseous catalyst or a gaseous catalyst capable of accepting energy from atomic hydrogen thereby catalyzing a transition of the electron of atomic hydrogen to a state lower than that of uncatalyzed hydrogen and releasing energy from said hydrogen atom, wherein said gaseous catalyst comprises at least one pair of ions selected from the group consisting of: $(Sn^{4+}, Si^{4+})$, $(Pr^{3+}, Ca^{2+})$, $(Sr^{2+}, Cr^{2+})$, $(Cr^{3+}, Tb^{3+})$, $(Sb^{3+}, Co^{2+})$, $(Bi^{3+}, Ni^{2+})$, $(Pd^{2+}, In^+)$, $(La^{3+}, Dy^{3+})$, $(La^{3+}, Ho^{3+})$, $(K^+, K^+)$, $(V^{3+}, Pd^{2+})$, $(Lu^{3+}, Zn^{2+})$, $(As^{3+}, Ho^{3+})$, $(Mo^{5+}, Sn^{4+})$, $(Sb^{3+}, Cd^{2+})$, $(Ag^{2+}, Ag^+)$, $(La^{3+}, Er^{3+})$, $(V^{4+}, B^{3+})$, $(Fe^{3+}, Ti^{3+})$, $(Co^{2+}, Ti^+)$, $(Bi^{3+}, Zn^{2+})$, $(As^{3+}, Dy^{3+})$, $(Ho^{3+}, Mg^{2+})$, $(K^+, Rb^+)$, $(Cr^{3+}, Pr^{3+})$, $(Sr^{2+}, Fe^{2+})$, $(Ni^{2+}, Cu^+)$, $(Sr^{2+}, Mo^{2+})$, $(Y^{3+}, Zr^{4+})$, $(Cd^{2+}, Ba^{2+})$, $(Ho^{3+}, Pb^{2+})$, $(Pb^{2+}, Li^+)$, $(Eu^{3+}, Mg^{2+})$, $(Er^{3+}, Mg^{2+})$, $(Bi^{4+}, Al^{3+})$, $(Ca^{2+}, Sm^{3+})$, $(V^{3+}, La^{3+})$, $(Gd^{3+}, Cr^{2+})$, $(Mn^{2+}, Ti^+)$, $(Yb^{3+}, Fe^{2+})$, $(Ni^{2+}, Ag^+)$, $(Zn^{2+}, Yb^{2+})$, $(Se^{4+}, Sn^{4+})$, $(Sb^{3+}, Bi^{2+})$, and $(Eu^{3+}, Pb^{2+})$.

* * * * *